United States Patent
Archetti et al.

(10) Patent No.: US 9,249,355 B2
(45) Date of Patent: Feb. 2, 2016

(54) LIQUID-CRYSTAL DISPLAYS HAVING HOMEOTROPIC ALIGNMENT

(75) Inventors: Graziano Archetti, Darmstadt (DE); Andreas Taugerbeck, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 13/983,312

(22) PCT Filed: Jan. 9, 2012

(86) PCT No.: PCT/EP2012/000068
§ 371 (c)(1),
(2), (4) Date: Aug. 2, 2013

(87) PCT Pub. No.: WO2012/104008
PCT Pub. Date: Aug. 9, 2012

(65) Prior Publication Data
US 2013/0314655 A1 Nov. 28, 2013

(30) Foreign Application Priority Data

Feb. 5, 2011 (DE) .......................... 10 2011 010 380

(51) Int. Cl.
| | | |
|---|---|---|
| *G02F 1/1337* | (2006.01) | |
| *G02F 1/1343* | (2006.01) | |
| *C09K 19/54* | (2006.01) | |
| *C09K 19/38* | (2006.01) | |
| *C09K 19/52* | (2006.01) | |
| *C09K 19/56* | (2006.01) | |
| *C09K 19/30* | (2006.01) | |
| *C09K 19/44* | (2006.01) | |
| *C09K 19/04* | (2006.01) | |

(52) U.S. Cl.
CPC ............. *C09K 19/56* (2013.01); *C09K 19/3003* (2013.01); *C09K 19/44* (2013.01); *C09K 19/54* (2013.01); *G02F 1/133703* (2013.01); *C09K 19/542* (2013.01); *C09K 2019/0448* (2013.01); *C09K 2019/0466* (2013.01); *G02F 2001/133742* (2013.01)

(58) Field of Classification Search
CPC ...... C09K 19/44; C09K 19/54; C09K 19/542; C09K 19/56; C09K 2019/0448; C09K 2019/0466; G02F 1/133703; G02F 1/1343; G02F 2001/133742; G02F 2001/133765
USPC ........... 349/124, 139, 191; 252/299.01, 299.5
See application file for complete search history.

(56) References Cited

U.S. PATENT DOCUMENTS

| | | | |
|---|---|---|---|
| 3,848,966 A | 11/1974 | Smith et al. | |
| 6,936,187 B2 | 8/2005 | Lynch et al. | |
| 7,077,984 B1 * | 7/2006 | Natarajan et al. | 252/582 |
| 7,846,903 B2 | 12/2010 | Hato et al. | |
| 8,029,695 B2 | 10/2011 | Lee et al. | |
| 2002/0153509 A1 | 10/2002 | Lynch et al. | |
| 2004/0032561 A1 * | 2/2004 | Kumar et al. | 349/156 |
| 2008/0113923 A1 | 5/2008 | Hatoh et al. | |
| 2011/0037026 A1 | 2/2011 | Lee et al. | |
| 2012/0032112 A1 | 2/2012 | Czanta et al. | |

FOREIGN PATENT DOCUMENTS

| | | |
|---|---|---|
| DE | 2356889 A1 | 5/1974 |
| DE | 4000451 A1 | 7/1991 |
| EP | 1813287 A1 | 8/2007 |
| WO | 02/68562 A2 | 9/2002 |
| WO | 2009/066947 A2 | 5/2009 |
| WO | 2010/089092 A1 | 8/2010 |

OTHER PUBLICATIONS

International Search Report for PCT/EP2012/000068 (Apr. 17, 2012).
S. Abeygunaratne et al., "Tilted Supramolecular Structures of Amphiphilic Glycolipids in Straight-Core Smectic C Liquid Crystals", Liquid Crystals, vol. 34, No. 4 (Apr. 2007) pp. 441-445.

* cited by examiner

*Primary Examiner* — Shean C Wu
(74) *Attorney, Agent, or Firm* — Millen White Zelano and Branigan, PC; John Sopp; Csaba Henter

(57) ABSTRACT

The present invention relates to liquid-crystalline media (LC media) comprising self-aligning additives which effect homeotropic (vertical) alignment of the LC media at a surface or the cell walls of a liquid-crystal display (LC display). The invention therefore also encompasses LC displays having homeotropic alignment of the liquid-crystalline medium (LC medium) without conventional imide alignment layers. The LC media are optionally supplemented by a polymerisable or polymerised component, which serves for stabilisation of the alignment, for adjustment of the tilt angle and/or as passivation layer.

18 Claims, No Drawings

LIQUID-CRYSTAL DISPLAYS HAVING HOMEOTROPIC ALIGNMENT

The present invention relates to liquid-crystalline media (LC media) having negative or positive dielectric anisotropy comprising self-aligning additives which effect homeotropic (vertical) alignment of the LC media at a surface or the cell walls of a liquid-crystal display (LC display). The invention therefore also encompasses LC displays having homeotropic alignment of the liquid-crystalline medium (LC medium) without conventional imide alignment layers. The LC media are optionally supplemented by a polymerisable or polymerised component, which serves for stabilisation of the alignment, for adjustment of the tilt angle and/or as passivation layer.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have homeotropic edge alignment (VA technology=vertical alignment).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs ...", SID 2004 International Symposium, Digest of Technical Papers, XXXV, Book I, pp. 6 to 9, and Liu, C. T. et al., paper 15.1: "A 46-inch TFT-LCD HDTV Technology ...", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not been satisfactorily solved.

Considerable effort is associated with the production of VA displays having two or more domains of different preferential direction. It is an aim of this invention to simplify the production processes and the display devices themselves without giving up the advantages of VA technology, such as relatively fast response times and good viewing-angle dependence.

VA displays which contain LC media having positive dielectric anisotropy are described in S. H. Lee et al. Appl. Phys. Lett. (1997), 71, 2851-2853. These displays use interdigital electrodes arranged on a substrate surface (in-plane addressing electrode configuration having a comb-shaped structure), as employed, inter alia, in the commercially available IPS (in-plane switching) displays (as disclosed, for example, in DE 40 00 451 and EP 0 588 568), and have a homeotropic arrangement of the liquid-crystal medium, which changes to a planar arrangement on application of an electric field.

Further developments of the above-mentioned display can be found, for example, in K. S. Hun et al. J. Appl. Phys. (2008), 104, 084515 (DSIPS: 'double-side in-plane switching' for improvements of driver voltage and transmission), M. Jiao et al. App. Phys. Lett (2008), 92, 111101 (DFFS: 'dual fringe field switching' for improved response times) and Y. T. Kim et al. Jap. J. App. Phys. (2009), 48, 110205 (VAS: 'viewing angle switchable' LCD).

In addition, VA-IPS displays are also known under the name positive-VA and HT-VA.

In all such displays (referred to below in general as VA-IPS displays), an alignment layer is applied to both substrate surfaces for homeotropic alignment of the LC medium; the production of this layer has hitherto been associated with considerable effort.

It is an aim of this invention to simplify the production processes themselves without giving up the advantages of VA display technology, such as relatively short response times, good viewing-angle dependence and high contrast.

Industrial application of these effects in electro-optical display elements requires LC phases, which have to satisfy a multiplicity of requirements. Particularly important here are chemical resistance to moisture, air, the materials in the substrate surfaces and physical influences, such as heat, infrared, visible and ultraviolet radiation and direct and alternating electric fields.

Furthermore, industrially usable LC phases are required to have a liquid-crystalline mesophase in a suitable temperature range and low viscosity.

VA and VA-IPS displays are generally intended to have very high specific resistance at the same time as a large working-temperature range, short response times and a low threshold voltage, with the aid of which various grey shades can be produced.

In conventional VA and VA-IPS displays, a polyimide layer on the substrate surfaces ensures homeotropic alignment of the liquid crystal. The production of a suitable alignment layer in the display requires considerable effort. In addition, interactions of the alignment layer with the LC medium may impair the electrical resistance of the display. Owing to possible interactions of this type, the number of suitable liquid-crystal components is considerably reduced. It would therefore be desirable to achieve homeotropic alignment of the LC medium without polyimide.

The disadvantage of the active-matrix TN displays frequently used is due to their comparatively low contrast, the relatively high viewing-angle dependence and the difficulty of producing grey shades in these displays.

VA displays have significantly better viewing-angle dependences and are therefore used principally for televisions and monitors.

A further development are the so-called PS (polymer sustained) or PSA (polymer sustained alignment) displays, for which the term "polymer stabilised" is also occasionally used. The PSA displays are distinguished by the shortening of the response times without significant adverse effects on other parameters, such as, in particular, the favourable viewing-angle dependence of the contrast.

In these displays, a small amount (for example 0.3% by weight, typically <1% by weight) of one or more polymerisable compound(s) is added to the LC medium and, after introduction into the LC cell, is polymerised or cross-linked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable. PSA technology has hitherto been employed principally for LC media having negative dielectric anisotropy.

Unless indicated otherwise, the term "PSA" is used below as representative of PS displays and PSA displays.

In the meantime, the PSA principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a 'pretilt' in the cell. In the case of PSA-OCB displays, for example, it is possible for the bend structure to be stabilised so that an offset voltage is unnecessary or can be reduced. In the case of PSA-VA displays, the pretilt has a positive effect on the response times. A standard MVA or PVA pixel and electrode layout can be used for PSA-VA displays. In addition, however, it is also possible, for example, to manage with only one structured electrode side and no protrusions, which significantly simplifies production and at the same time results in very good contrast at the same time as very good light transmission.

PSA-VA displays are described, for example, in JP 10-036847 A, EP 1 170 626 A2, U.S. Pat. No. 6,861,107, U.S. Pat. No. 7,169,449, US 2004/0191428 A1, US 2006/0066793 A1 and US 2006/0103804 A1. PSA-OCB displays are described, for example, in T.-J- Chen et al., Jpn. J. Appl. Phys. 45, 2006, 2702-2704 and S. H. Kim, L.-C- Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221. PSA-VA-IPS displays are disclosed, for example, in WO 2010/089092 A1.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors or "TFTs"), while in the case of passive-matrix displays, individual pixels are usually addressed by the multiplex method, both methods being known from the prior art.

In particular for monitor and especially TV applications, optimisation of the response times, but also of the contrast and luminance (i.e. also transmission), of the LC display is still sought-after. The PSA method can provide crucial advantages here. In particular in the case of PSA-VA displays, a shortening of the response times, which correlate with a pretilt which can be measured in test cells, can be achieved without significant adverse effects on other parameters.

In the prior art, polymerisable compounds of the following formula, for example, are used for PSA-VA:

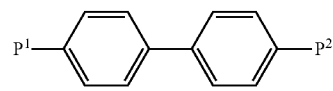

in which $P^1$ and $P^2$ each denote a polymerisable group, usually an acrylate or methacrylate group, as described, for example, in U.S. Pat. No. 7,169,449.

The effort for the production of a polyimide layer, treatment of the layer and improvement with bumps or polymer layers is relatively great. A simplifying technology which on the one hand reduces production costs and on the other hand helps to optimise the image quality (viewing-angle dependence, contrast, response times) would therefore be desirable.

Spontaneous horizontal to vertical alignment of a liquid-crystal layer with the aid of nanoparticles based on polyhedral oligomeric silsesquioxanes (simply silsesquioxanes, PSSs below) is reported by the publication Shie-Chang Jeng et al. *Optics Letters* (2009), 34, 455-457. From a concentration of about 1% by weight, virtually homeotropic alignment is observed. The pretilt can only be influenced by the concentration.

The specification US 2008/0198301 A1 likewise proposes PSS as alignment material. It is evident that the self-alignment functions on ITO and on planar-aligning polyimide.

The problem of the temperature dependence of the switching operation and the lack of a passivation layer is not mentioned in either specification. In fact, it has been found that the degree of homeotropic alignment induced by PSS decreases rapidly with increasing temperature. In addition, a passivation layer is particularly important since the polyimide layer ensures not only alignment of the LC medium, but also electrical insulation. Without a passivation layer, problems may appear with the reliability of the display, such as R-DC ('residual DC').

A conference poster at SID 2010 (H. Y. Gim et al., P-128) describes that a phenethyl-substituted polyhedral oligomeric silsesquioxane is used in a concentration of 10% by weight in a display without a conventional alignment layer of the PSA-VA type. The LC medium having negative dielectric anisotropy is homeotropically aligned by the PSS. However, the large amount of dopant has a considerable effect on the properties of the LC medium, and the number of liquid-crystal components which can be employed for an LC display of this type is therefore very limited.

Long-chain alcohols have already been used as starting material for covalently bonded ether groups on glass surfaces (cf. U.S. Pat. No. 4,022,934 A), at which vertical alignment of a liquid crystal has been observed. The covalent bonding of the alcohol to the surface requires pretreatment of the substrate surface in a processing step.

The publication U.S. Pat. No. 3,972,589 reports on long-chain carboxylic acids, nitriles and amines which homeotropically align an imine liquid crystal (MBBA) between glass substrates at a concentration of 1-4% by weight. The publication DE 2356889 A1 reports on further additives of this type, such as cetyl gallate and lecithin. The patent specification U.S. Pat. No. 3,848,966 reports on an additive of the formula octadecyl-CH(COOH)$_2$, which induces homeotropic surface alignment of a liquid crystal on addition of ≤0.5%.

Neither publication refers to the problem of the stability of the induced alignment. In fact, it has been found that, after heating, the degree of homeotropic alignment induced by the additive decreases rapidly with increasing temperature.

The existing approaches for achieving display applications without an alignment layer (polyimide layer, etc.) are therefore still not entirely satisfactory.

The present invention relates firstly to an LC medium comprising a low-molecular-weight liquid-crystalline component and one or more organic compounds which contain at least one polar anchor group and at least one long-chain non-polar radical having at least 8 C atoms. The liquid-crystalline component or the LC medium can have either positive or negative dielectric anisotropy. The LC medium according to the invention is preferably nematic. In addition, the LC medium optionally comprises a polymerised or polymerisable component, where the polymerised component is obtainable by polymerisation of a polymerisable component.

The present invention furthermore relates to a process for the preparation of an LC medium in which a low-molecular-weight liquid-crystalline component is mixed with one or more organic compounds which contain at least one polar anchor group and at least one long-chain non-polar radical having at least 8 C atoms, and optionally one or more polymerisable compounds and optionally assistants are added. The liquid-crystalline component or the LC medium can have either positive or negative dielectric anisotropy.

The present invention furthermore relates to a liquid-crystal display (LC display) comprising a liquid-crystal cell (LC cell) having two substrates and at least two electrodes, where at least one substrate is transparent to light, and a layer of a liquid-crystal medium (LC medium), located between the substrates, comprising a low-molecular-weight liquid-crystalline component and one or more organic compounds, where the organic compound is characterised in that it contains at least one polar anchor group and at least one long-chain non-polar radical having at least 8 C atoms and is suitable for effecting homeotropic (vertical) alignment of the LC medium with respect to the substrate surfaces. In addition, the LC medium of the LC display optionally comprises a polymerised or polymerisable component, where the polymerised component is obtainable by polymerisation of one or more polymerisable compounds in the LC medium between the substrates of the LC cell, optionally with application of an electrical voltage to the electrodes of the cell or under the action of another electric field. By means of this component, the LC medium and in particular its alignment can be stabilised and a desired 'pre-tilt' can optionally be set. The LC display is preferably constructed in such a way that it has at least one or two electrodes on at least one substrate.

The invention furthermore relates to a process for the production of an LC display, preferably of the PSA-VA type, comprising an LC cell having two substrates and at least two electrodes, where at least one substrate is transparent to light, comprising the process steps of:
  filling of the cell with an LC medium as described above and below or in the claims, comprising an organic compound which is suitable for effecting homeotropic (vertical) alignment of the LC medium with respect to the substrate surfaces, and optionally
  polymerisation of the polymerisable component optionally present, optionally with application of a voltage to the electrodes of the cell or under the action of an electric field.

The organic compound which contains at least one polar anchor group and at least one long-chain non-polar radical having at least 8 C atoms (the self-alignment additive) is dissolved in the liquid crystal. It effects homeotropic alignment of the liquid crystal with respect to the substrate surfaces (such as, for example, a glass surface or ITO- or polyimide-coated glass). Considering the investigations for this invention, it appears that the polar anchor group interacts loosely with the substrate surface. The organic compounds on the substrate surface consequently align and induce homeotropic alignment of the liquid crystal.

The self-alignment additive is preferably employed in a concentration of less than 10% by weight, particularly preferably 8% by weight and very particularly 5% by weight. It is preferably employed in a concentration of at least 0.1% by weight, preferably at least 0.2% by weight. The use of 0.1 to 2.5% by weight of the self-alignment additive generally already results in completely homeotropic alignment of the LC layer at conventional cell thicknesses (3 to 4 µm).

The polar anchor group preferably contains no polymerisable groups, such as, for example, acrylate groups.

The polar anchor group of the self-alignment additive preferably consists of a group which undergoes a non-covalent interaction with the glass or metal-oxide substrate surface. Suitable groups are polar groups containing polar structural elements with atoms selected from N, O, S and P. The groups should at the same time be sufficiently stable for use as LC medium. In addition, they should have only little effect on the VHR values ('voltage holding ratio') of the LC medium in the LC cell and on the long-term stability (reliability). The anchor group preferably contains one or more, preferably two or more, of these heteroatoms.

The polar anchor group particularly preferably consists of at least two structural elements containing heteroatoms selected from (N, O) and covalent, linking structures between the heteroatoms and between one or more of the heteroatoms and the remainder of the molecule of the formula I (without the anchor group). The polar anchor group preferably contains at least one OH structure or an N atom in a primary, secondary or tertiary amino group.

The self-alignment additives preferably have one or two long-chain non-polar radicals, preferably one of these radicals. The term "long-chain non-polar radical" preferably encompasses aliphatic hydrocarbon radicals, also branched, having a longest chain length of at least 8 C atoms, where certain functional groups in the chain are also encompassed. The radical may also be unsaturated and/or halogenated (by Cl, F). One or more non-adjacent and non-terminal CH$_2$ groups in the long-chain alkyl group may be replaced by —O—, —(CO)— or an ester group. Furthermore, one CH$_2$ group may be replaced by a cycloalkylene group having 3 to 8 C atoms.

The "long-chain non-polar radical" has at most 30 C atoms. The longest chain has a maximum chain length of 20 C atoms. The radical preferably has 8 to 18 C atoms. The radical is preferably a linear alkyl chain having 10 to 16 C atoms, where at most 5 C atoms are connected in side chains.

The self-alignment additive is preferably an organic compound having a relative molar mass of ≥130 g/mol, in order that the substances are less volatile. It particularly preferably has a relative molar mass of ≥150 g/mol in order to achieve an even more stable self-alignment effect. As upper limit, it preferably has a relative molar mass of ≤500 g/mol.

The self-alignment additive particularly preferably has a structure of the formula I:

where
R$^1$ denotes straight-chain or branched alkyl having 8 to 20 C atoms, in which, in addition, one or more non-adjacent CH$_2$ groups may be replaced by —CH=CH—, —CF=CH—, —CH=CF— or —C≡C—, in which one CH$_2$ group may be replaced by a cycloalkylene group having 3 to 8 C atoms and in which, in addition, one or more H atoms may be replaced by F or Cl, $R^2$ denotes a polar anchor group, and n denotes 1 or 2, preferably 1.

The radical $R^1$ preferably contains 8 to 20 C atoms. It particularly preferably contains no rings, and:

$R^1$ denotes straight-chain or branched alkyl having 10 to 18 C atoms, in which, in addition, one or more non-adjacent $CH_2$ groups may be replaced by —CH=CH—, —CF=CH—, —CH=CF—, —C≡C— or —O— and in which, in addition, one or more H atoms may be replaced by F or Cl.

The radical $R^2$ in formula I encompasses, for example, alcohols, primary, secondary and tertiary amines, ketones, carboxylic acids, thiols, esters and (thio)ethers, and combinations thereof. The structure here may be linear, branched, cyclic or a combination thereof.

The group $R^2$ in the above formulae preferably encompasses a group of the formula (A1)

$$-Sp-[X^2-Z^3-]_k X^1 \quad (A1)$$

in which

Sp denotes a single bond or a spacer group defined like $Sp^a$ as defined below for formula M, preferably a spacer group Sp"—X", as defined for formula M below, which is connected to the radical $R^1$ via the group X", where Sp" very particularly denotes a single bond or an alkylene having 1 to 12 C atoms, $X^1$ denotes a group —$NH_2$, —$NHR^{11}$, —$NR^{11}_2$, —$OR^{11}$, —OH, —(CO)OH or a group of the formula

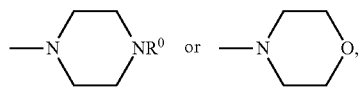

$R^0$ denotes H or alkyl having 1 to 12 C atoms, $X^2$ in each case independently denotes —NH—, —$NR^{11}$—, —O— or a single bond, $Z^3$ in each case independently denotes an alkylene group having 1-15 C atoms, carbocyclic rings having 5 or 6 C atoms, or combinations of one or more rings and alkylene groups, in each of which hydrogen may be replaced by —OH, —$OR^{11}$, —(CO)OH, —$NH_2$, —$NHR^{11}$, —$NR^{11}_2$ or halogen (preferably F, Cl), $R^{11}$ in each case independently denotes a halogenated or unsubstituted alkyl radical having 1 to 15 C atoms, where, in addition, one or more $CH_2$ groups in this radical may each be replaced, independently of one another, by —C≡C—, —CH=CH—, —(CO)O—, —O(CO)—, —(CO)— or —O— in such a way that O atoms are not linked directly to one another, and where two radicals $R^{11}$ may be linked to one another to form a ring, or H, and k denotes 0 to 3.

The group $R^2$ in the above formulae particularly preferably encompasses a (N/O) heteroatom-containing group of the sub-formula (A2)

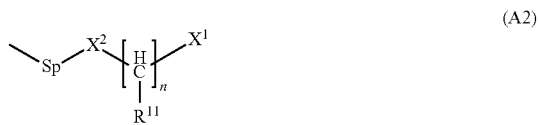

in which

Sp, $X^1$, $X^2$ and $R^{11}$ are as defined above for $R^2$ (formula A1), and n denotes 1, 2 or 3.

The group $R^2$ particularly preferably denotes precisely one group of the formula (A1) or (A2).

Particularly preferred nitrogen-containing groups $R^2$ are selected from —$NH_2$, —NH—$(CH_2)_{n3}$H, —$(CH_2)_n$—$NH_2$, —$(CH_2)_n$—NH—$(CH_2)_{n3}$H, —NH—$(CH_2)_n$—$NH_2$, —NH—$(CH_2)_n$—NH—$(CH_2)_{n3}$H, —$(CH_2)_{n1}$—NH—$(CH_2)_{n2}$—$NH_2$, —$(CH_2)_{n1}$—NH—$(CH_2)_{n2}$—NH—$(CH_2)_{n3}$H, —O—$(CH_2)_n$—$NH_2$, —$(CH_2)_{n1}$—O—$(CH_2)_n$—$NH_2$, —$(CH_2)_{n1}$—NH—$(CH_2)_{n2}$—OH, —O—$(CH_2)_{n1}$—NH—$(CH_2)_{n2}$—$NH_2$, —O—$(CH_2)_{n1}$—NH—$(CH_2)_{n2}$—OH, —$(CH_2)_{n1}$—NH—$(CH_2)_{n2}$—NH—$(CH_2)_{n3}$H, in which n, n1, n2 and n3 denote, independently, 1, 2, 3, 4, 5, 6, 7, 8, 9, 10, 11 or 12, in particular 1, 2, 3 or 4. Owing to the better solubility in highly polar liquid-crystalline media, the groups —OH and —$NH_2$ are particularly preferred. Of the oxygen-containing functions in the anchor groups, the OH group is preferred to the functions —O—, —(CO)— or —(CO)O— owing to the high anchor force. The groups containing a plurality of heteroatoms (N, O) have particular strength as anchor group. They can be employed in lower concentrations.

Particularly preferred nitrogen-free groups $R^2$ are selected from —OH, —$(CH_2)_n$—OH, —O—$(CH_2)_n$—OH, —[O—$(CH_2)_{n1}$—$]_{n2}$—OH, —(CO)OH, —$(CH_2)_n$—(CO)OH, —O—$(CH_2)_n$—(CO)OH or —[O—$(CH_2)_{n1}$—$]_{n2}$—(CO)OH, in which n, n1 and n2 denote, independently, 1, 2, 3, 4, 5, 6, 7, 8, 9, 10, 11 or 12, in particular 1, 2, 3 or 4.

"Halogen" in the context of the present invention stands for fluorine, chlorine, bromine or iodine, preferably for fluorine or chlorine.

Particularly preferred compounds of the formula I are selected from the following illustrative compounds, which at the same time represent particularly preferred groups $R^1$ and $R^2$ of the self-alignment additives:

I-1

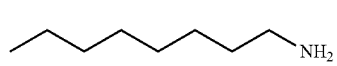

I-2

I-3

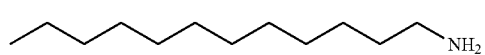

I-4

I-5

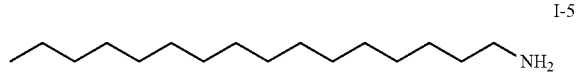

I-6

-continued
| I-7 | I-8 |
|---|---|
| 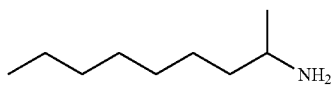 | 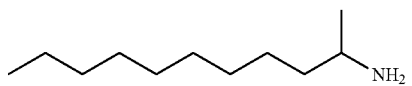 |
| I-9 | I-10 |
| 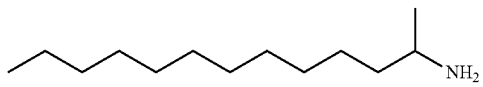 | 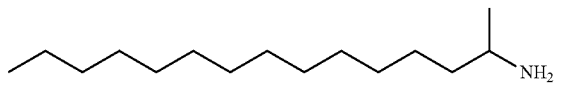 |
| I-11 | I-12 |
| 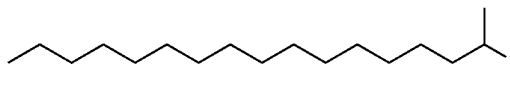 | 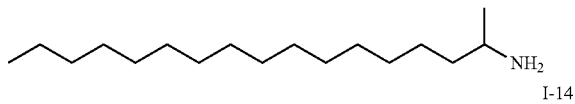 |
| I-13 | I-14 |
| 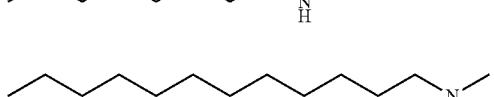 | 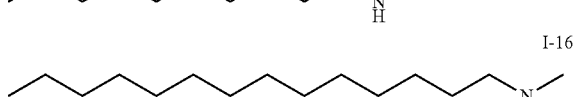 |
| I-15 | I-16 |
| 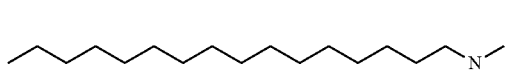 | 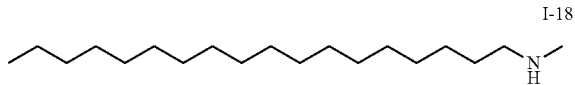 |
| I-17 | I-18 |
| 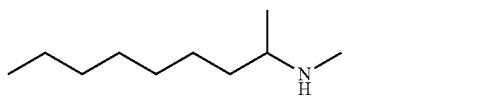 | 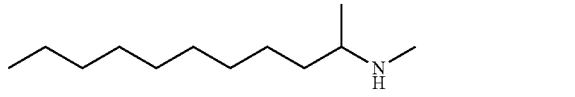 |
| I-19 | I-20 |
| 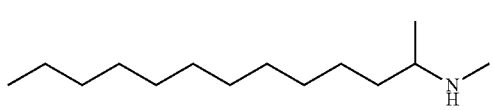 | 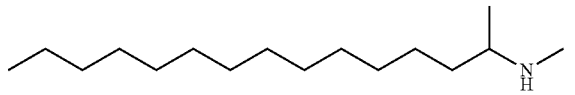 |
| I-21 | I-22 |
| 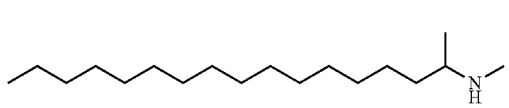 | 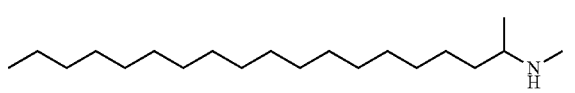 |
| I-23 | I-24 |
| 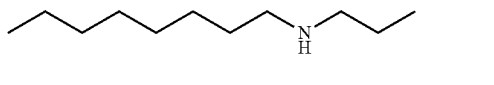 | 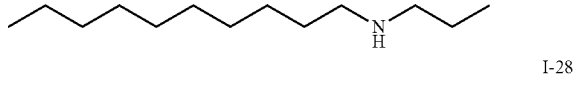 |
| I-25 | I-26 |
| 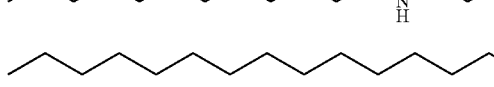 | 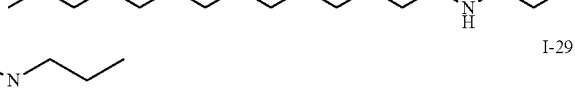 |
| I-27 | I-28 |
| 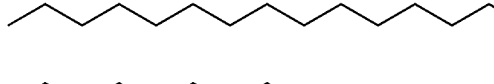 |  |
| I-29 | |
| 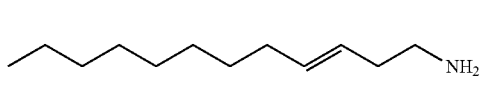 | |
| I-30 | |
| 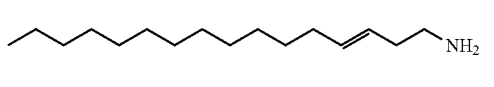 | |
| I-31 | I-32 |
| 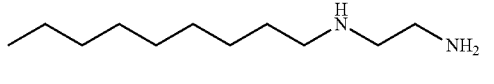 | 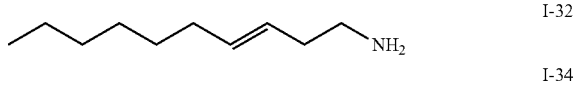 |
| I-33 | I-34 |
| | 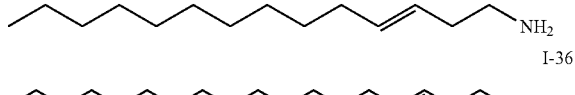 |
| I-35 | I-36 |
| 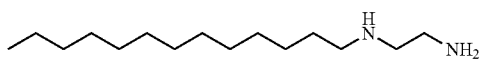 | 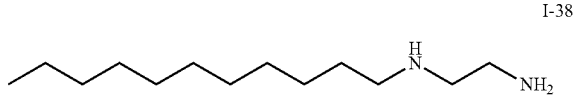 |
| I-37 | I-38 |
| | 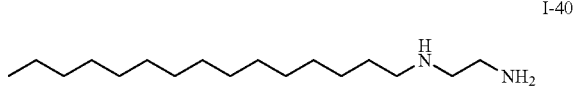 |
| I-39 | I-40 |
|  |  |

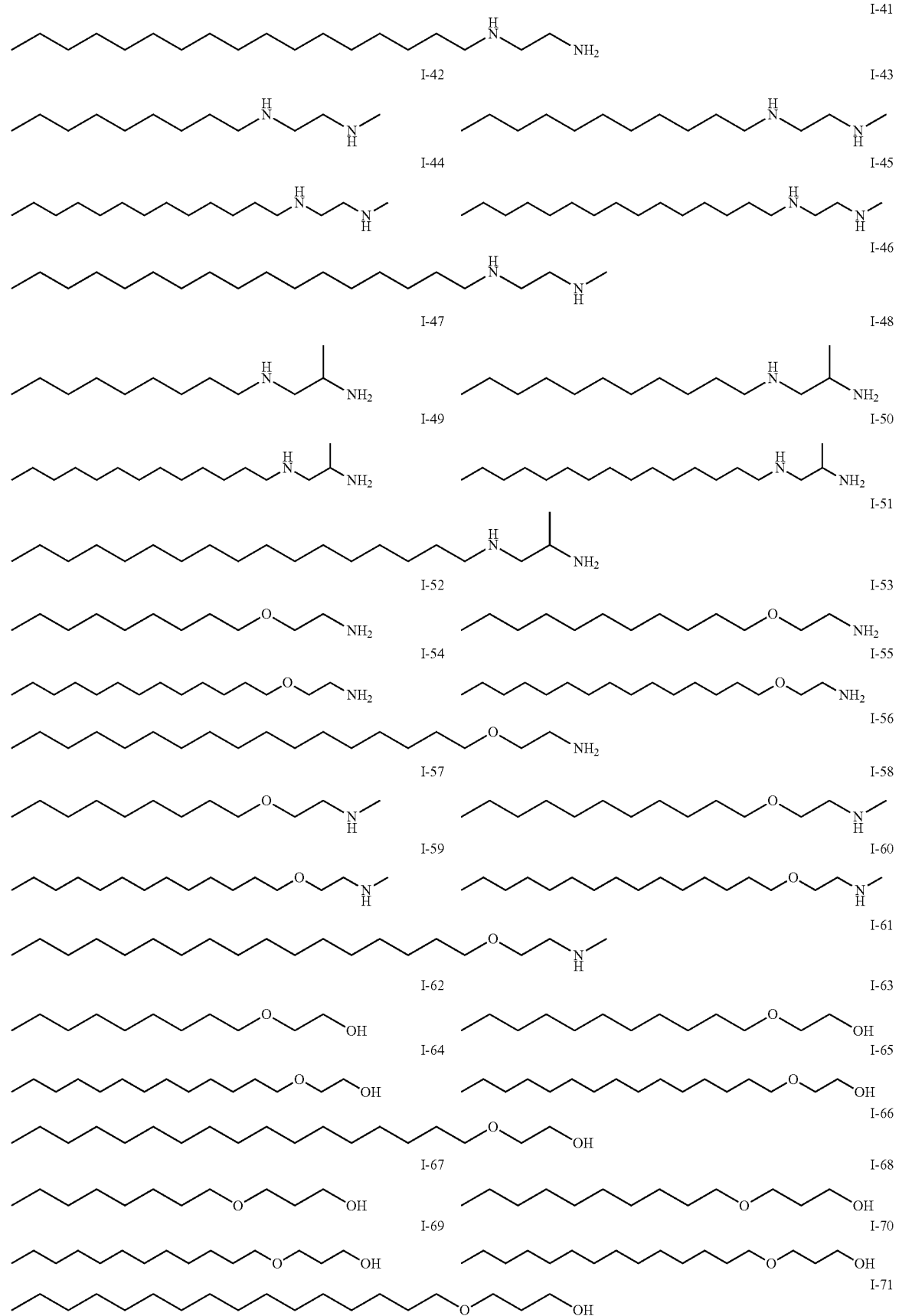

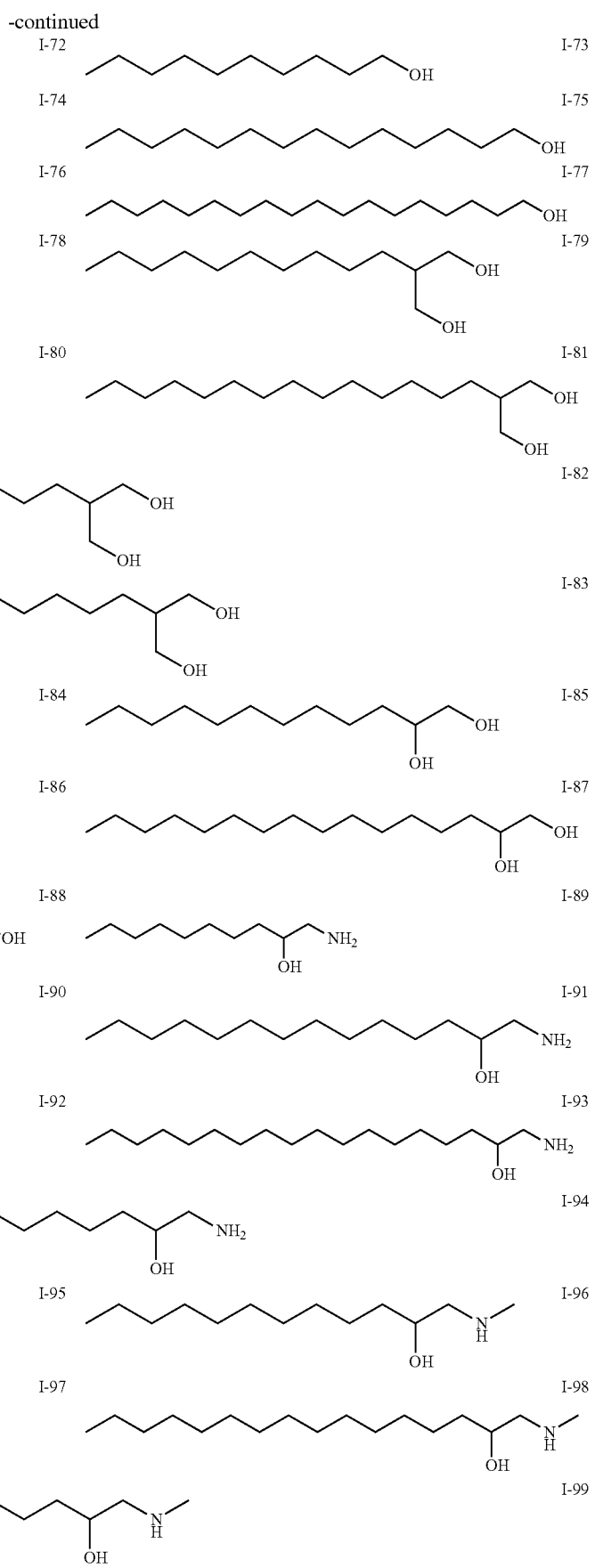

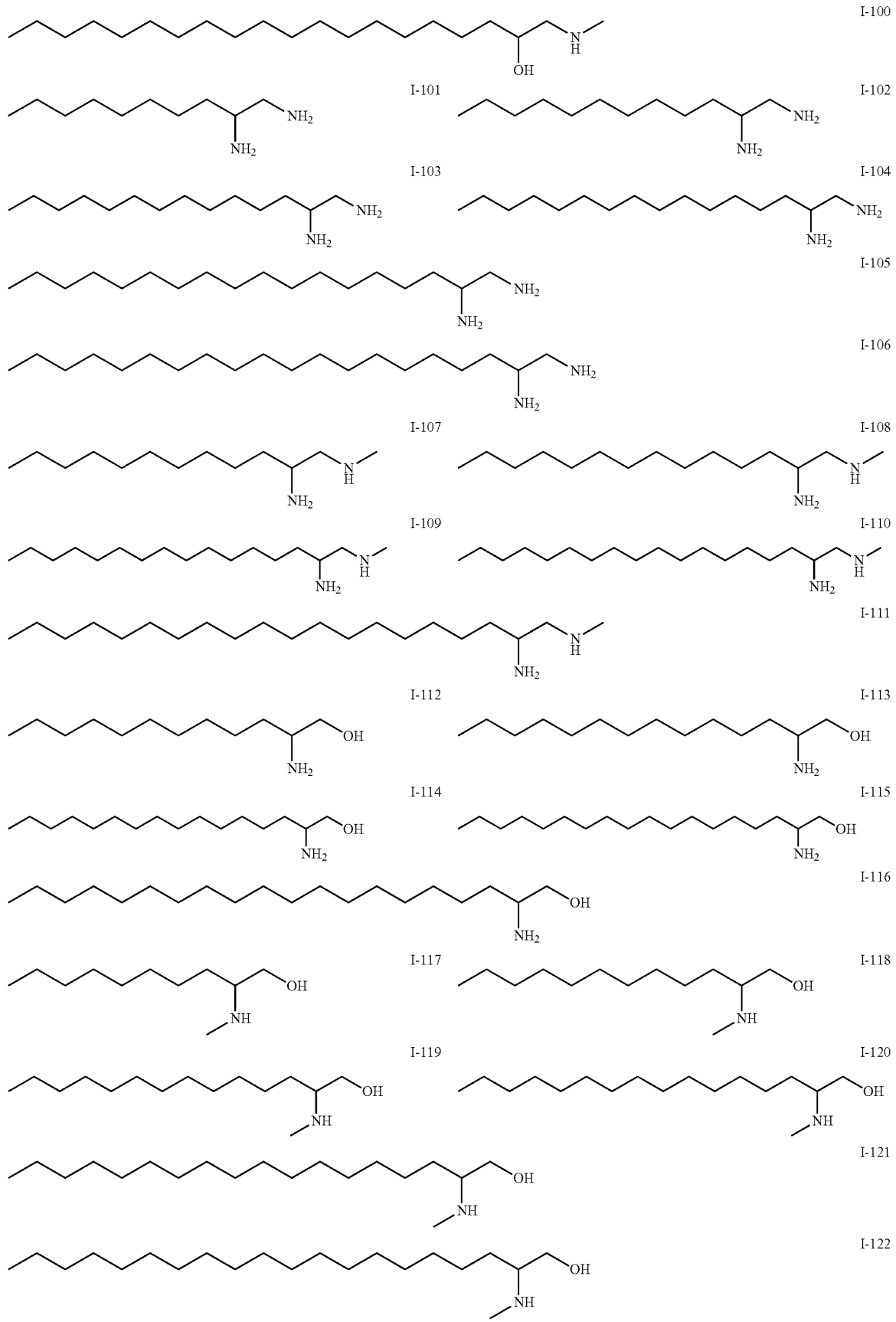

-continued

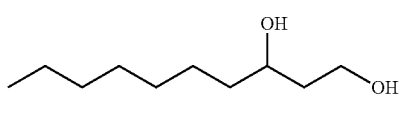
I-123

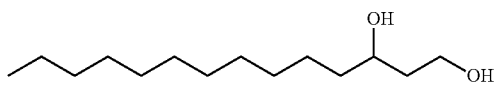
I-124

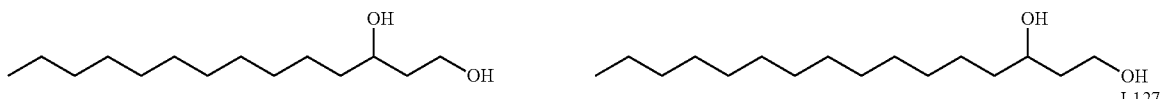
I-125

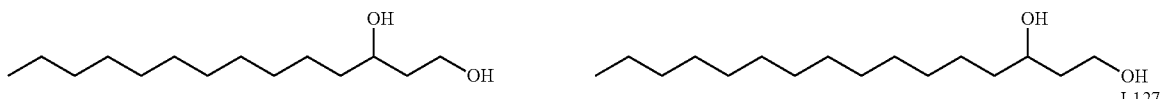
I-126

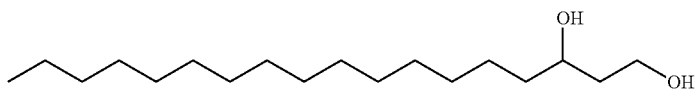
I-127

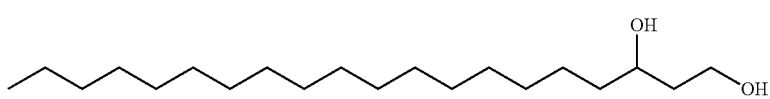
I-128

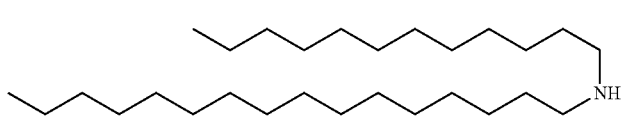
I-140

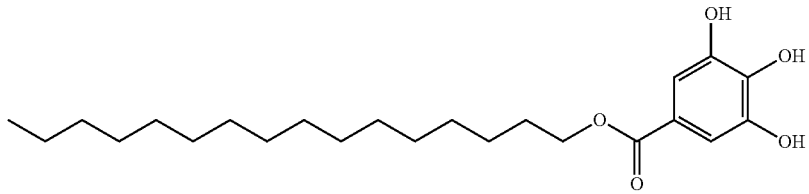
I-141

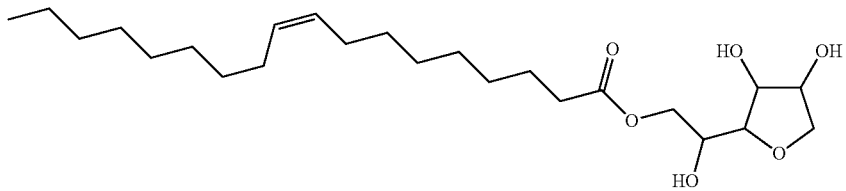
I-142

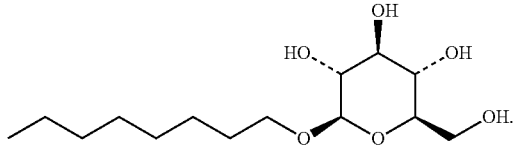
I-143

In a further preferred embodiment of the invention, use is made of organic compounds containing the polar anchor group or compounds of the formula I which, besides the polar anchor, contain one or more polymerisable groups as further functionalisation (compare group $P^a$ or $P^b$ below). Preferred polymerisable groups are groups such as acrylate, methacrylate, fluoroacrylate, oxetane, vinyloxy or epoxide groups, particularly preferably acrylate and methacrylate. The inclusion of compounds of the formula I in the polymerisation permanently immobilises the compounds, causing them to retain their function.

An advantage of the LC displays according to the invention is that the display achieves the desired homeotropic alignment without the conventional polyimide alignment layer. The production of the LC displays is this considerably simplified. This alignment is generally also retained at elevated temperature.

The polymer stabilisation additionally stabilises the homeotropic alignment; improved temperature stability of the electro-optical switching is thus achieved. The homeotropic alignment is also retained at elevated temperatures within the working range of the medium (for example 70° C.). The long-term stability of the homeotropic alignment is also improved by the polymerisable component. Heating above the clearing point for a number of days does not result in a change in the pre-alignment, not even at elevated temperatures. The polymer-stabilised displays according to the invention are distinguished by improved response times (pretilt angle due to polymerisation with application of voltage) and a better contrast ratio (temperature dependence of the contrast). The polymerised component preferably present can simultaneously serve as passivation layer, which increases the reliability of the display since it isolates the electrode surface from the liquid-crystalline medium.

Thanks to the relatively small amount, the self-alignment additives or the compounds of the formula I have virtually no effect on the properties of the LC media. It is therefore possible to use a broad range of liquid-crystal components in the LC display.

The LC displays according to the invention therefore preferably have no alignment layer for homeotropic alignment on the surfaces of the LC cell, i.e. they are polyimide-free. In the case where the LC displays nevertheless have alignment layers on one or both sides, these preferably consist of polyimide. The alignment layers are preferably not rubbed. The rubbing of the alignment layer, a particularly time-consuming step in production, which was hitherto necessary is thus superfluous. An unrubbed polyimide layer can nevertheless serve as passivation layer.

In a particular embodiment, the LC displays according to the invention use an LC medium having negative dielectric anisotropy ($\Delta\epsilon \leq -1.5$). Corresponding liquid-crystalline media are likewise preferred. In general, the display is a VA display having electrodes arranged on opposite sides of the LC cell, preferably having electrodes which are arranged in such a way that they are able to generate an electric field aligned predominantly perpendicular to the substrate surface. Typical substrates used are those which are used from the VAN mode and PSA-VA (structuring of the electrodes is therefore possible).

In a particular embodiment, the LC displays according to the invention use an LC medium having positive dielectric anisotropy ($\Delta\epsilon \geq 1.5$). Corresponding liquid-crystalline media are likewise preferred. In general, the display is a VA-IPS display having electrodes arranged on one side of the LC cell, preferably having electrodes which are arranged in such a way that they are able to generate an electric field aligned predominantly planar to the substrate surface, for example interdigital electrodes (in-plane addressing electrode configuration having a comb-shaped structure).

The LC displays are provided in a conventional manner with one or more polariser(s), which make(s) the LC medium switching operation visible.

The polymerised component of the LC cell (polymer) is obtainable by polymerisation of a polymerisable component (monomer). In general, the monomers are firstly dissolved in the LC medium and are polymerised in the LC cell after homeotropic alignment or a high tilt angle of the LC medium has been established. In order to support the desired alignment, a voltage can be applied to the LC cell. In the simplest case, such a voltage is superfluous, and the desired alignment is established merely through the nature of the LC medium and the cell geometry.

The suitable monomers (polymerisable component) of the LC medium are those from the prior art which are used for PSA-VA displays, in particular polymerisable compounds of the formula M mentioned below and/or of the formulae M1 to M22. The LC media according to the invention for use in PSA displays preferably comprise <5% by weight, particularly preferably <1% by weight and very particularly preferably <0.5% by weight, of polymerisable compounds, in particular polymerisable compounds of the formulae mentioned below. In order to achieve an adequate effect, 0.2% by weight or more is preferably employed. The optimum amount is dependent on the layer thickness.

Suitable monomers of the polymerisable component of the LC medium are described by the following formula M:

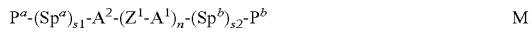

in which the individual radicals have the following meanings:
$P^a$, $P^b$ each, independently of one another, denote a polymerisable group,
$Sp^a$, $Sp^b$ on each occurrence, identically or differently, denote a spacer group,
s1, s2 each, independently of one another, denote 0 or 1,
$A^1$, $A^2$ each, independently of one another, denote a radical selected from the following groups:

a) the group consisting of trans-1,4-cyclohexylene, 1,4-cyclohexenylene and 4,4"-bicyclohexylene, in which, in addition, one or more non-adjacent $CH_2$ groups may be replaced by —O— and/or —S— and in which, in addition, one or more H atoms may be replaced by F, b) the group consisting of 1,4-phenylene and 1,3-phenylene, in which, in addition, one or two CH groups may be replaced by N and in which, in addition, one or more H atoms may be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo-[1.1.1]pentane-1,3-diyl, bicyclo[2.2.2]octane-1,4-diyl, spiro[3.3]heptane-2,6-diyl,

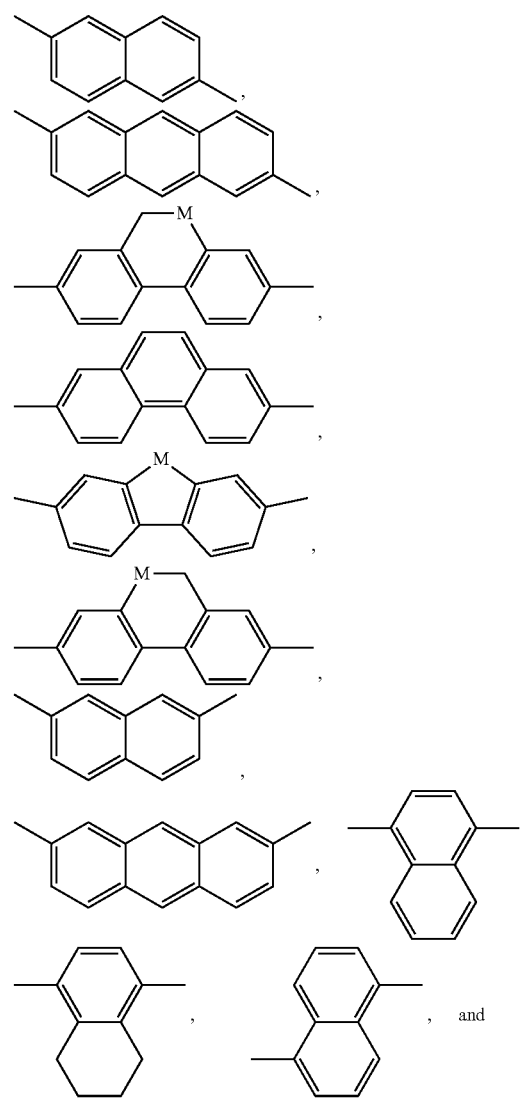

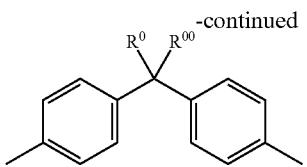

where, in addition, one or more H atoms in these radicals may be replaced by L, and/or one or more double bonds may be replaced by single bonds, and/or one or more CH groups may be replaced by N, n denotes 0, 1, 2 or 3, $Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^c$R$^d$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, $R^0$, $R^{00}$ each, independently of one another, denote H, F or straight-chain or branched alkyl having 1 to 12 C atoms, in which, in addition, one or more H atoms may be replaced by F, M denotes —O—, —S—, —CH$_2$—, —CHY$^1$— or —CY$^1$Y$^2$—, $Y^1$ and $Y^2$ each, independently of one another, have one of the meanings indicated above for $R^0$ or denote Cl or CN, and preferably H, F, Cl, CN, OCF$_3$ or CF$_3$, $W^1$, $W^2$ each, independently of one another, denote —CH$_2$CH$_2$—, —CH═CH—, —CH$_2$—O—, —O—CH$_2$—, —C(R$^c$R$^d$)— or —O—, and $R^c$ and $R^d$ each, independently of one another, denote H or alkyl having 1 to 6 C atoms, preferably H, methyl or ethyl.

The polymerisable group $P^{a,b}$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups $P^{a,b}$ are selected from the croup consisting of CH$_2$═CW$^1$—CO—O—, CH$_2$═CW$^1$—CO—,

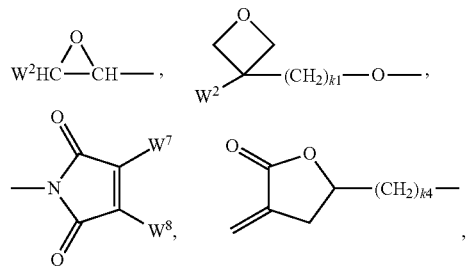

CH$_2$═CW$^2$—(O)$_{k3}$—, CW$^1$═CH—CO—(O)$_{k3}$—, CW$^1$═CH—CO—NH—, CH$_2$═CW$^1$—CO—NH—, CH$_3$—CH═CH—O—, (CH$_2$═CH)$_2$CH—OCO—, (CH$_2$═CH—CH$_2$)$_2$CH—OCO—, (CH$_2$═CH)$_2$CH—O—, (CH$_2$═CH—CH$_2$)$_2$N—, (CH$_2$═CH—CH$_2$)$_2$N—CO—, HO—CW$^2$W$^3$—, HS—CW$^2$W$^3$—, HW$^2$N—, HO—CW$^2$W$^3$—NH—, CH$_2$═CW$^1$—CO—NH—, CH$_2$═CH—(COO)$_{k1}$-Phe-(O)$_{k2}$—, CH$_2$═CH—(CO)$_{k1}$-Phe(O)$_{k2}$—, Phe-CH═CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, k$_1$, k$_2$ and k$_3$ each, independently of one another, denote 0 or 1, k$_3$ preferably denotes 1, and k$_4$ denotes an integer from 1 to 10.

Particularly preferred groups $P^{a,b}$ are selected from the group consisting of CH$_2$═CW$^1$—CO—O—, CH$_2$═CW$^1$—CO—,

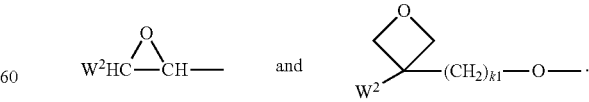

CH$_2$═CW$^2$—O—, CW$^1$═CH—CO—(O)$_{k3}$—, CW$^1$═CH—CO—NH—, CH$_2$═CW$^1$—CO—NH—, (CH$_2$═CH)$_2$CH—OCO—, (CH$_2$═CH—CH$_2$)$_2$CH—OCO—, (CH$_2$═CH)$_2$CH—O—, (CH$_2$═CH—CH$_2$)$_2$N—, (CH$_2$═CH—CH$_2$)$_2$N—CO—, CH$_2$═CW$^1$—CO—NH—, CH$_2$═CH—(COO)$_{k1}$-Phe-(O)$_{k2}$—, CH$_2$═CH—(CO)$_{k1}$-Phe-(O)$_{k2}$—, Phe-CH═CH— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, k$_1$, k$_2$ and k$_3$ each, independently of one another, denote 0 or 1, k$_3$ preferably denotes 1, and k$_4$ denotes an integer from 1 to 10.

Very particularly preferred groups $P^{a,b}$ are selected from the group consisting of CH$_2$═CW$^1$—CO—O—, in particular CH$_2$═CH—CO—O—, CH$_2$═C(CH$_3$)—CO—O— and CH$_2$═CF—CO—O—, furthermore CH$_2$═CH—O—, (CH$_2$═CH)$_2$CH—O—CO—, (CH$_2$═CH)$_2$CH—O—, Very particularly preferred groups $P^{a,b}$ are therefore selected from the group consisting of acrylate, methacrylate, fluoroacrylate, furthermore vinyloxy, chloroacrylate, oxetane and epoxide groups, and of these preferably an acrylate or methacrylate group.

Preferred spacer groups $Sp^{a,b}$ are selected from the formula $Sp''-X''$, so that the radical $P^{a/b}-Sp^{a/b}-$ conforms to the formula $P^{a/b}-Sp''-X''-$, where Sp" denotes alkylene having 1 to 20, preferably 1 to 12, C atoms, which is optionally mono- or polysubstituted by F, Cl, Br, I or CN and in which, in addition, one or more non-adjacent CH$_2$ groups may each be replaced, independently of one another, by —O—, —S—, —NH—, —N(R$^0$)—, —Si(R$^{00}$R$^{000}$)—, —CO—, —CO—O—, —O—CO—, —O—CO—O—, —S—CO—, —CO—S—, —N(R$^{00}$)—CO—O—, —O—CO—N(R$^{00}$)—, —N(R$^{00}$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—) N(R$^{00}$)—, —N(R$^{00}$)—CO—, —N(R$^{00}$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, R$^{00}$ and R$^{000}$ each, independently of one another, denote H or alkyl having 1 to 12 C atoms, and Y$^2$ and Y$^3$ each, independently of one another, denote H, F, Cl or CN.

X' is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp" are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, in which p1 is an integer from 1 to 12, q1 is an integer from 1 to 3, and R$^{00}$ and R$^{000}$ have the meanings indicated above.

Particularly preferred groups $-Sp''-X''-$ are —(CH$_2$)$_{p1}$—, —(CH$_2$)$_{p1}$—O—, —(CH$_2$)$_{p1}$—O—CO—, —(CH$_2$)$_{p1}$—O—CO—O—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Particularly preferred monomers are the following:

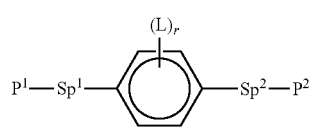

M1

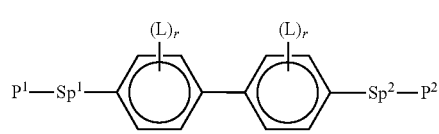

M2

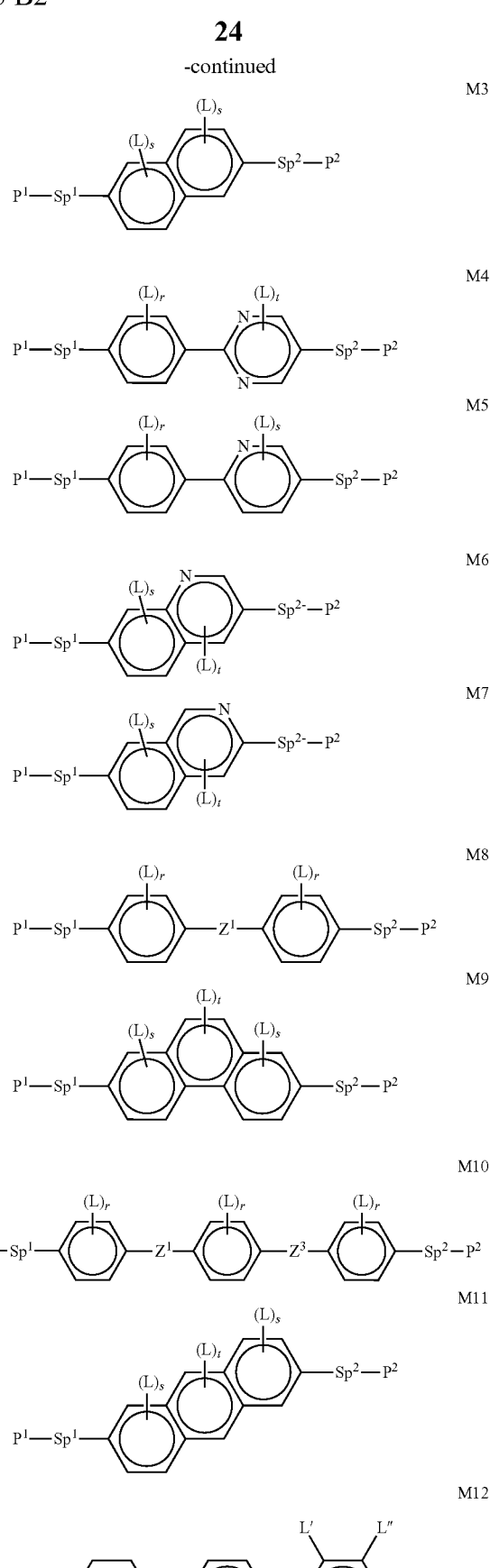

-continued

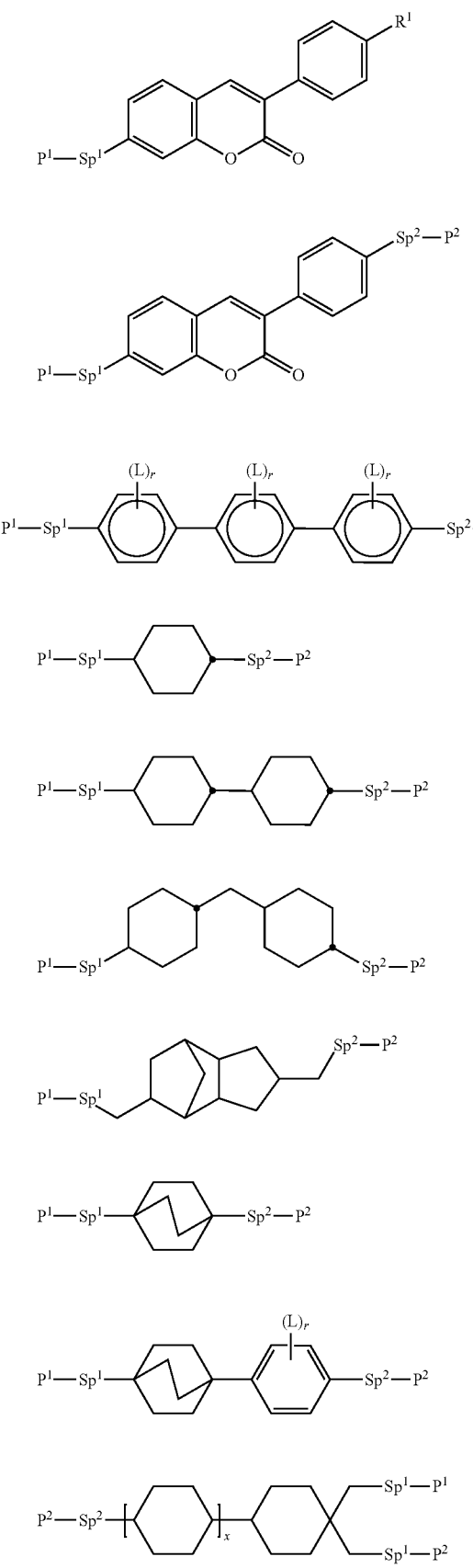

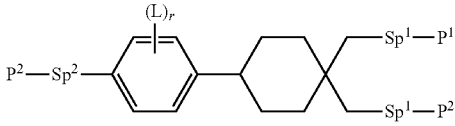

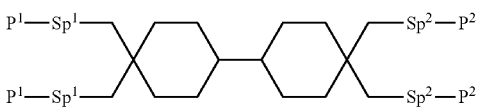

in which the individual radicals have the following meanings:
$P^1$ and $P^2$ each, independently of one another, denote a polymerisable group as defined for formula I, preferably an acrylate, methacrylate, fluoroacrylate, oxetane, vinyloxy or epoxide group, $Sp^1$ and $Sp^2$ each, independently of one another, denote a single bond or a spacer group, preferably having one of the meanings indicated above and below for $Sp^a$, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the linking to the adjacent ring in the last-mentioned groups takes place via the O atom, where, in addition, one or more of the radicals $P^1$-$Sp^1$- and $P^2$-$Sp^2$- may denote a radical $R^{aa}$, with the proviso that at least one of the radicals $P^1$-$Sp^1$- and $P^2$-$Sp^2$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)=C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), $R^0$, $R^{00}$ each, independently of one another, denote H or alkyl having 1 to 12 C atoms, $R^y$ and $R^z$ each, independently of one another, denote H, F, $CH_3$ or $CF_3$, $Z^1$ denotes —O—, —CO—, —$C(R^yR^z)$— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4, L on each occurrence, identically or differently, denotes F, Cl, CN, SCN, $SF_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4,
s denotes 0, 1, 2 or 3,
t denotes 0, 1 or 2, and
x denotes 0 or 1.

The LC medium or the polymerisable component preferably comprises one or more compounds selected from the group consisting of the formulae M1-M21, particularly preferably selected from the group consisting of the formulae M2-M15, very particularly preferably selected from the group consisting of the formulae M2, M3, M9, M14 and M15.

The LC medium or the polymerisable component preferably comprises no compounds of the formula M10 in which $Z^2$ and $Z^3$ denote —(CO)O— or —O(CO)—.

For the production of PSA displays, the polymerisable compounds are polymerised or crosslinked (if a polymerisable compound contains two or more polymerisable groups) by in-situ polymerisation in the LC medium between the substrates of the LC display, optionally with application of a voltage. The polymerisation can be carried out in one step. It is also possible firstly to carry out the polymerisation with application of a voltage in a first step in order to produce a pretilt angle, and subsequently, in a second polymerisation step, to polymerise or crosslink the compounds which have not fully reacted in the first step without an applied voltage ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable compounds containing aromatic rings (cf., in particular, formulae M1 to M15) are also suitable for polymerisation without an initiator, which is associated with considerable advantages, such as, for example, lower material costs and, in particular, reduced contamination of the LC medium by possible residual amounts of the initiator or degradation products thereof. The polymerisation can thus also be carried out without addition of an initiator. The LC medium thus, in a preferred embodiment, comprises no polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of the RMs or the polymerisable component, is preferably 10-10,000 ppm, particularly preferably 50-500 ppm.

Besides the additives described above and the optional polymerisable compounds (RMs), the LC media for use in the LC displays according to the invention comprise an LC mixture ("host mixture") comprising one or more, preferably two or more, low-molecular-weight (i.e. monomeric or unpolymerised) compounds. The latter are stable or unreactive with respect to a polymerisation reaction under the conditions used for the polymerisation of the polymerisable compounds. In principle, a suitable host mixture is any dielectrically negative or positive LC mixture which is suitable for use in conventional VA and VA-IPS displays.

Suitable LC mixtures are known to the person skilled in the art and are described in the literature. LC media for VA displays having negative dielectric anisotropy are described in EP 1 378 557 A1.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521.

Preferred embodiments of the liquid-crystalline medium having negative dielectric anisotropy according to the invention are indicated below:

a) LC medium which additionally comprises one or more compounds selected from the group of the compounds of the formulae A, B and C,

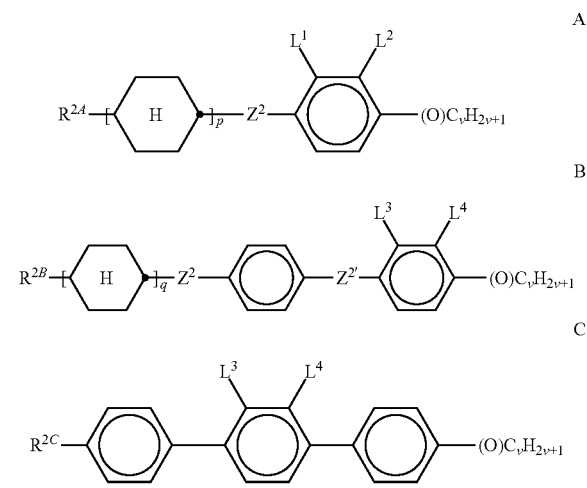

in which $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—, $-\mathrm{C}\!\!\equiv\!\!\mathrm{C}-$, —C≡C—, —$CF_2$O—, —$OCF_2$—, —OC—O— or —O—CO— in such a way that O atoms are not linked directly to one another, $L^{1-4}$ each, independently of one another, denote F, Cl, $CF_3$ or $CHF_2$, $Z^2$ and $Z^{2'}$ each, independently of one another, denote a single bond, —$CH_2CH_2$—, —CH=CH—, —$CF_2$O—, —$OCF_2$—, —$CH_2$O—, —$OCH_2$—, —COO—, —OCO—, —$C_2F_4$—, —CF=CF—, —CH=CHCH$_2$O—, p denotes 1 or 2, q denotes 0 or 1, and v denotes 1 to 6.

In the compounds of the formulae A and B, $Z^2$ can have identical or different meanings. In the compounds of the formula B, $Z^2$ and $Z^{2'}$ can have identical or different meanings.

In the compounds of the formulae A, B and C, $R^{2A}$, $R^{2B}$ and $R^{2C}$ each preferably denote alkyl having 1-6 C atoms, in particular $CH_3$, $C_2H_5$, n-$C_3H_7$, n-$C_4H_9$, n-$C_5H_{11}$.

In the compounds of the formulae A and B, $L^1$, $L^2$, $L^3$ and $L^4$ preferably denote $L^1=L^2=F$ and $L^3=L^4=F$, furthermore $L^1=F$ and $L^2=C^1$, $L^1=C^1$ and $L^2=F$, $L^3=F$ and $L^4=C^1$, $L^3=C^1$ and $L^4=F$. $Z^2$ and $Z^{2'}$ in the formulae A and B preferably each, independently of one another, denote a single bond, furthermore a —$C_2H_4$— bridge.

If $Z^2$=—$C_2H_4$— in the formula B, $Z^{2'}$ is preferably a single bond, or if $Z^{2'}$=—$C_2H_4$—, $Z^2$ is preferably a single bond.

In the compounds of the formulae A and B, (O)$C_vH_{2v+1}$ preferably denotes $OC_vH_{2v+1}$, furthermore $C_vH_{2v+1}$. In the compounds of the formula C, $(O)C_vH_{2v+1}$ preferably denotes $C_vH_{2v+1}$. In the compounds of the formula C, $L^3$ and $L^4$ preferably each denote F.
Preferred compounds of the formulae A, B and C are shown below:
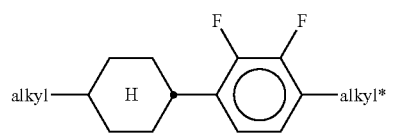
A-1
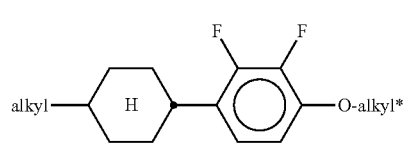
A-2
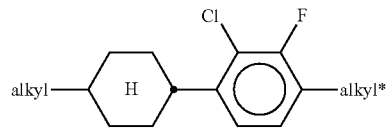
A-3
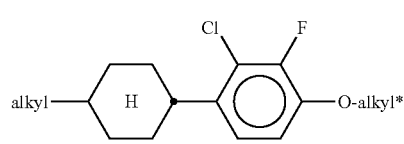
A-4
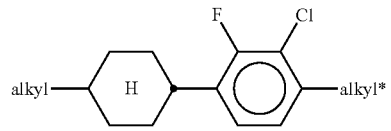
A-5
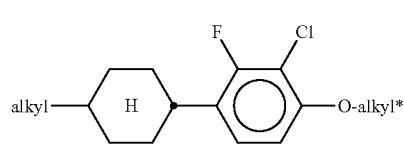
A-6
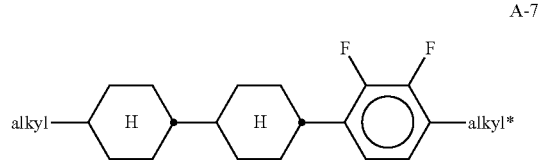
A-7
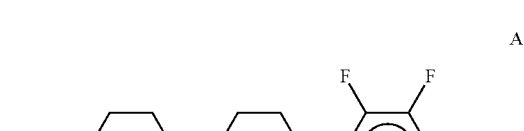
A-8
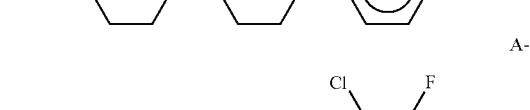
A-9
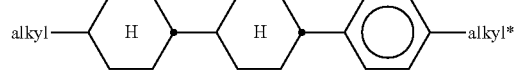
A-10
-continued
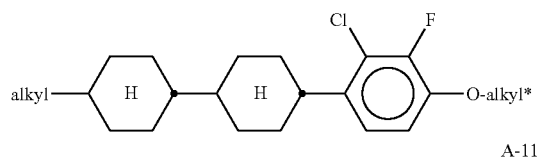
A-11
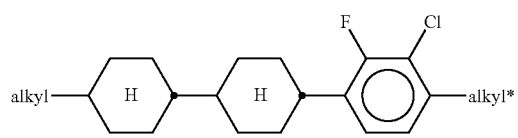
A-12
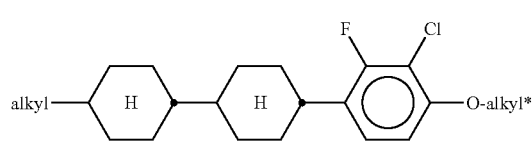
A-13
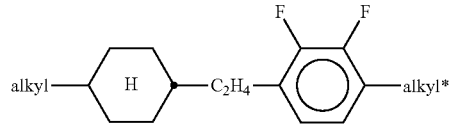
A-14
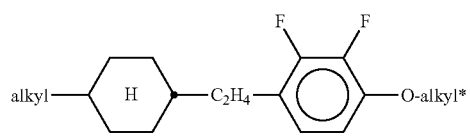
A-15
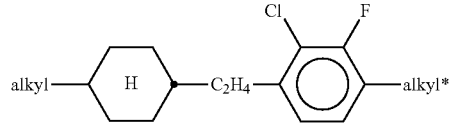
A-16
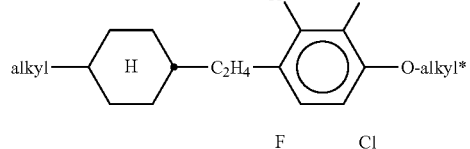
A-17
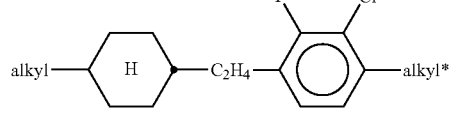
A-18
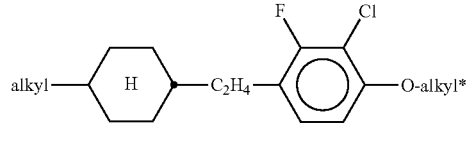
A-19
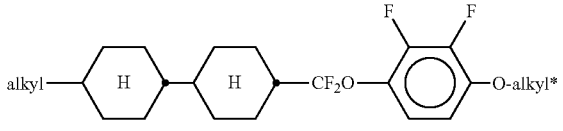
A-20
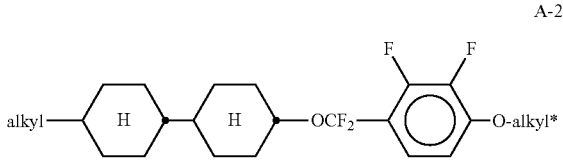

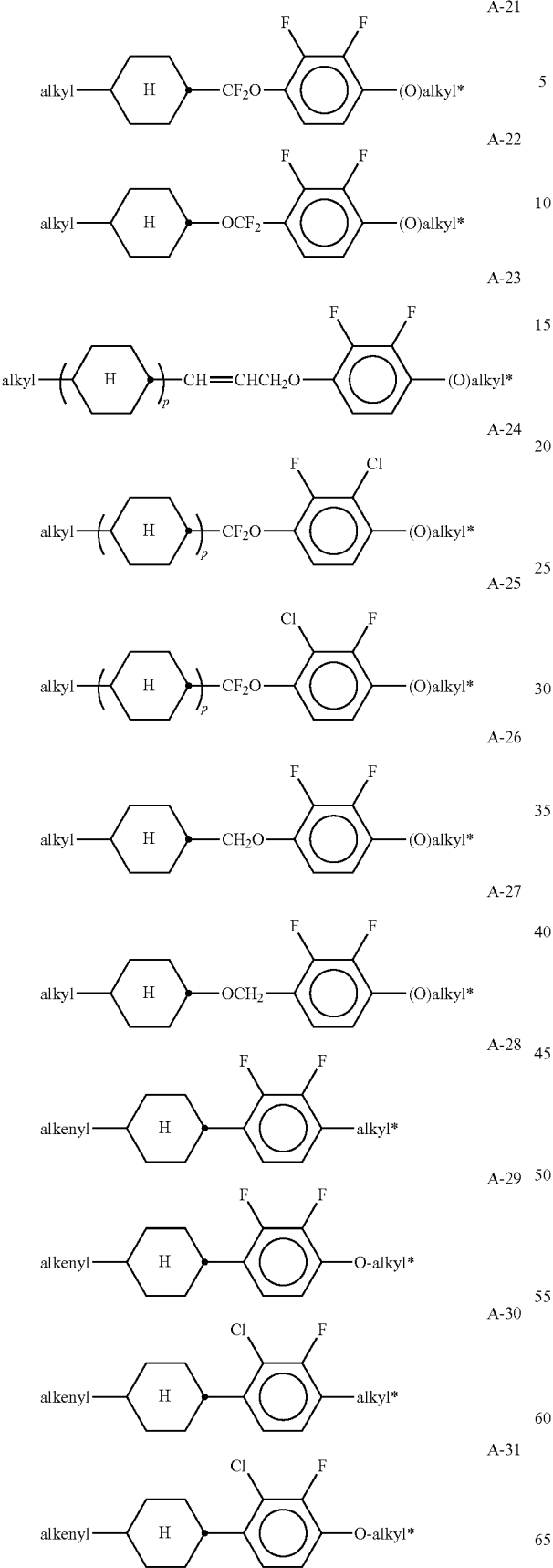

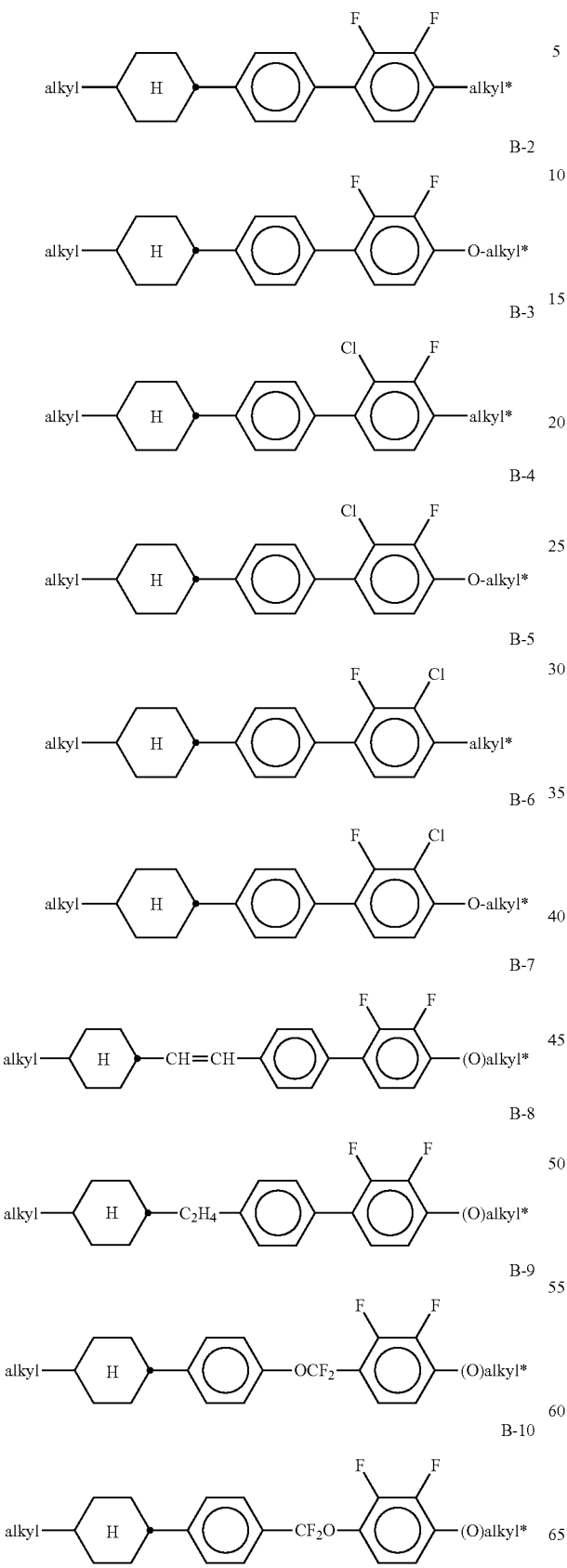
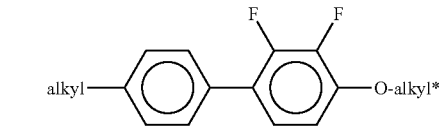
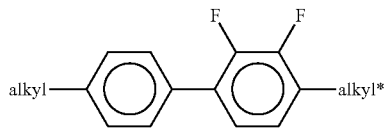
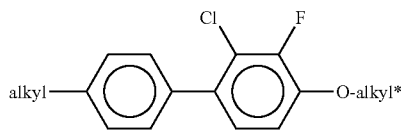
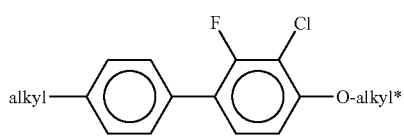
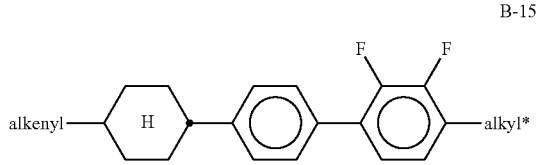
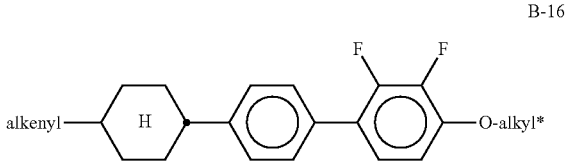

in which alkyl and alkyl* each, independently of one another, denote a straight-chain alkyl radical having 1-6 C atoms.

Particularly preferred mixtures according to the invention comprise one or more compounds of the formulae A-2, A-8, A-14, A-29, A-35, B-2, B-11, B-16 and C-1.

The proportion of compounds of the formulae A and/or B in the mixture as a whole is preferably at least 20% by weight.

Particularly preferred media according to the invention comprise at least one compound of the formula C-1, preferably in amounts of >3% by weight, in particular >5% by weight and particularly preferably 5-25% by weight.

b) LC medium which additionally comprises one or more compounds of the following formula:

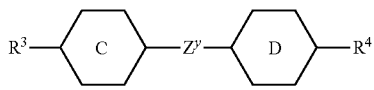

in which the individual radicals have the following meanings:

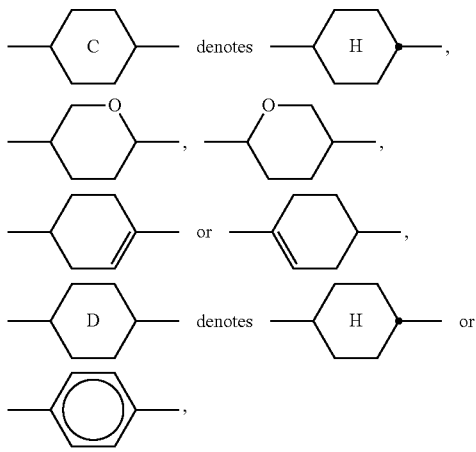

R³ and R⁴ each, independently of one another, denote alkyl having 1 to 12 C atoms, in which, in addition, one or two non-adjacent CH₂ groups may be replaced by —O—, —CH=CH—, —CO—, —O—CO— or —CO—O— in such a way that O atoms are not linked directly to one another, Z^y denotes —CH₂CH₂—, —CH=CH—, —CF₂O—, —OCF₂—, —CH₂O—, —OCH₂—, —CO—O—, —O—CO—, —C₂F₄—, —CF=CF—, —CH=CH—CH₂O— or a single bond, preferably a single bond.

The compounds of the formula ZK are preferably selected from the group consisting of the following sub-formulae:

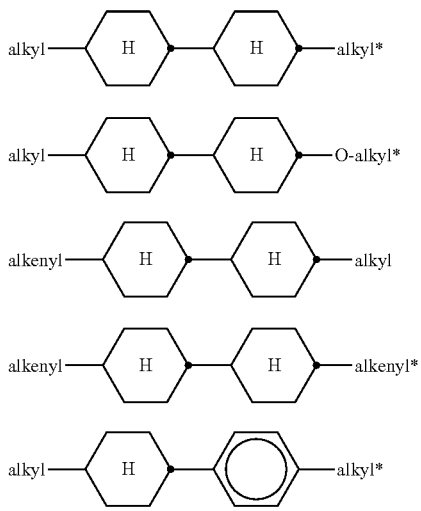

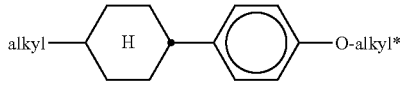

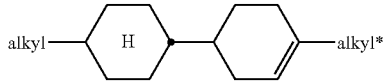

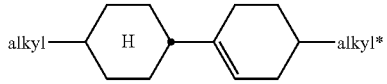

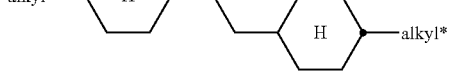

in which alkyl and alkyl* each, independently of one another, denote a straight-chain alkyl radical having 1-6 C atoms, and alkenyl and alkenyl* denote a straight-chain alkenyl radical having 2-6 C atoms. Alkenyl preferably denotes CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

c) LC medium which additionally comprises one or more compounds of the following formula:

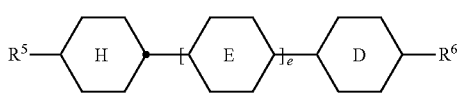

in which the individual radicals on each occurrence, identically or differently, have the following meanings:

R⁵ and R⁶ each, independently of one another, have one of the meanings indicated above for R^{3/4},

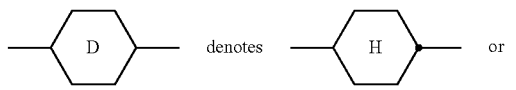

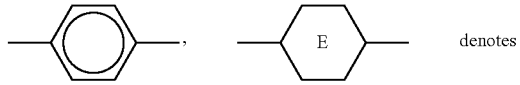

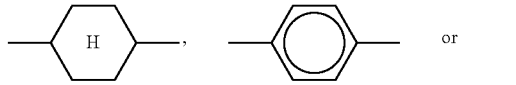

and
e denotes 1 or 2.

The compounds of the formula DK are preferably selected from the group consisting of the following sub-formulae:

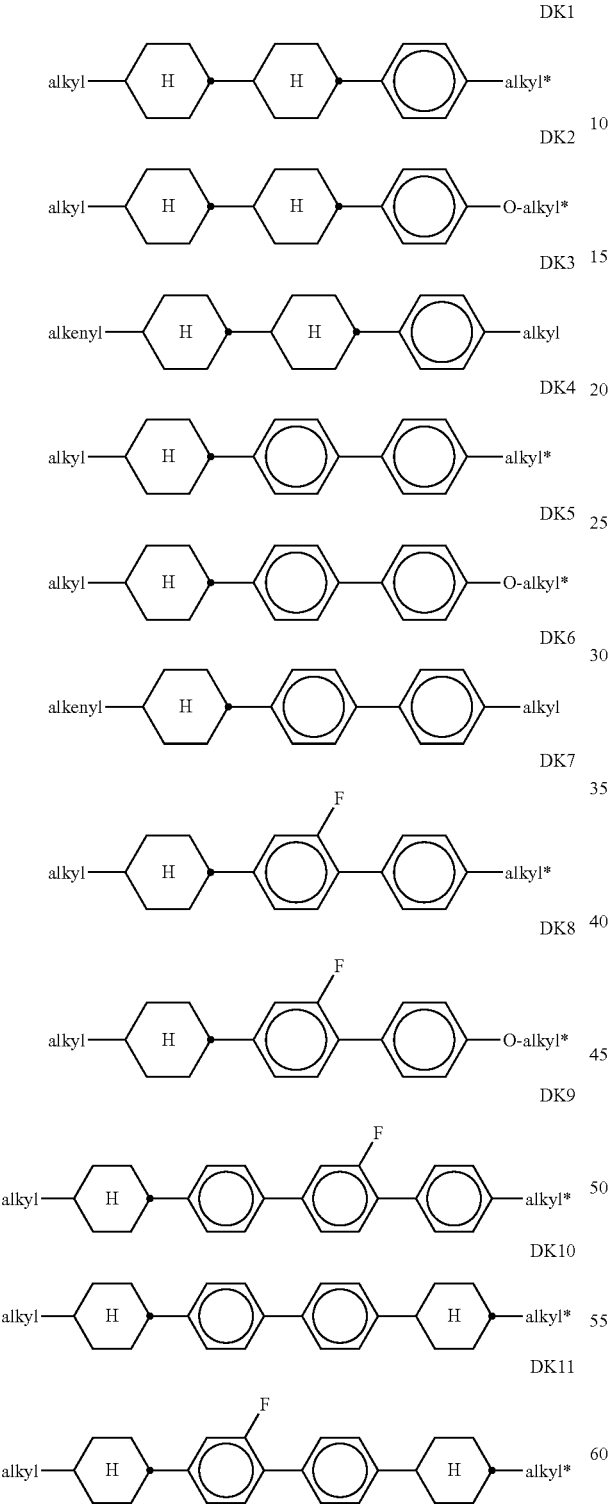

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

d) LC medium which additionally comprises one or more compounds of the following formula:

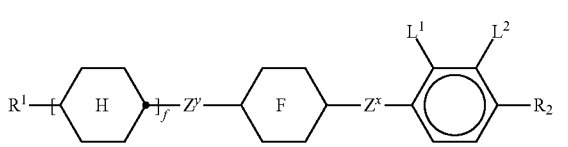

in which the individual radicals have the following meanings:

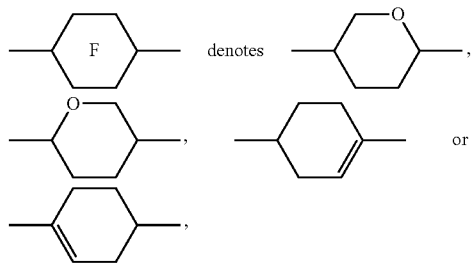

f denotes 0 or 1, $R^1$ and $R^2$ each, independently of one another, denote alkyl having 1 to 12 C atoms, where, in addition, one or two non-adjacent CH$_2$ groups may be replaced by —O—, —CH=CH—, —CF=CF—, —CO—, —O(CO)— or —(CO)O— in such a way that O atoms are not linked directly to one another, $Z^x$ and $Z^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, $L^1$ and $L^2$ each, independently of one another, denote F, Cl, OCF$_3$, CF$_3$, CH$_3$, CH$_2$F, CHF$_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

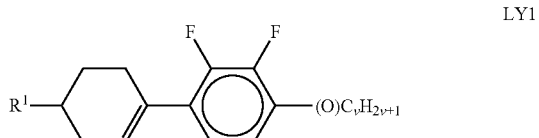

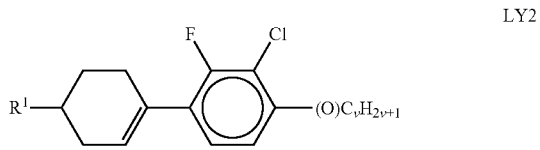

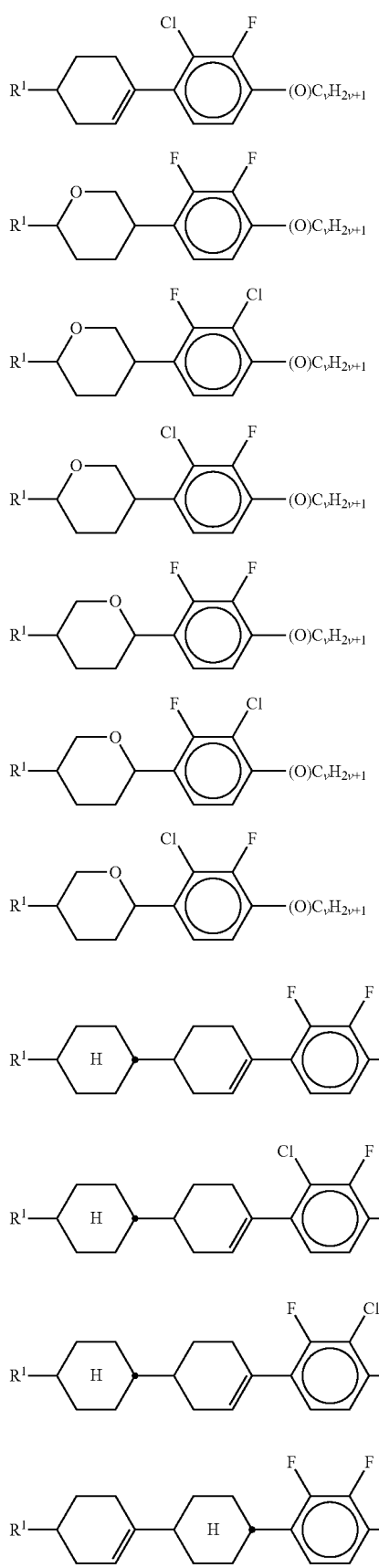

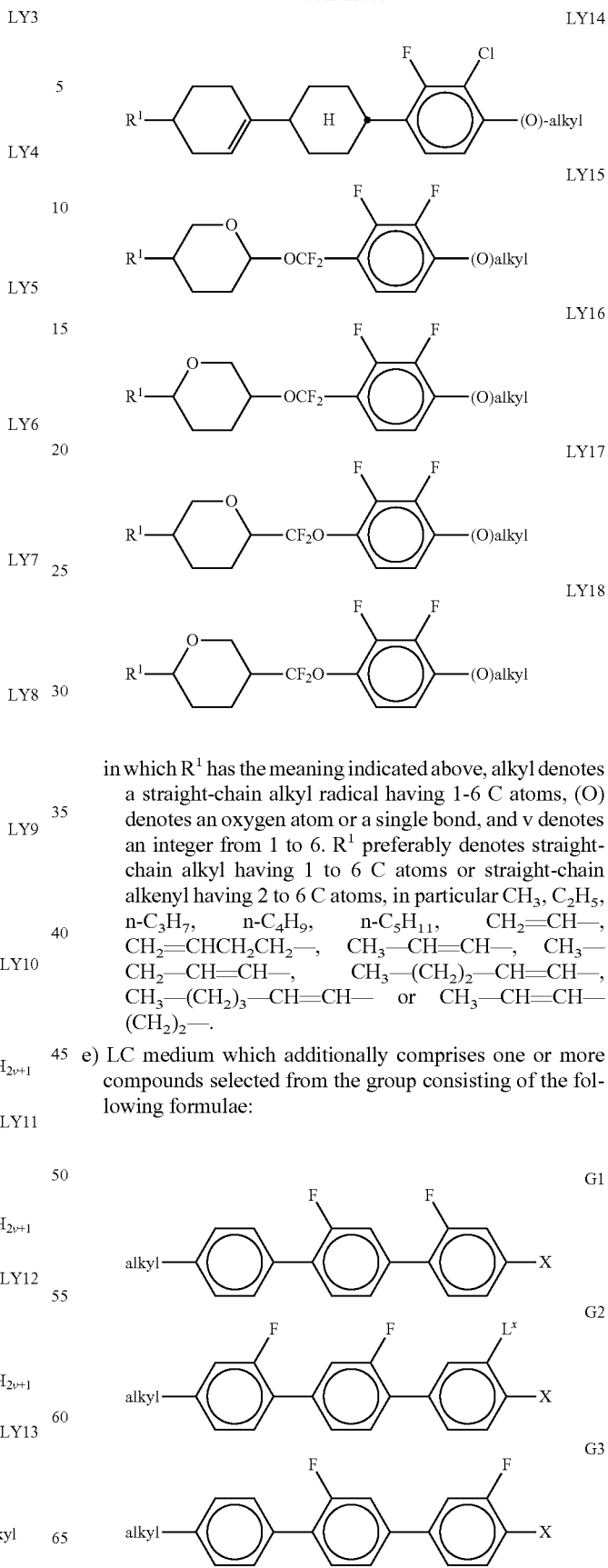

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

e) LC medium which additionally comprises one or more compounds selected from the group consisting of the following formulae:

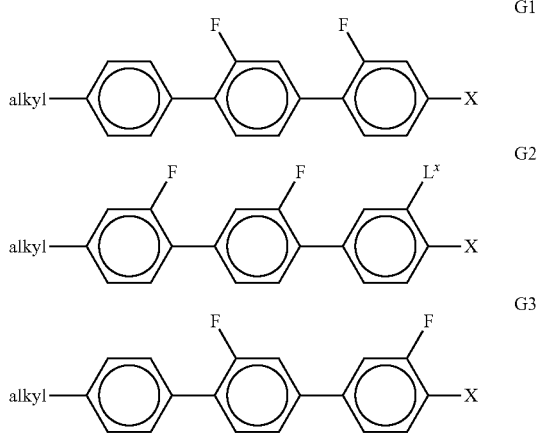

-continued

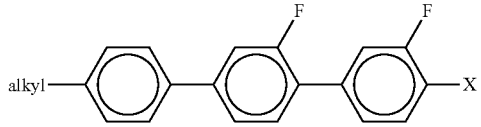
G4 in which alkyl denotes $C_{1-6}$-alkyl, $L^x$ denotes H or F, and X denotes F, Cl, $OCF_3$, $OCHF_2$ or $OCH\!=\!CF_2$. Particular preference is given to compounds of the formula G1 in which X denotes F.

f) LC medium which additionally comprises one or more compounds selected from the group consisting of the following formulae:

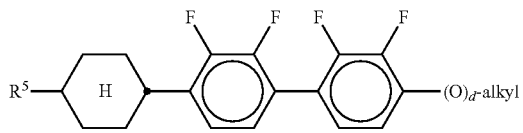
Y1

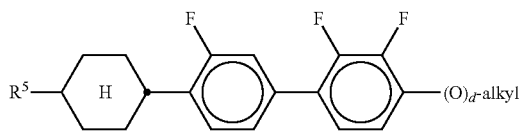
Y2

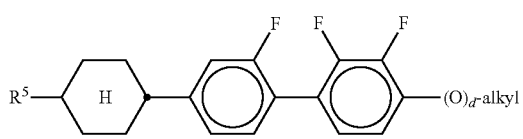
Y3

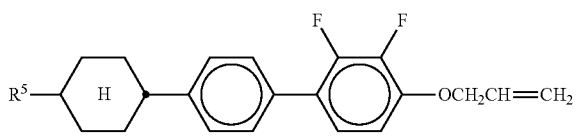
Y4

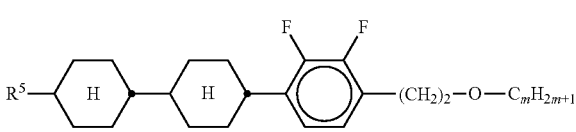
Y5

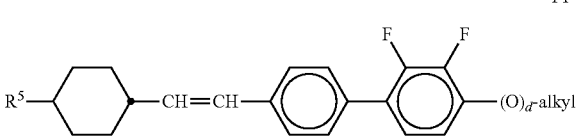
Y6

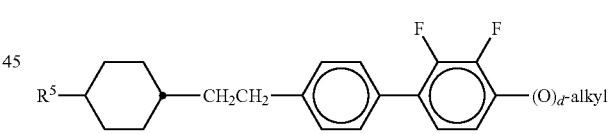
Y7

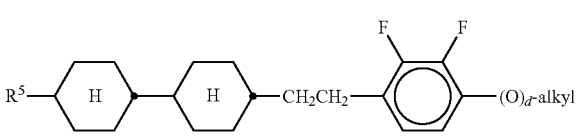
Y8

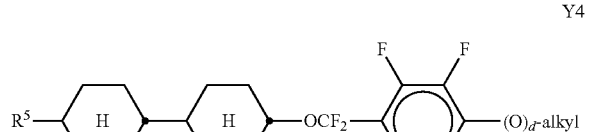
Y9

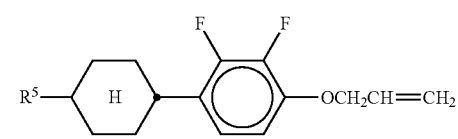
Y10

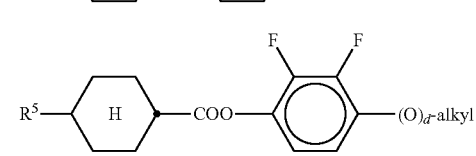
Y11

-continued

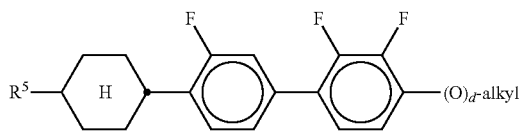
Y12

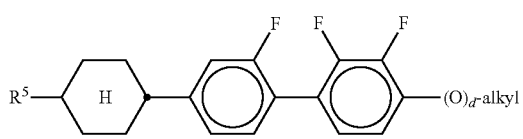
Y13

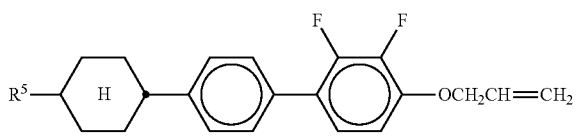
Y14

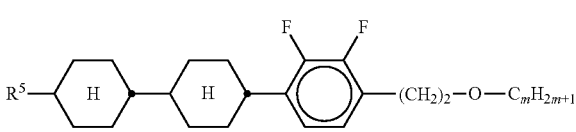
Y15

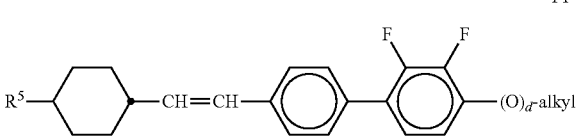
Y16 in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the abovementioned formulae in amounts of 5% by weight.

g) LC medium which additionally comprises one or more biphenyl compounds selected from the group consisting of the following formulae:

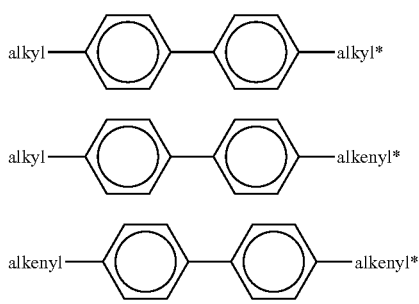

B1
B2
B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC mixture is preferably at least 3% by weight, in particular 5% by weight.

The compounds of the formula B2 are particularly preferred.

The compounds of the formulae B1 to B3 are preferably selected from the group consisting of the following sub-formulae:

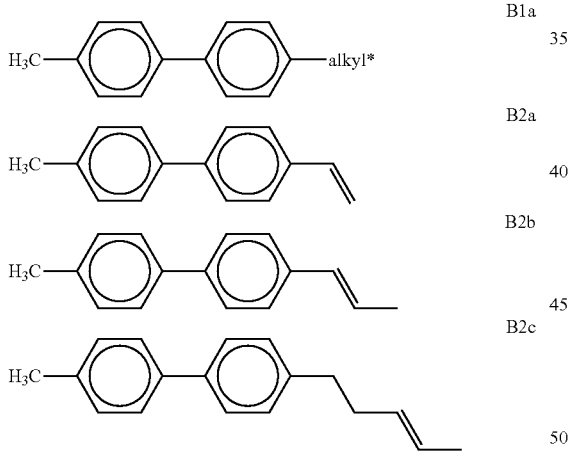

B1a
B2a
B2b
B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

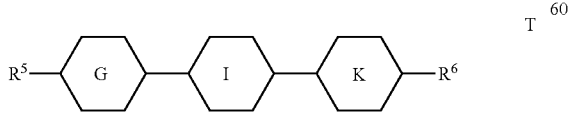

T in which $R^5$ and $R^6$ each, independently of one another, have one of the meanings indicated above for $R^1$, and

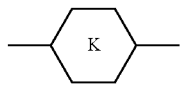

each, independently of one another, denote

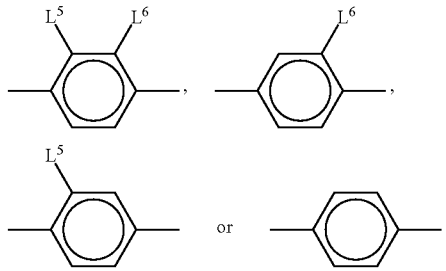

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

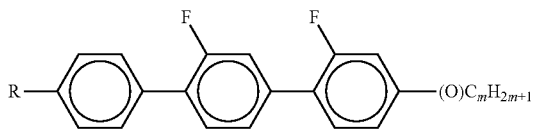

T1

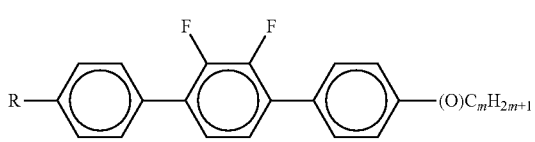

T2

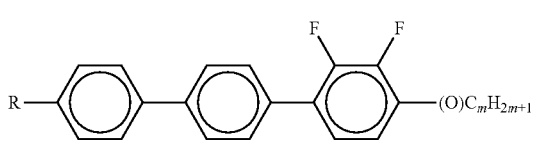

T3

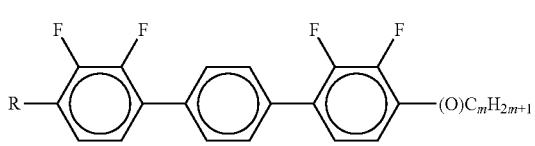

T4

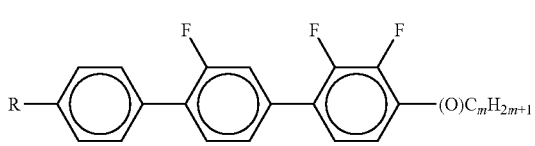

T5

T6
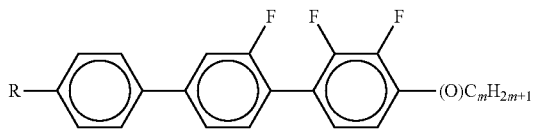
T7
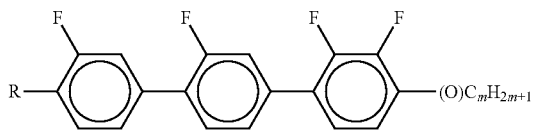
T8
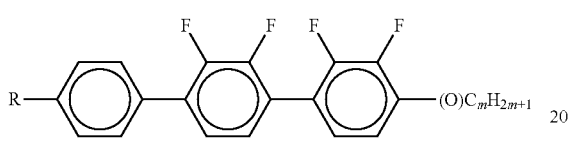
T9
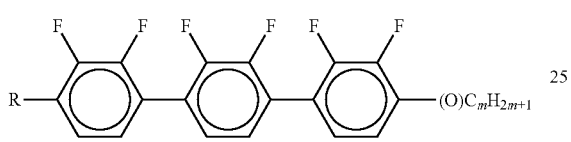
T10
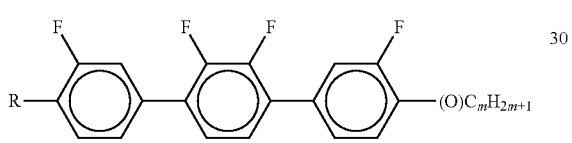
T11
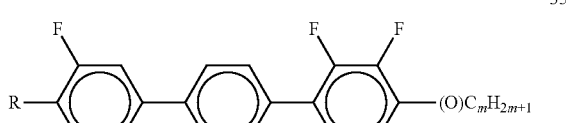
T12
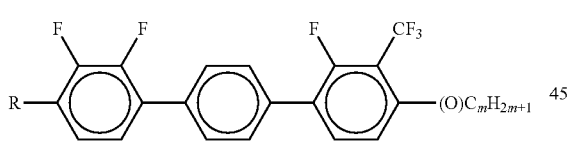
T13
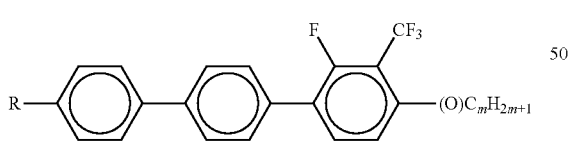
T14
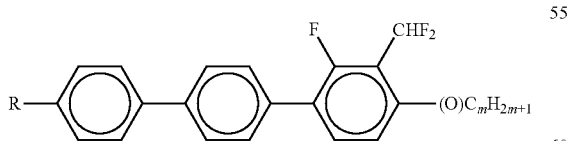
T15
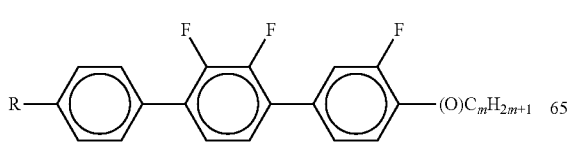
T16
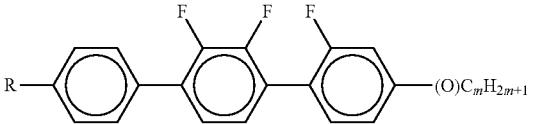
T17
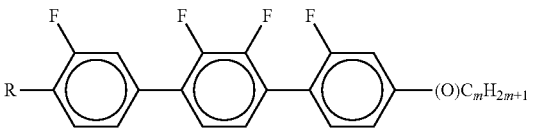
T18
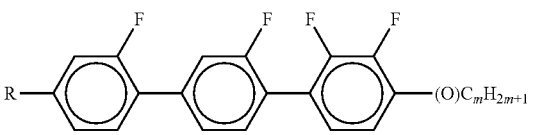
T19
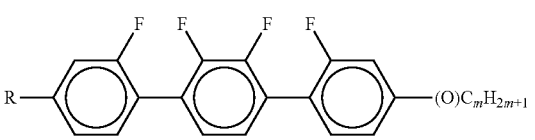
T20
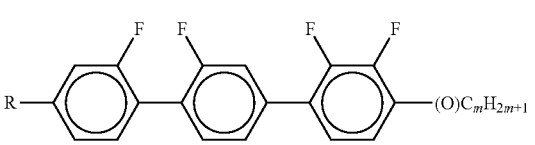
T21
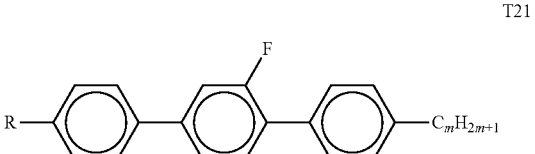
T22
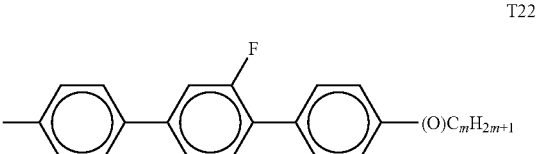
T23
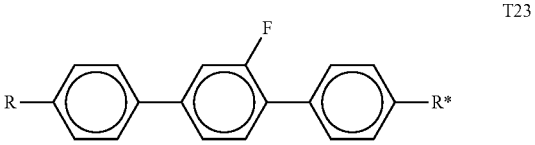
T24
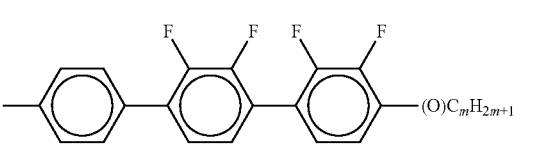
in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

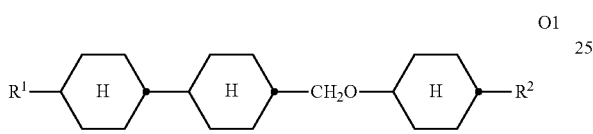
O1

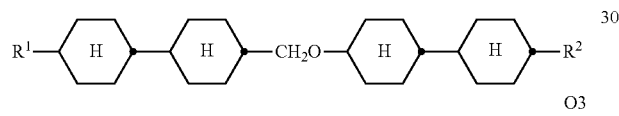
O2

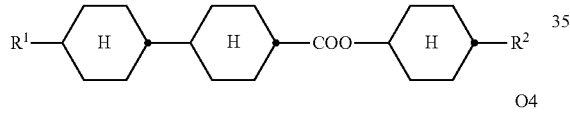
O3

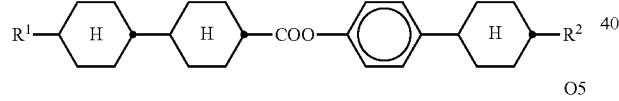
O4

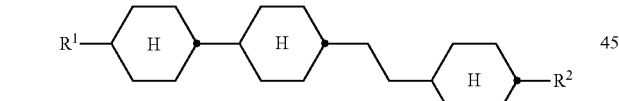
O5

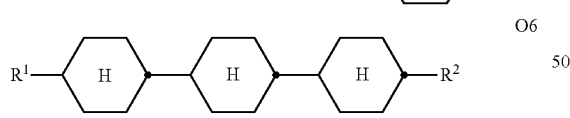
O6

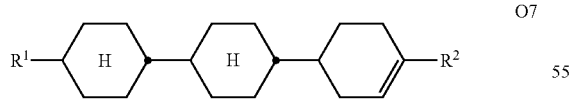
O7

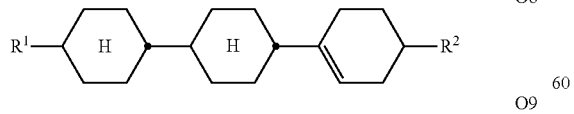
O8

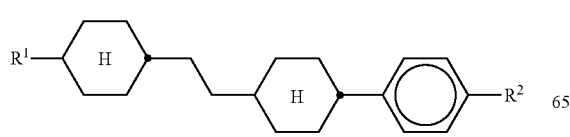
O9

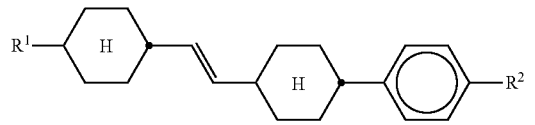
O10

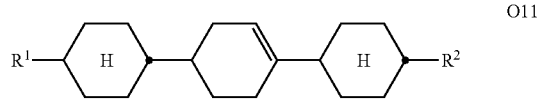
O11 in which $R^1$ and $R^2$ have the meanings indicated above for formula LY and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

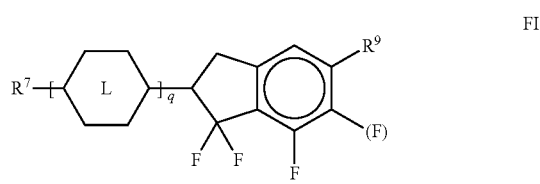
FI in which

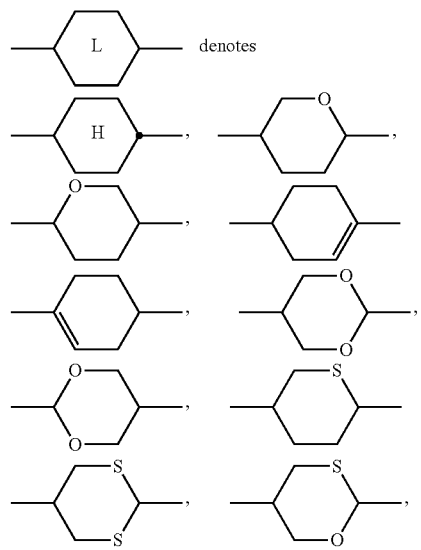

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

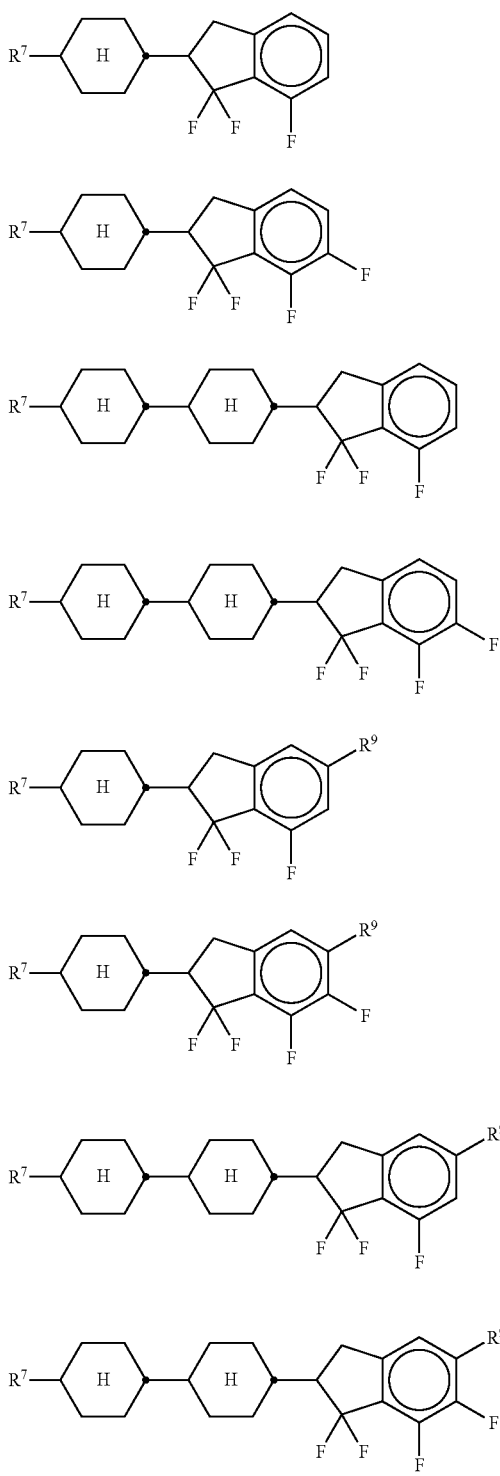

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

m) LC medium which additionally comprises one or more compounds selected from the group consisting of the following formulae:

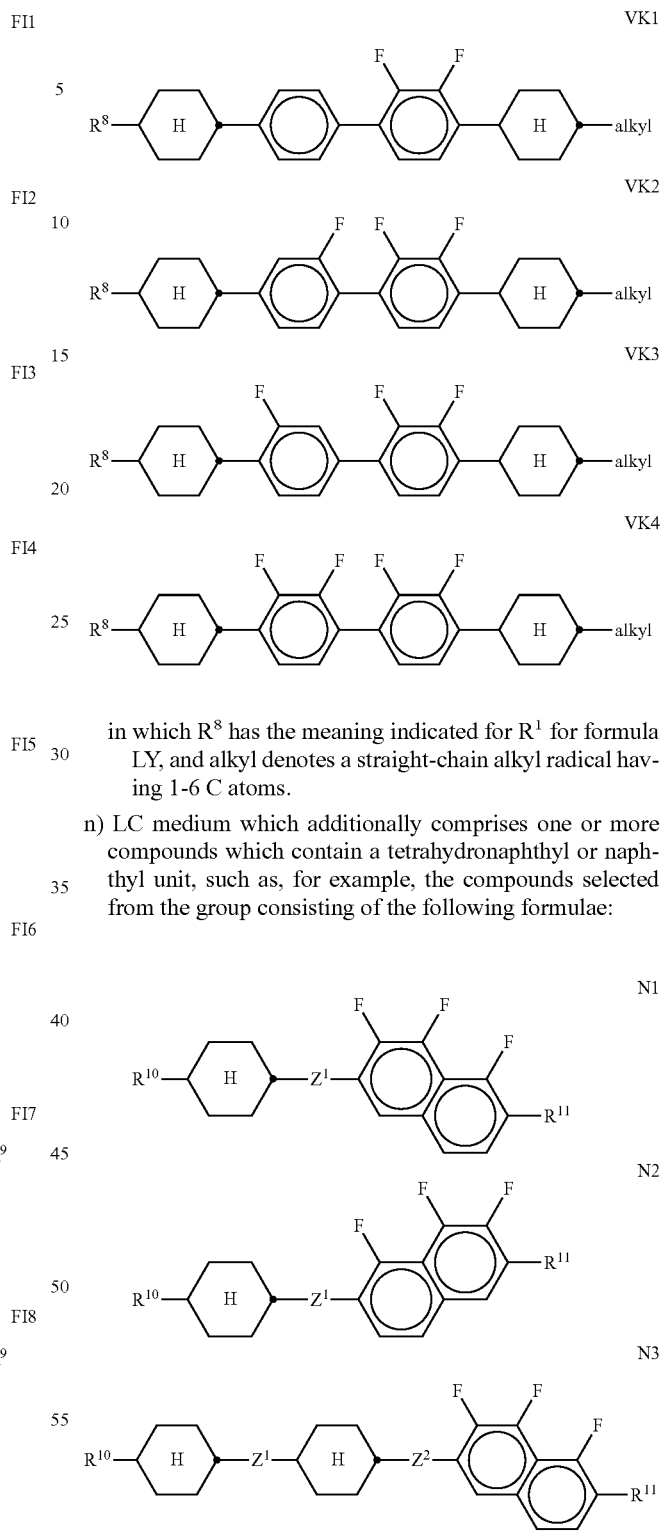

in which $R^8$ has the meaning indicated for $R^1$ for formula LY, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

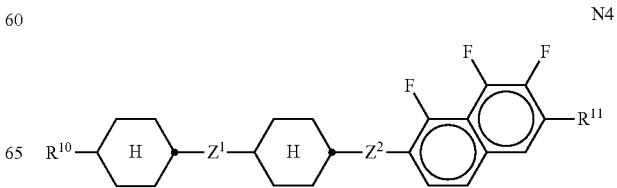

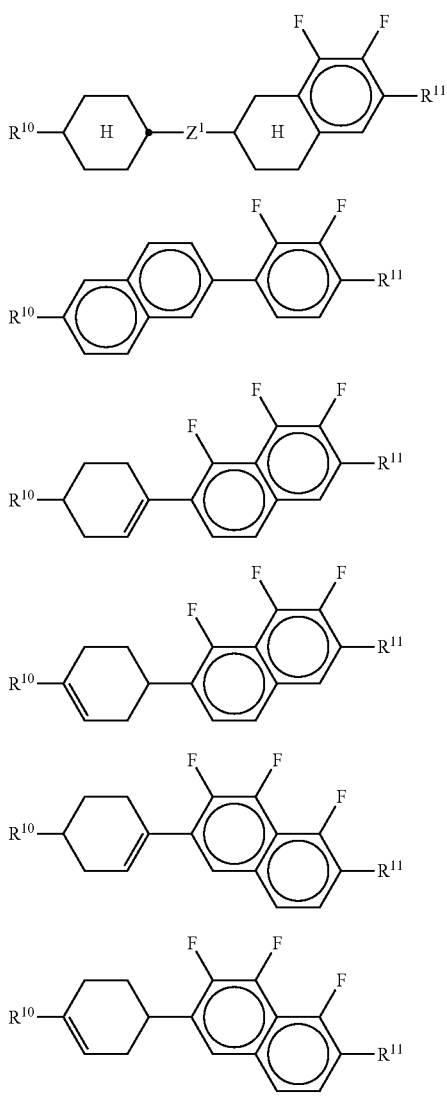

in which $R^{10}$ and $R^{11}$ each, independently of one another, have one of the meanings indicated for $R^1$ for formula LY, preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH=CH—, —$(CH_2)_4$—, —$(CH_2)_3$O—, —O—$(CH_2)_3$—, —CH=CH—$CH_2CH_2$—, —$CH_2CH_2$CH=CH—, —$CH_2$O—, —O$CH_2$—, —CO—O—, —O—CO—, —$C_2F_4$—, —CF=CF—, —CF=CH—, —CH=CF—, —$CH_2$— or a single bond.

o) LC medium which additionally comprises one or more difluorodibenzochromans and/or chromans of the following formulae:

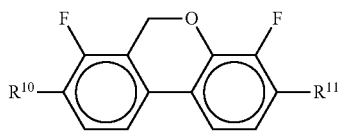

BC

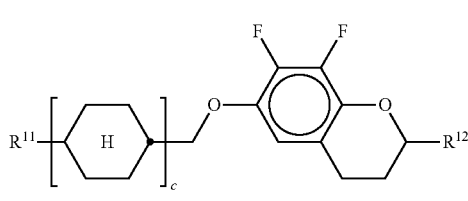

CR in which $R^{10}$ and $R^{11}$ each, independently of one another, have the meaning indicated above for $R^1$ in formula LY, and c denotes 0 or 1, preferably in amounts of 3 to 20% by weight, in particular in amounts of 3 to 15% by weight.

Particularly preferred compounds of the formulae BC and CR are selected from the group consisting of the following sub-formulae:

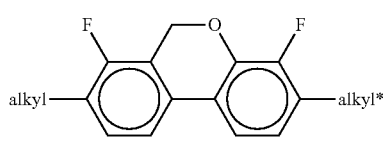

BC1

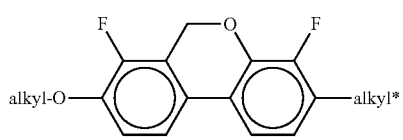

BC2

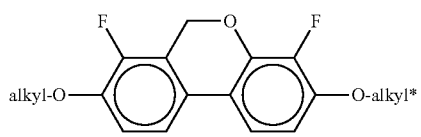

BC3

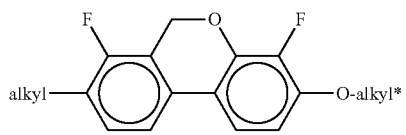

BC4

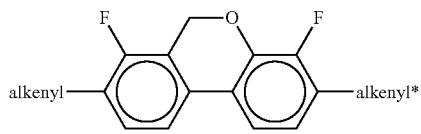

BC5

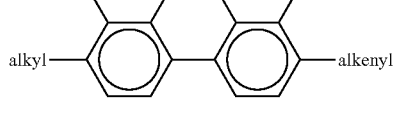

BC6

BC7

-continued

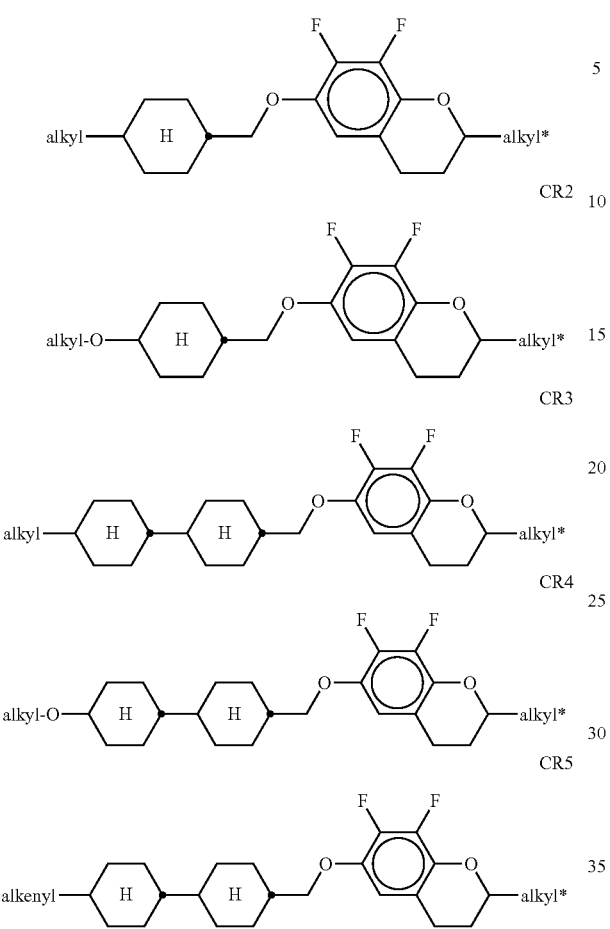

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC2.

p) LC medium which additionally comprises one or more fluorinated phenanthrenes and/or dibenzofurans of the following formulae:

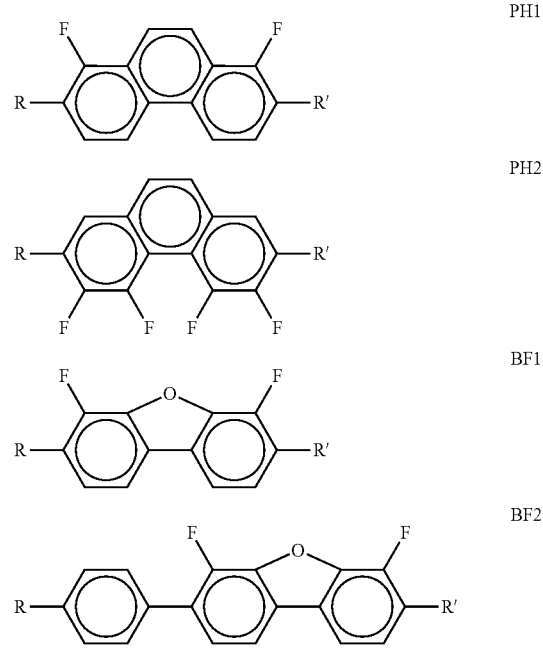

in which $R^{11}$ and $R^{12}$ each, independently of one another, have the meaning indicated above for $R^1$ in formula LY, b denotes 0 or 1, L denotes F, and r denotes 1, 2 or 3.

Particularly preferred compounds of the formulae PH and BF are selected from the group consisting of the following sub-formulae:

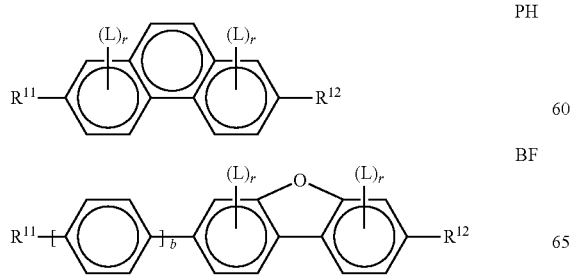

in which R and R' each, independently of one another, denote a straight-chain alkyl or alkoxy radical having 1-7 C atoms.

The liquid-crystal mixture according to the invention is dielectrically negative with a dielectric anisotropy ($\Delta\epsilon$) of ≤−1.5. The compounds of the formulae IIIA, IIIB, IIIC, LY1-LY18, Y1-Y16, T1-T24, F1, VK1-VK4, N1-N10, BC, CR, PH and BF are suitable as dielectrically negative component. The dielectrically negative compounds are preferably selected from the formulae IIIA, IIIB and IIIC. The LC medium preferably has a $\Delta\epsilon$ of −1.5 to −8.0, in particular −2.5 to −6.0.

The values of the birefringence $\Delta n$ in the liquid-crystal mixture are generally between 0.07 and 0.16, preferably between 0.08 and 0.12. The rotational viscosity $\gamma_1$ at 20° C. before the polymerisation is preferably ≤165 mPa·s, in particular ≤140 mPa·s.

Preferred embodiments of the liquid-crystalline medium having positive dielectric anisotropy according to the invention are indicated below:

LC medium which additionally comprises one or more compounds of the formulae II and/or III:

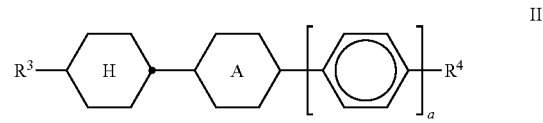

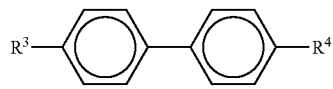
III in which ring A denotes 1,4-phenylene or trans-1,4-cyclohexylene, a is 0 or 1, $R^3$ in each case, independently of one another, denotes alkyl having 1 to 9 C atoms or alkenyl having 2 to 9 C atoms, preferably alkenyl having 2 to 9 C atoms, and $R^4$ in each case, independently of one another, denotes an unsubstituted or halogenated alkyl radical having 1 to 12 C atoms, where, in addition, one or two non-adjacent CH$_2$ groups may be replaced by —O—, —CH=CH—, —CH=CF—, —(CO)—, —O(CO)— or —(CO)O— in such a way that O atoms are not linked directly to one another, and preferably denotes alkyl having 1 to 12 C atoms or alkenyl having 2 to 9 C atoms.

The compounds of the formula II are preferably selected from the group consisting of the following formulae:

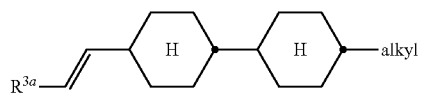
IIa

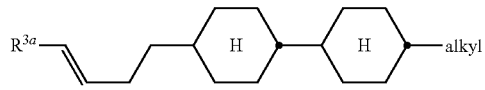
IIb

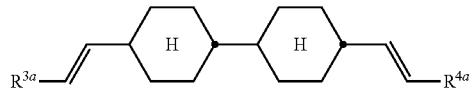
IIc

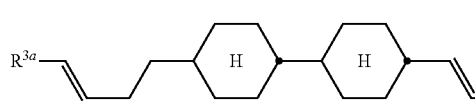
IId

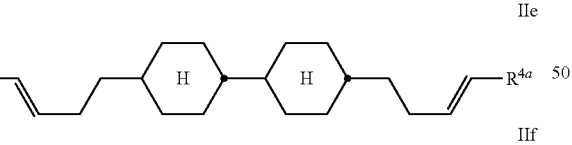
IIe

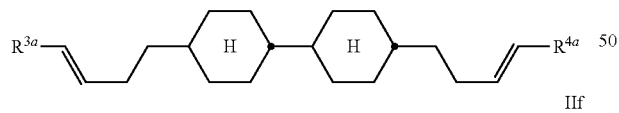
IIf

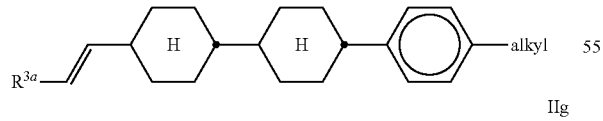
IIg

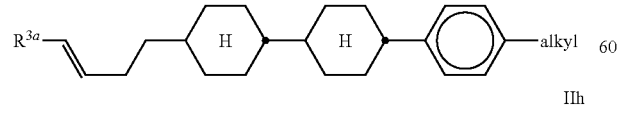
IIh

IIi

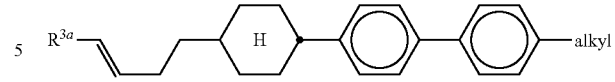

in which $R^{3a}$ and $R^{4a}$ each, independently of one another, denote H, CH$_3$, C$_2$H$_5$ or C$_3$H$_7$, and "alkyl" denotes a straight-chain alkyl group having 1 to 8, preferably 1, 2, 3, 4 or 5, C atoms. Particular preference is given to compounds of the formulae IIa and IIf, in particular those in which $R^{3a}$ denotes H or CH$_3$, preferably H, and compounds of the formula IIc, in particular those in which $R^{3a}$ and $R^{4a}$ denote H, CH$_3$ or C$_2$H$_5$.

The compounds of the formula III are preferably selected from the group consisting of the following formulae:

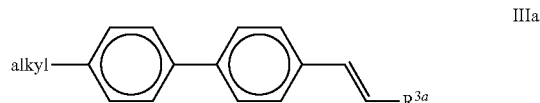
IIIa

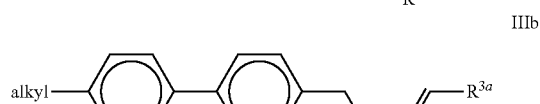
IIIb in which "alkyl" and $R^{3a}$ have the meanings indicated above, and $R^{1a}$ preferably denotes H or CH$_3$. Particular preference is given to compounds of the formula IIIb;

LC medium which additionally comprises one or more compounds selected from the group consisting of the following formulae:

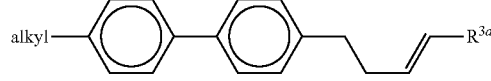
IV

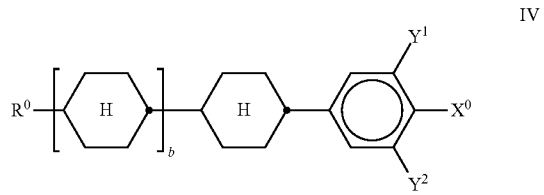
V

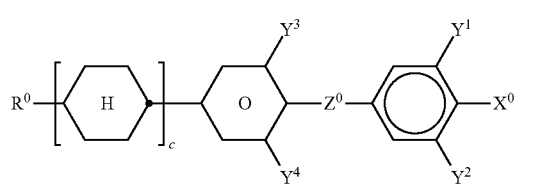
VI

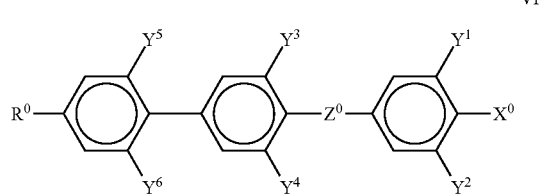

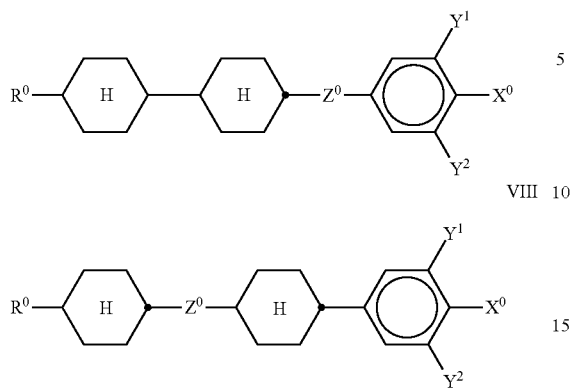

VII

VIII in which
- $R^0$ denotes an alkyl or alkoxy radical having 1 to 15 C atoms, where, in addition, one or more $CH_2$ groups in these radicals may each be replaced, independently of one another, by —C≡C—, —$CF_2$O—, —CH=CH—, cyclopropyl, cyclobutyl, -O-, —(CO)O— or —O(CO)— in such a way that O atoms are not linked directly to one another, and in which, in addition, one or more H atoms may be replaced by halogen,
- $X^0$ denotes F, Cl, CN, $SF_5$, SCN, NCS, a halogenated alkyl radical, halogenated alkenyl radical, halogenated alkoxy radical or halogenated alkenyloxy radical, each having up to 6 C atoms,
- $Y^{1-6}$ each, independently of one another, denote H or F,
- $Z^0$ denotes —$C_2H_4$—, —$(CH_2)_4$—, —CH=CH—, —CF=CF—, —$C_2F_4$—, —$CH_2CF_2$—, —$CF_2CH_2$—, —$CH_2$O—, —$OCH_2$—, —COO—, —$CF_2$O— or —$OCF_2$—, in the formulae V and VI also a single bond, and
- b and c each, independently of one another, denote 0 or 1.

In the compounds of the formulae IV to VIII, $X^0$ preferably denotes F or $OCF_3$, furthermore $OCHF_2$, $CF_3$, $CF_2H$, Cl, OCH=$CF_2$. $R^0$ is preferably straight-chain alkyl or alkenyl, each having up to 6 C atoms.

The compounds of the formula IV are preferably selected from the group consisting of the following formulae:

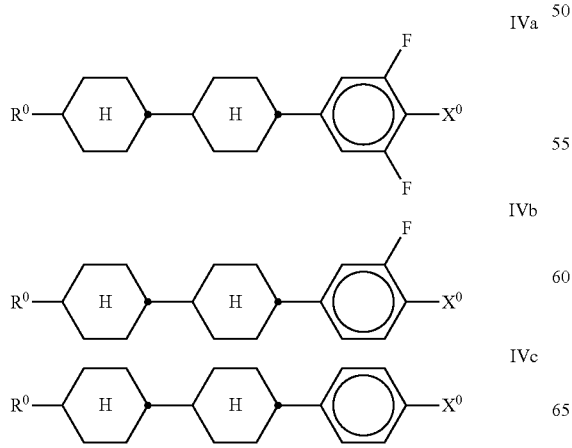

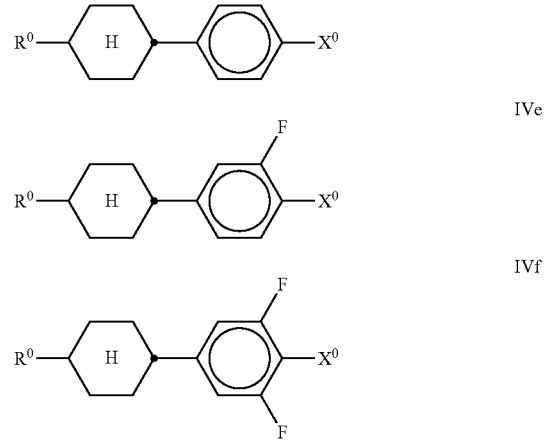

in which $R^0$ and $X^0$ have the meanings indicated above.

In formula IV, $R^0$ preferably denotes alkyl having 1 to 8 C atoms and $X^0$ preferably denotes F, Cl, $OCHF_2$ or $OCF_3$, furthermore OCH=$CF_2$. In the compound of the formula IVb, $R^0$ preferably denotes alkyl or alkenyl. In the compound of the formula IVd, $X^0$ preferably denotes Cl, furthermore F.

The compounds of the formula V are preferably selected from the group consisting of the following formulae:

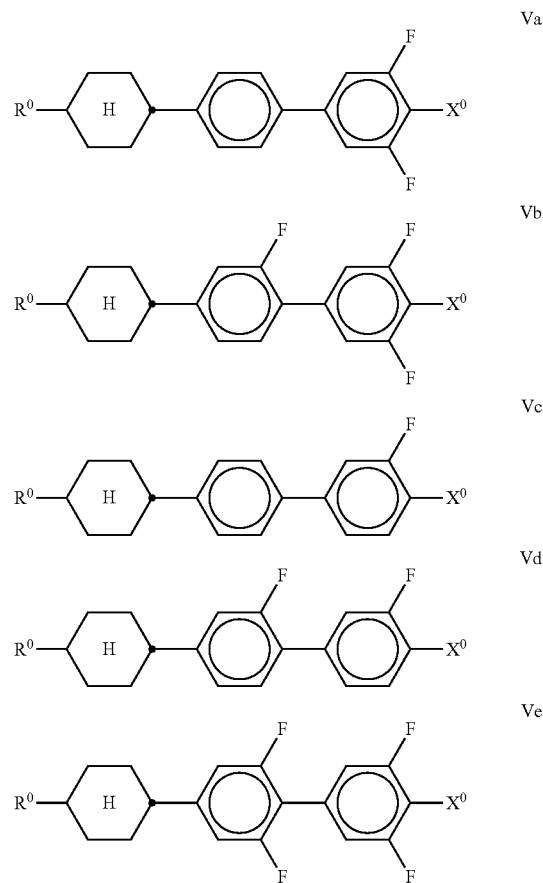

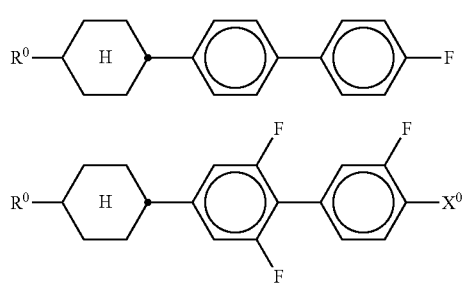
Vf

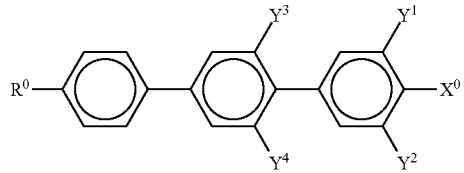
Vg in which R⁰ and X⁰ have the meanings indicated above. In formula V, R⁰ preferably denotes alkyl having 1 to 8 C atoms and X⁰ preferably denotes F;

LC medium which comprises one or more compounds of the formula VI-1.

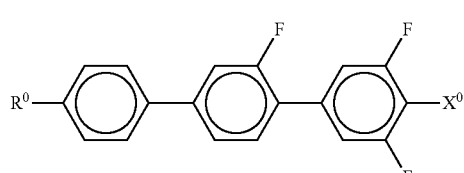
VI-1 particularly preferably those selected from the group consisting of the following formulae:

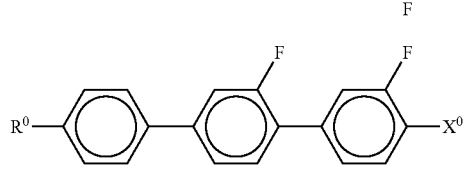
VI-1a

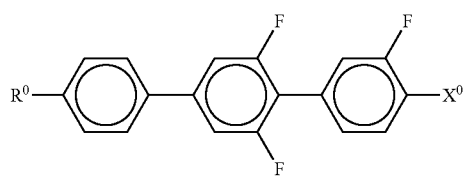
VI-1b

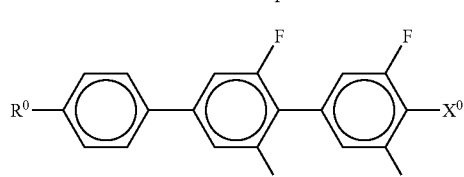
VI-1c

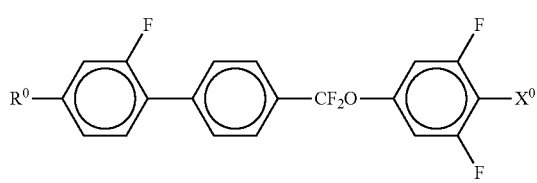
VI-1d in which R⁰ and X⁰ have the meanings indicated above. In formula VI, R⁰ preferably denotes alkyl having 1 to 8 C atoms and X⁰ preferably denotes F, furthermore OCF₃.

LC medium which comprises one or more compounds of the formula VI-2:

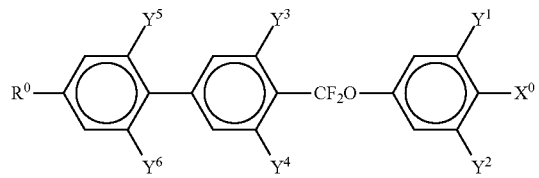
VI-2 particularly preferably those selected from the group consisting of the following formulae:

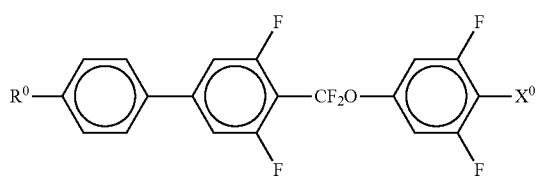
VI-2a

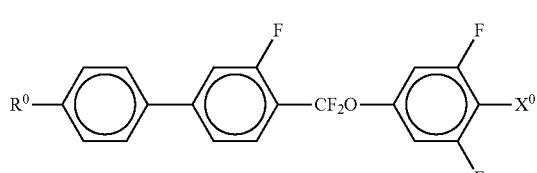
VI-2b

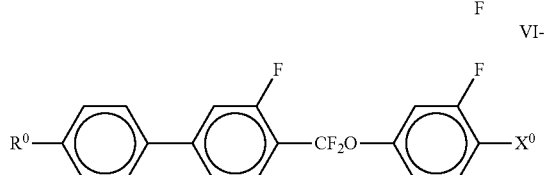
VI-2c

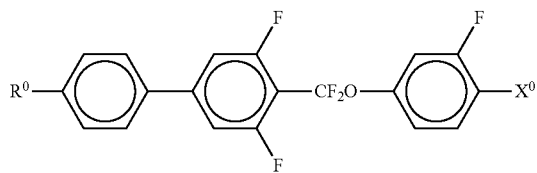
VI-2d

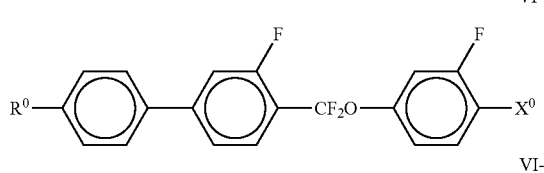
VI-2e

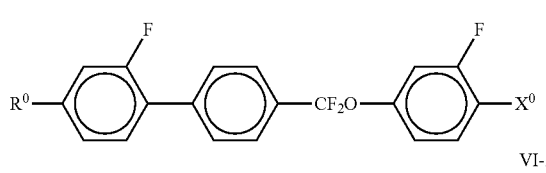
VI-2f in which R⁰ and X⁰ have the meanings indicated above. In formula VI, R⁰ preferably denotes alkyl having 1 to 8 C atoms and X⁰ preferably denotes F;

LC medium which preferably comprises one or more compounds of the formula VII in which Z⁰ denotes —CF$_2$O—, —CH$_2$CH$_2$— or —(CO)O—, particularly preferably those selected from the group consisting of the following formulae:

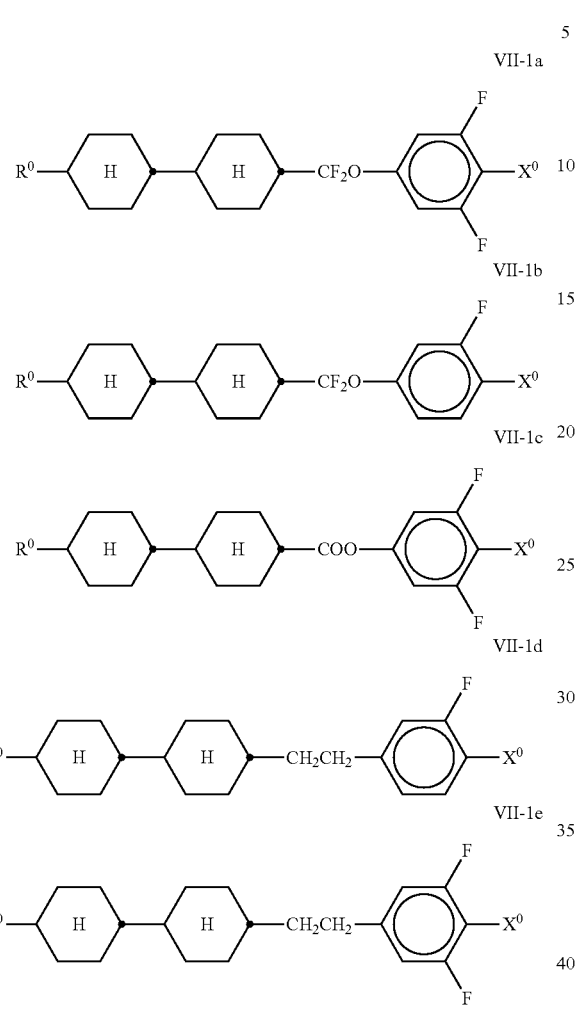

VII-1a
VII-1b
VII-1c
VII-1d
VII-1e in which R$^0$ and X$^0$ have the meanings indicated above. In formula VII, R$^0$ preferably denotes alkyl having 1 to 8 C atoms and X$^0$ preferably denotes F, furthermore OCF$_3$.

The compounds of the formula VIII are preferably selected from the group consisting of the following formulae:

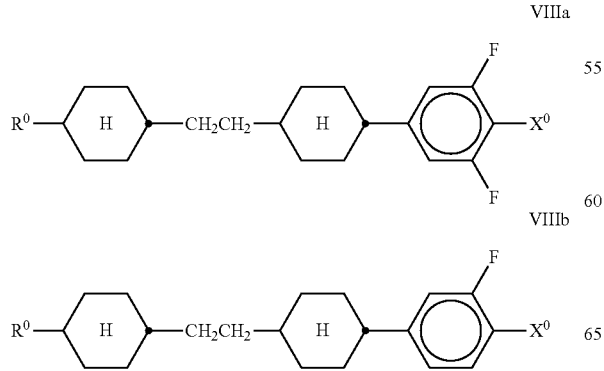

VIIIa
VIIIb
VIIIc

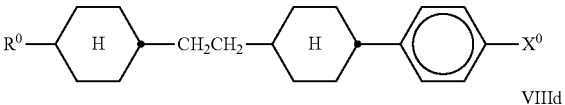

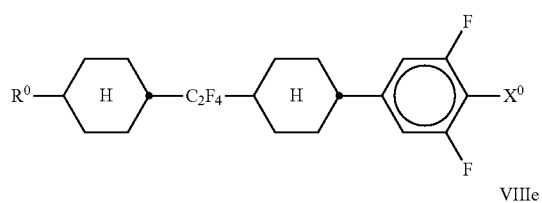

VIIId
VIIIe

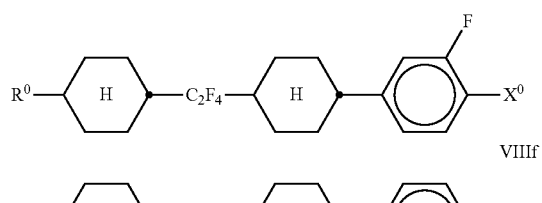

VIIIf in which R$^0$ and X$^0$ have the meanings indicated above. R$^0$ preferably denotes a straight-chain alkyl radical having 1 to 8 C atoms. X$^0$ preferably denotes F.

LC medium which additionally comprises one or more compounds of the following formula:

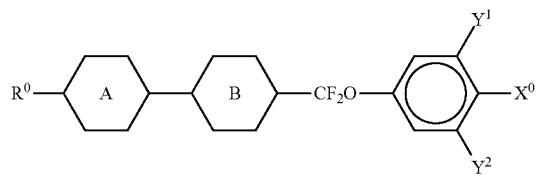

IX in which R$^0$, X$^0$, Y$^1$ and Y$^2$ have the meanings indicated above, and

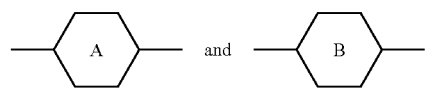

each, independently of one another, denote

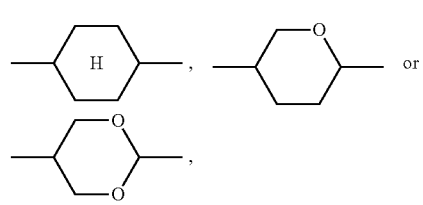

where the rings A and B do not both simultaneously denote cyclohexylene;

The compounds of the formula IX are preferably selected from the group consisting of the following formulae:

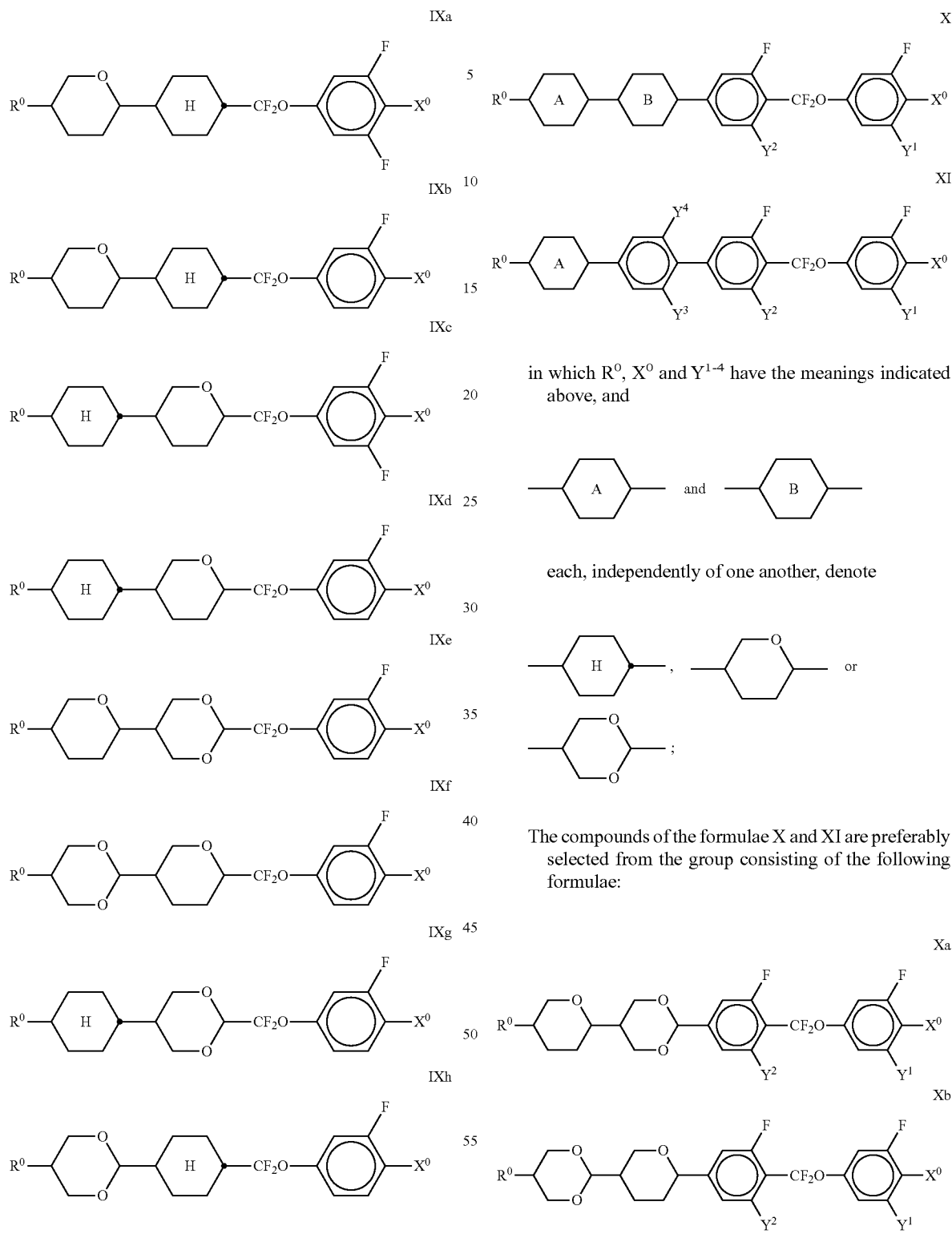

in which $R^0$ and $X^0$ have the meanings indicated above. $R^0$ preferably denotes alkyl having 1 to 8 C atoms and $X^0$ preferably denotes F. Particular preference is given to compounds of the formula IXa;

LC medium which additionally comprises one or more compounds selected from the group consisting of the following formulae:

in which $R^0$, $X^0$ and $Y^{1-4}$ have the meanings indicated above, and each, independently of one another, denote The compounds of the formulae X and XI are preferably selected from the group consisting of the following formulae:

-continued

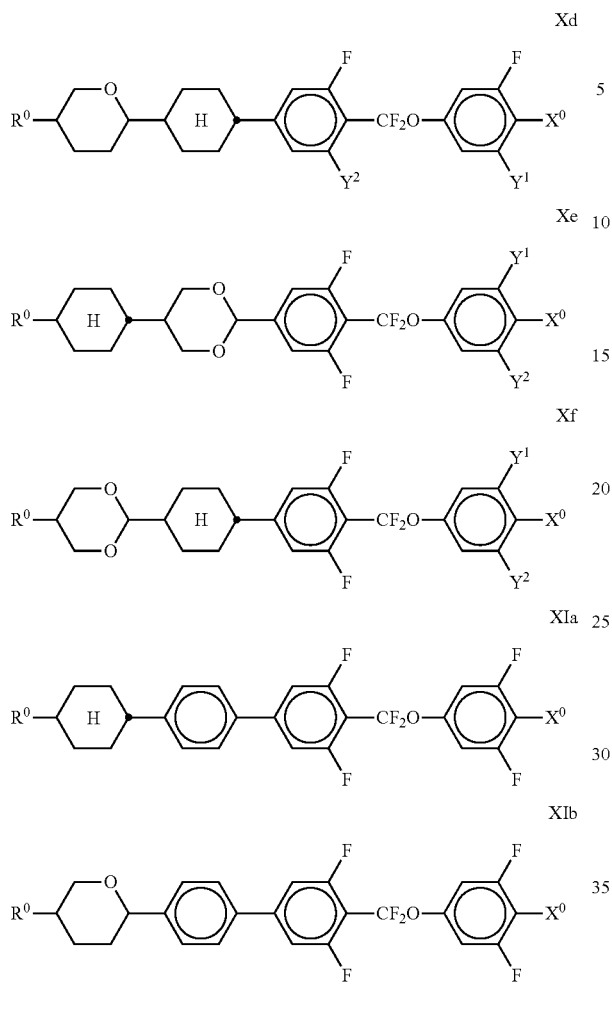

in which $R^0$ and $X^0$ have the meanings indicated above. $R^0$ preferably denotes alkyl having 1 to 8 C atoms and/or $X^0$ preferably denotes F. Particularly preferred compounds are those in which $Y^1$ denotes F and $Y^2$ denotes H or F, preferably F;

LC medium which additionally comprises one or more compounds of the following formula XII:

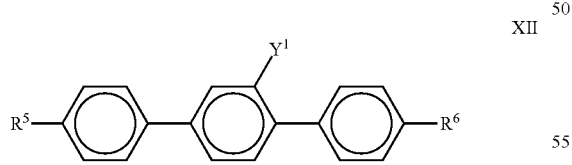

in which $R^5$ and $R^6$ each, independently of one another, denote n-alkyl, alkoxy, oxaalkyl, fluoroalkyl or alkenyl, each having up to 9 C atoms, and preferably each, independently of one another, denote alkyl having 1 to 7 C atoms or alkenyl having 2 to 7 C atoms. $Y^1$ denotes H or F.

Preferred compounds of the formula XII are those selected from the group consisting of the following formulae:

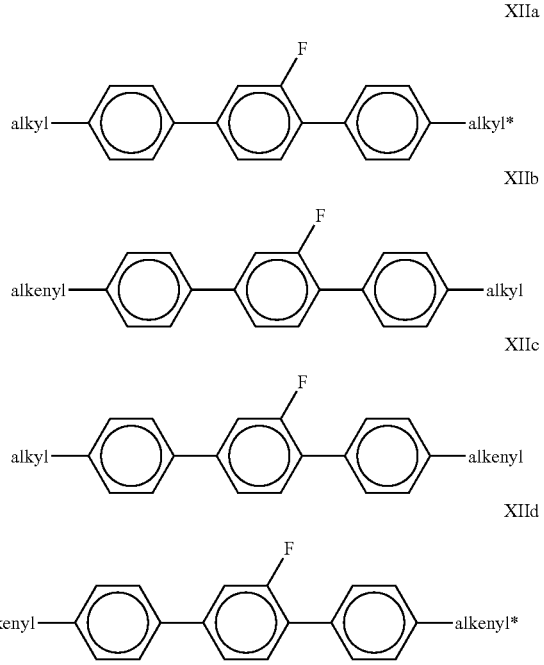

in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

Very particular preference is given to compounds of the following formula:

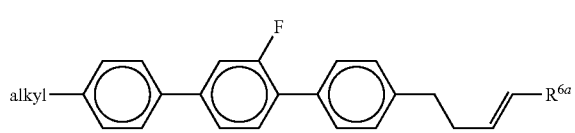

in which alkyl has the meaning indicated above, and $R^{6a}$ denotes H or $CH_3$.

LC medium which additionally comprises one or more compounds selected from the group consisting of the following formulae:

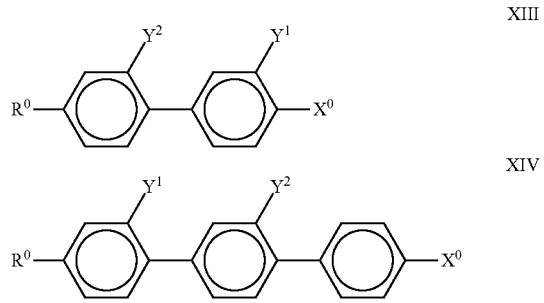

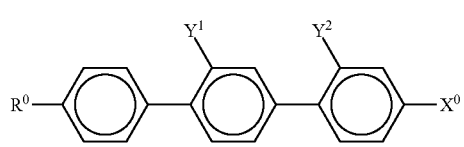
XV

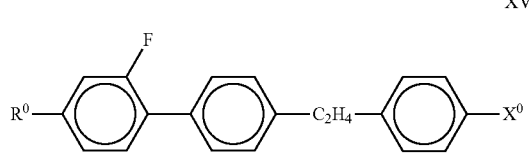
XVI in which R⁰, X⁰, Y¹ and Y² have the meanings indicated above. R⁰ preferably denotes alkyl having 1 to 8 C atoms and X⁰ preferably denotes F or Cl;

The compounds of the formulae XIII and XIV are preferably selected from the group consisting of the following formulae:

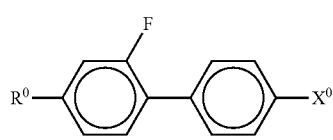
XIIIa

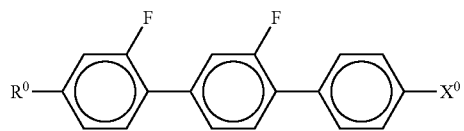
XIVa

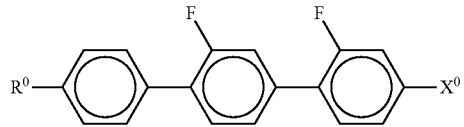
XVa in which R⁰ and X⁰ have the meanings indicated above. R⁰ preferably denotes alkyl having 1 to 8 C atoms. In the compounds of the formula XIII, X⁰ preferably denotes F or Cl.

LC medium which additionally comprises one or more compounds of the formulae D1 and/or D2:

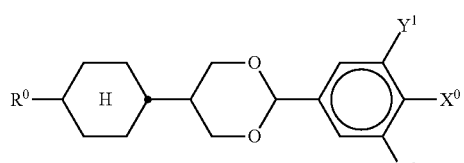
D1

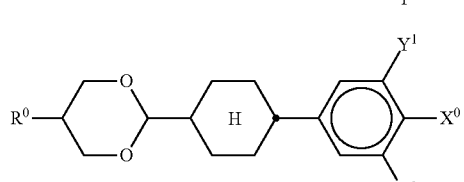
D2 in which Y¹, Y², R⁰ and X⁰ have the meanings indicated above. R⁰ preferably denotes alkyl having 1 to 8 C atoms and X⁰ preferably denotes F. Particular preference is given to compounds of the following formulae:

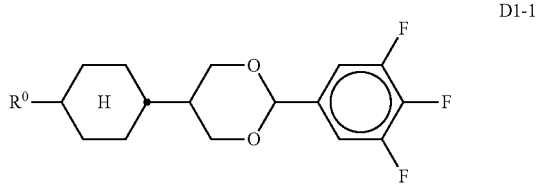
D1-1

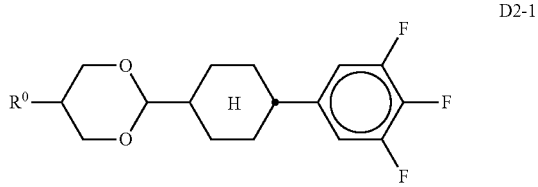
D2-1 in which R⁰ has the meaning indicated above and preferably denotes straight-chain alkyl having 1 to 6 C atoms, in particular $C_2H_5$, $n\text{-}C_3H_7$ or $n\text{-}C_5H_{11}$.

LC medium which additionally comprises one or more compounds of the following formulae:

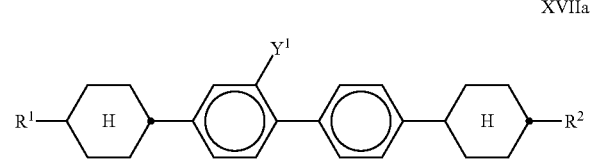
XVIIa

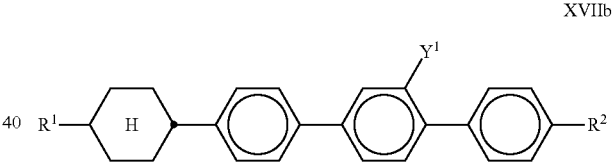
XVIIb in which Y¹, R¹ and R² have the meanings indicated above. R¹ and R² preferably each, independently of one another, denote alkyl having 1 to 8 C atoms. Y¹ preferably denotes F. Preferred media comprise 1-15% by weight, in particular 1-10% by weight, of these compounds.

LC medium which additionally comprises one or more compounds of the following formula:

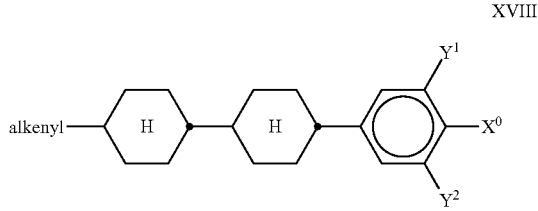
XVIII in which X⁰, Y¹ and Y² have the meanings indicated above, and "alkenyl" denotes $C_{2-7}$-alkenyl. Particular preference is given to compounds of the following formula:

XVIIIa

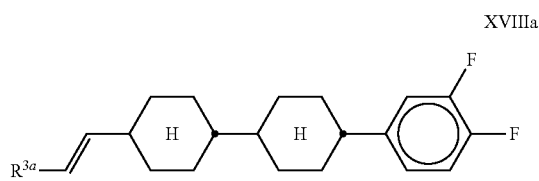

in which R³ᵃ has the meaning indicated above and preferably denotes H;

LC medium which additionally comprises one or more tetracyclic compounds selected from the group consisting of the formulae XIX to XXV:

XIX

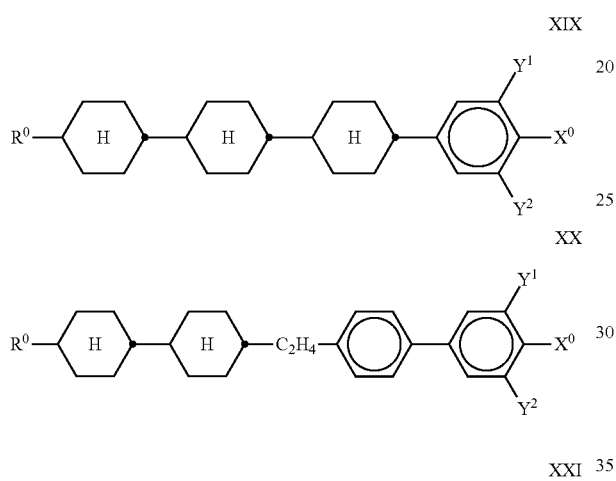

XX

XXI

XXII

XXIII

XXIV

XXV

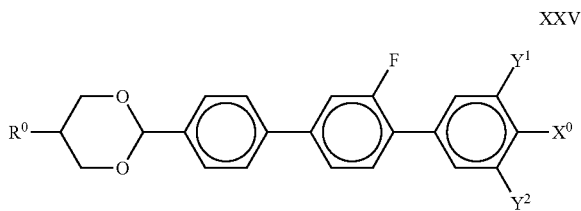

in which $Y^{1-4}$, $R^0$ and $X^0$ each, independently of one another, have one of the meanings indicated above. $X^0$ is preferably F, Cl, CF₃, OCF₃ or OCHF₂. $R^0$ preferably denotes alkyl, alkoxy, oxaalkyl, fluoroalkyl or alkenyl, each having up to 8 C atoms.

LC medium which additionally comprises one or more compounds of the following formula:

XXVI

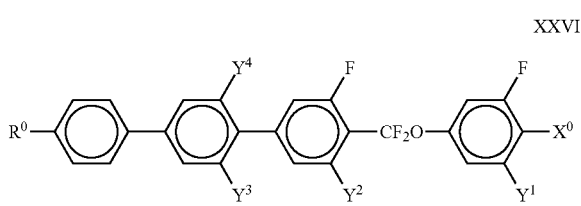

in which $R^0$, $X^0$ and $Y^{1-4}$ have the meanings indicated above.

Particular preference is given to compounds of the following formula:

XXVIa

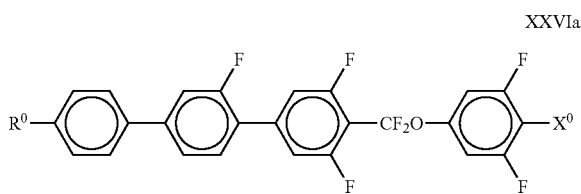

 is preferably

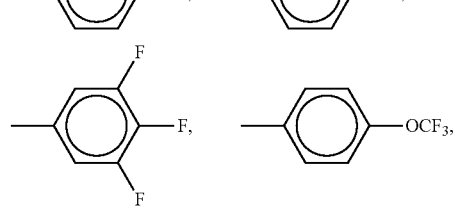

-continued

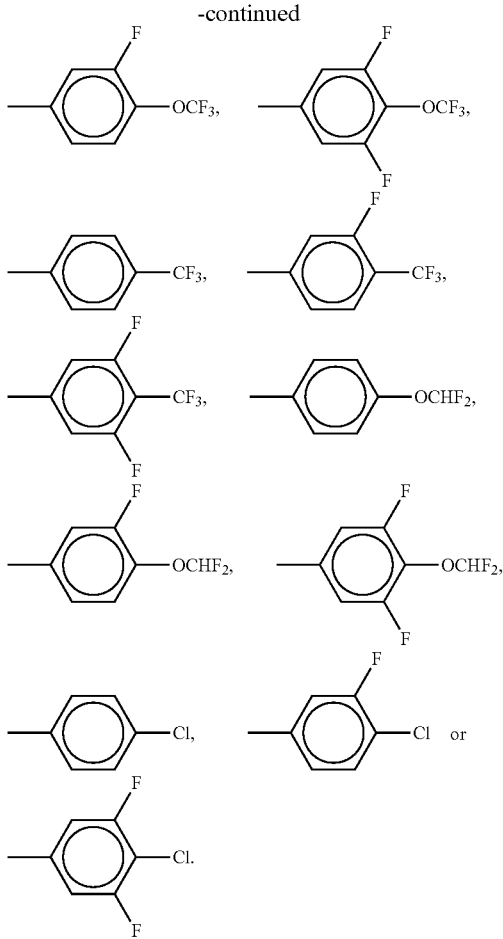

$R^0$ is generally preferably straight-chain alkyl or alkenyl having 2 to 7 C atoms;

$X^0$ is preferably F, furthermore $OCF_3$, $C_1$ or $CF_3$;

the medium preferably comprises one or more compounds selected from the group of the compounds of the formula II;

the medium preferably comprises one or more compounds selected from the group of the compounds of the formulae VI-2, VII-1a, VII-1b, IX, X, XI and XXVI ($CF_2O$-bridged compounds); the total content of compounds of the formulae VI-2, VII-1a, VII-1b, IX, X, XI and XXVI is preferably 35% by weight or more, particularly preferably 40% by weight or more and very particularly preferably 45% by weight or more;

the proportion of compounds of the formulae II-XXVII in the mixture as a whole is preferably 20 to 99% by weight;

the medium preferably comprises 25-80% by weight, particularly preferably 30-70% by weight, of compounds of the formulae II and/or III;

the medium preferably comprises 20-70% by weight, particularly preferably 25-60% by weight, of compounds of the formula IIa;

the medium preferably comprises 2-25% by weight, particularly preferably 3-20% by weight, of compounds selected from the group of the compounds of the formula VI-2;

the medium comprises in total 2-30% by weight, particularly preferably 3-20% by weight, of compounds of the formulae XI and XXVII together;

the medium preferably comprises 1-20% by weight, particularly preferably 2-15% by weight, of compounds of the formula XXIV;

the medium comprises in total 15-65% by weight, particularly preferably 30-55% by weight, of compounds selected from the highly polar compounds of the formulae VI-2, X, XI and XXV together.

The nematic phase of the dielectrically negative or positive LC medium in accordance with the invention preferably has a nematic phase in a temperature range from 10° C. or less to 60° C. or more, particularly preferably from 0° C. or less to 70° C. or more.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m, z and k are integers and preferably denote 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| $nOCF_3$ | $C_nH_{2n+1}$ | $OCF_3$ | H | H |
| $nOCF_3$.F | $C_nH_{2n+1}$ | $OCF_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are found in Tables A and B.

TABLE A

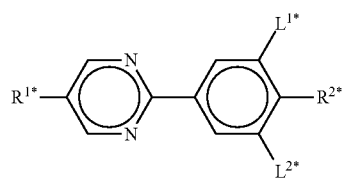

PYP

TABLE A-continued
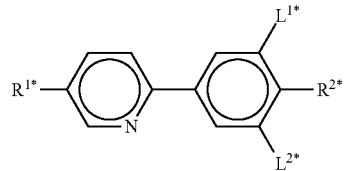
PYRP
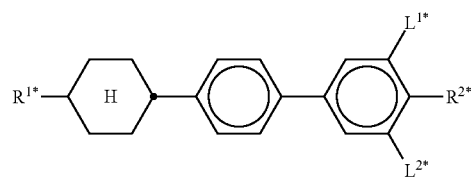
BCH
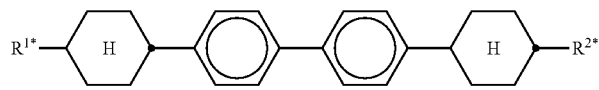
CBC
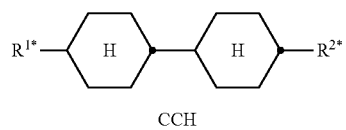
CCH
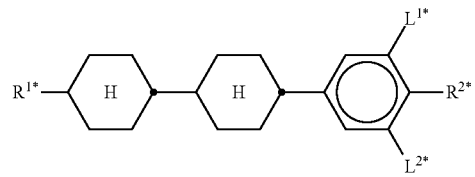
CCP
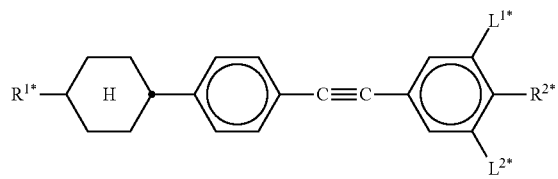
CPTP
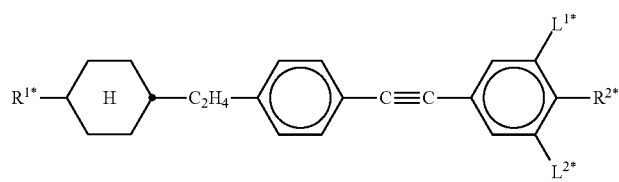
CEPTP TABLE A-continued
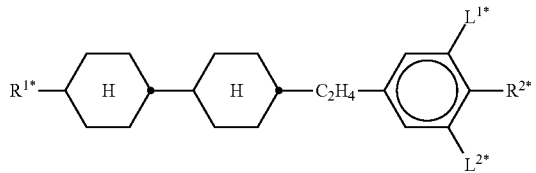
ECCP
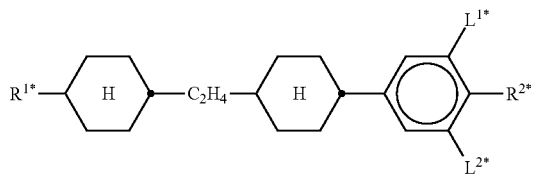
CECP
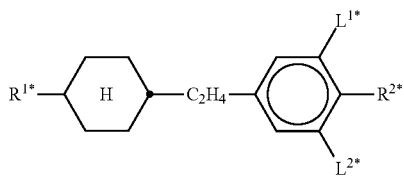
EPCH
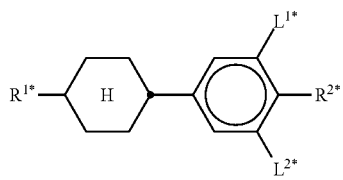
PCH
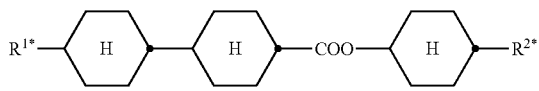
CH
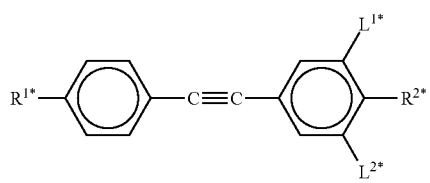
PTP
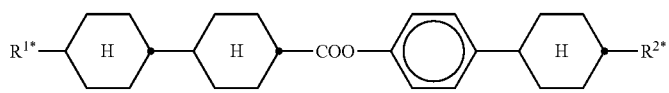
CCPC TABLE A-continued
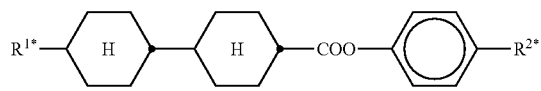
CP
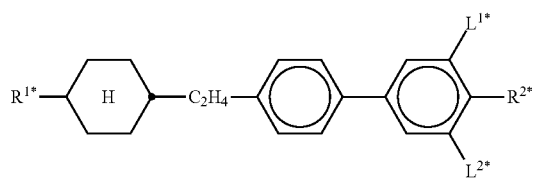
BECH
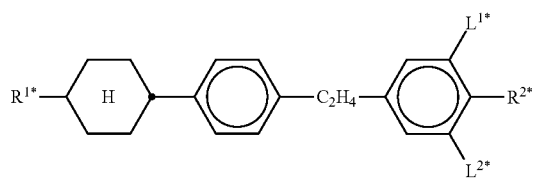
EBCH
CPC
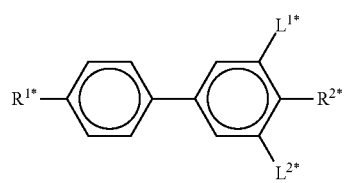
B
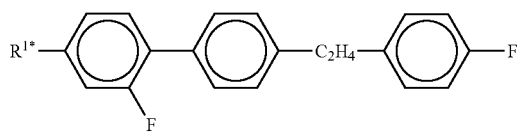
FET-nF
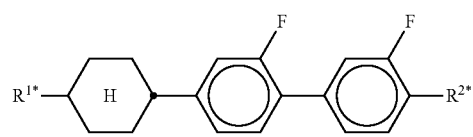
CGG TABLE A-continued
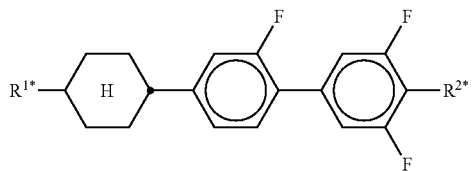
CGU
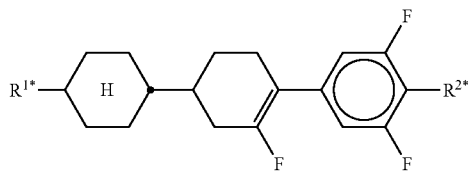
CFU
TABLE B
n, m, z, independently of one another, preferably denote 1, 2, 3, 4, 5, or 6.
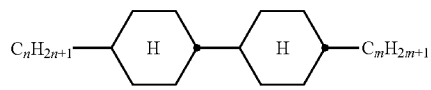
CCH-nm
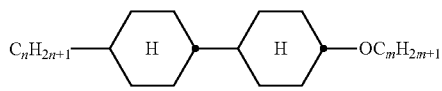
CCH-nOm
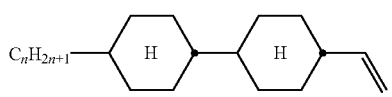
CC-n-V
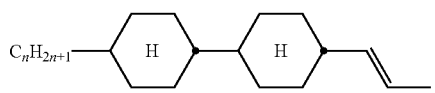
CC-n-V1
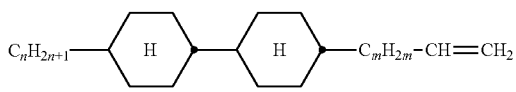
CC-n-mV
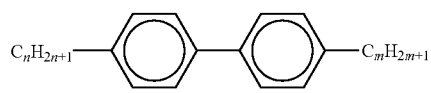
PP-n-m TABLE B-continued
n, m, z, independently of one another, preferably denote 1, 2, 3, 4, 5, or 6.
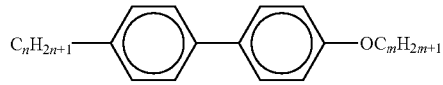
PP-n-Om
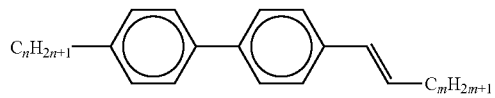
PP-n-Vm
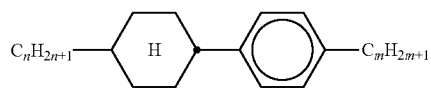
PCH-nm
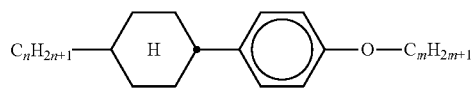
PCH-nOm
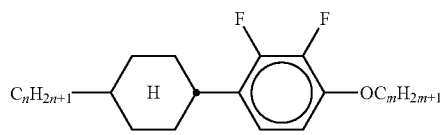
CY-n-Om
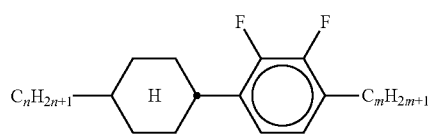
CY-n-m
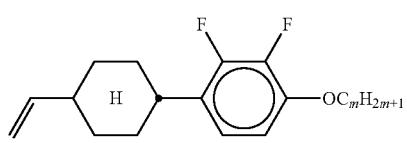
CY-V-Om
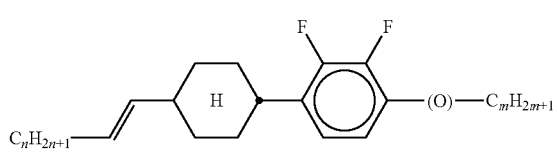
CY-nV-(O)m TABLE B-continued
n, m, z, independently of one another, preferably denote 1, 2, 3, 4, 5, or 6.
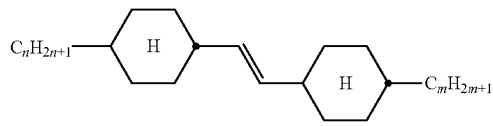
CVC-n-m
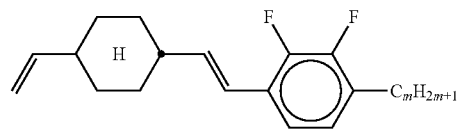
CVY-V-m
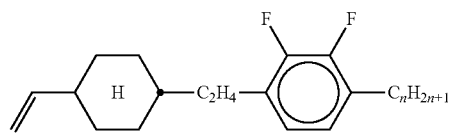
CEY-V-m
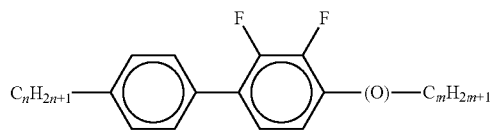
PY-n-(O)m
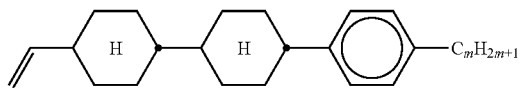
CCP-V-m
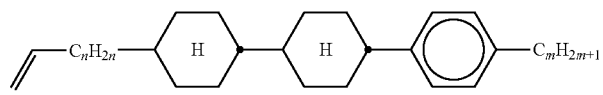
CCP-Vn-m
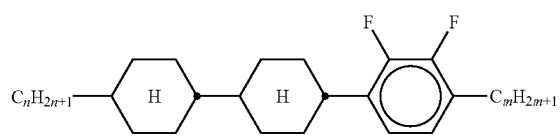
CCY-n-m
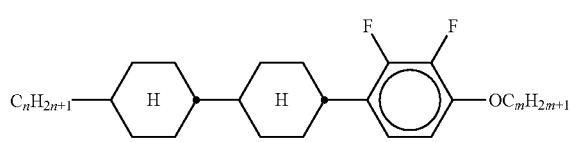
CCY-n-Om TABLE B-continued
n, m, z, independently of one another, preferably denote 1, 2, 3, 4, 5, or 6.
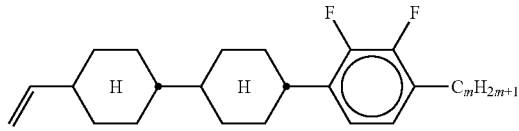
CCY-V-m
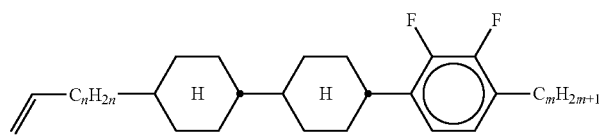
CCY-Vn-m
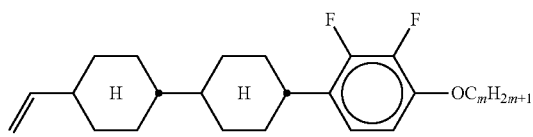
CCY-V-Om
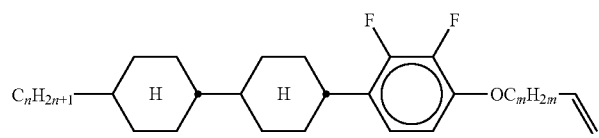
CCY-n-OmV
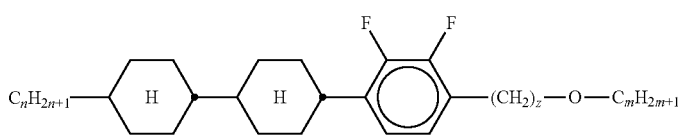
CCY-n-zOm
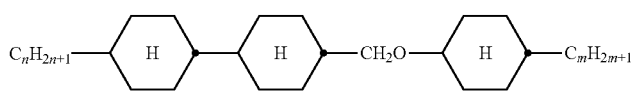
CCOC-n-m
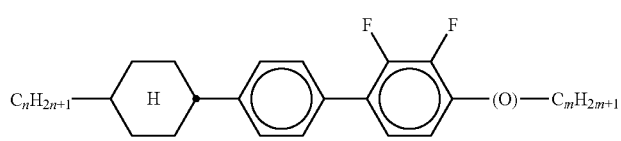
CPY-n-(O)m TABLE B-continued
n, m, z, independently of one another, preferably denote 1, 2, 3, 4, 5, or 6.
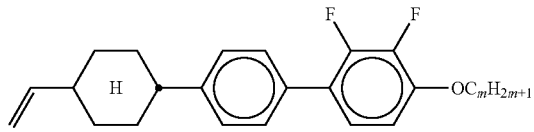
CPY-V-Om
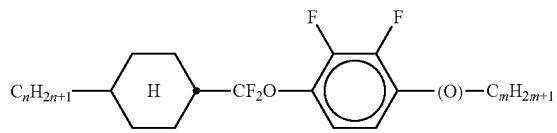
CQY-n-(O)m
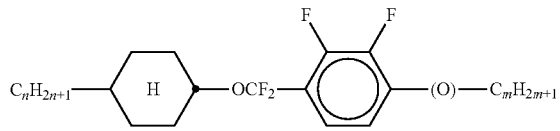
CQIY-n-(O)m
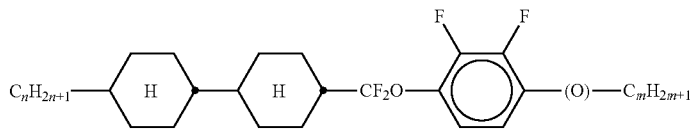
CCQY-n-(O)m
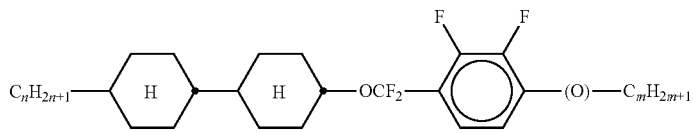
CCQIY-n-(O)m
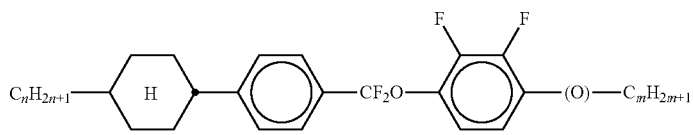
CPQY-n-(O)m
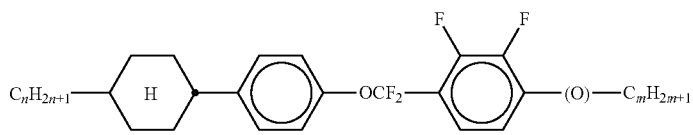
CPQIY-n-(O)m TABLE B-continued
n, m, z, independently of one another, preferably denote 1, 2, 3, 4, 5, or 6.
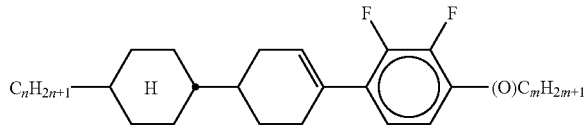
CLY-n-(O)m
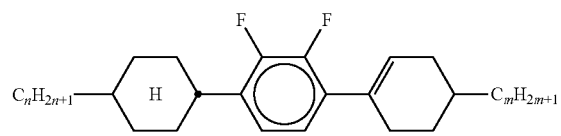
CYLI-n-m
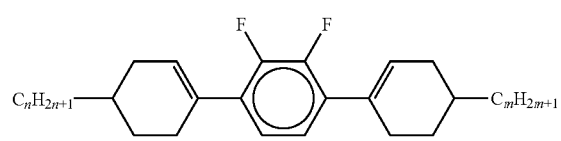
LYLI-n-m
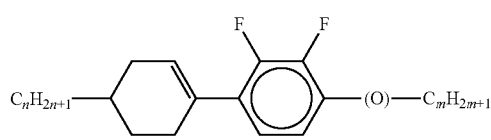
LY-n-(O)m
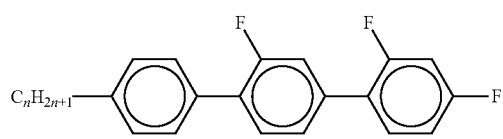
PGIGI-n-F
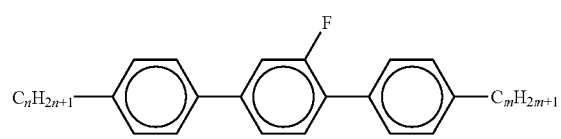
PGP-n-m
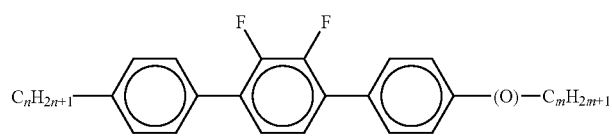
PYP-n-(O)m TABLE B-continued
n, m, z, independently of one another, preferably denote 1, 2, 3, 4, 5, or 6.
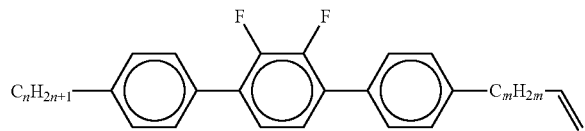
PYP-n-mV
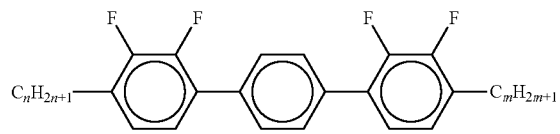
YPY-n-m
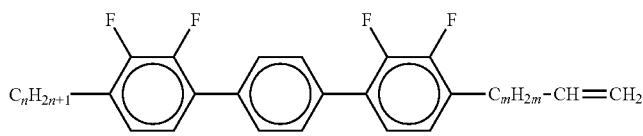
YPY-n-mV
BCH-nm
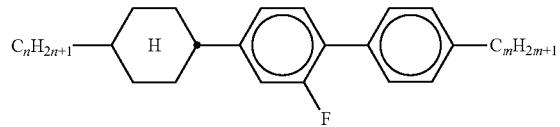
BCH-nmF
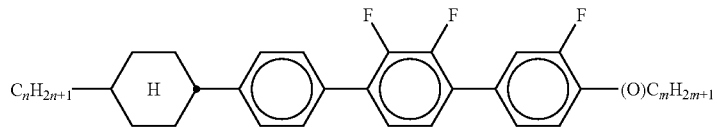
CPYP-n-(O)m
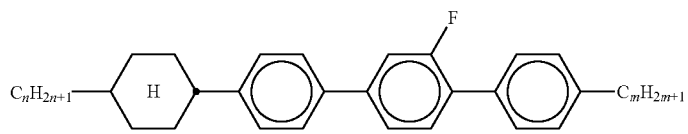
CPGP-n-m
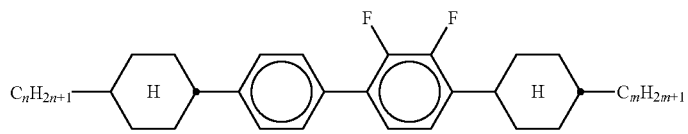
CPYC-n-m TABLE B-continued
n, m, z, independently of one another, preferably denote 1, 2, 3, 4, 5, or 6.
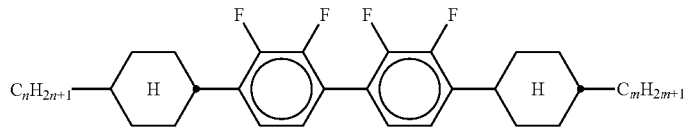
CYYC-n-m
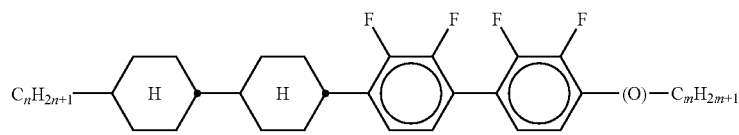
CCYY-n-m
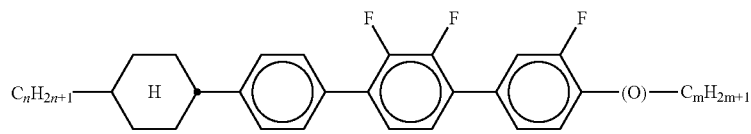
CPYG-n-(O)m
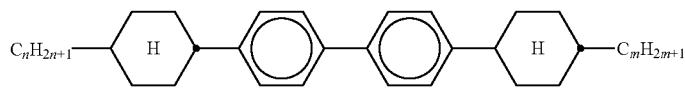
CBC-nm
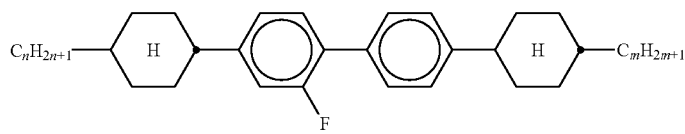
CBC-nmF
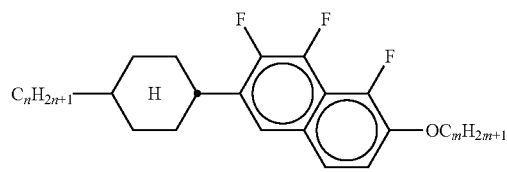
CNap-n-Om
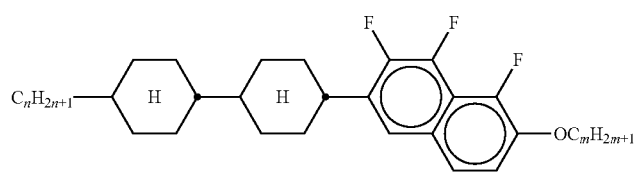
CCNap-n-Om TABLE B-continued
n, m, z, independently of one another, preferably denote 1, 2, 3, 4, 5, or 6.
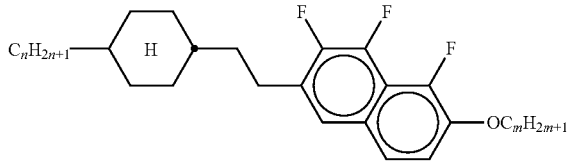
CENap-n-Om
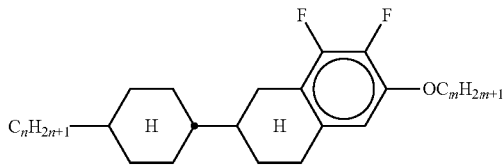
CTNap-n-Om
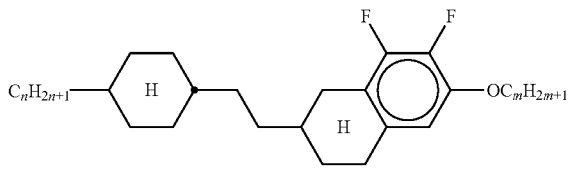
CETNap-n-Om
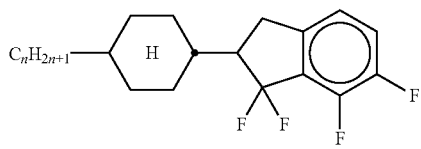
CK-n-F
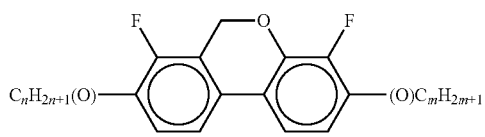
DFDBC-n(O)-(O)m
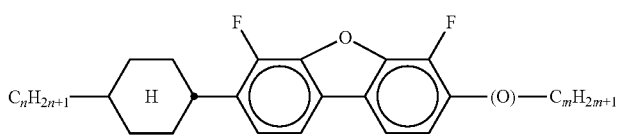
C-DFDBF-n-(O)m
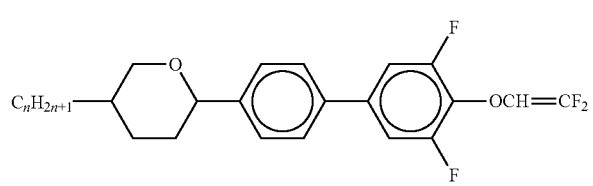
APU-n-OXF TABLE B-continued
n, m, z, independently of one another, preferably denote 1, 2, 3, 4, 5, or 6.
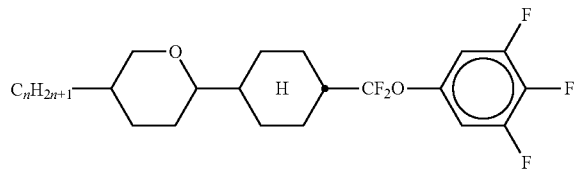
ACQU-n-F
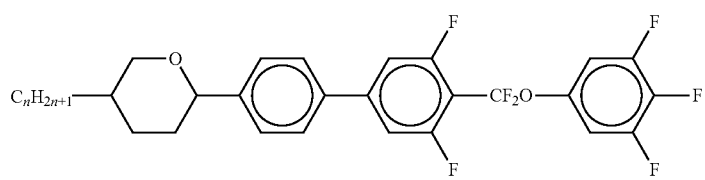
APUQU-n-F
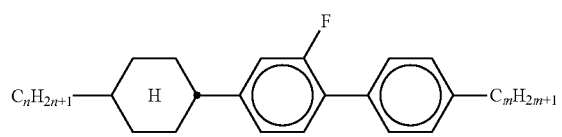
BCH-n.Fm
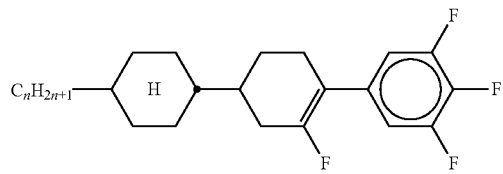
CFU-n-F
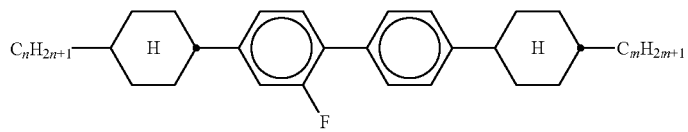
CBC-nmF
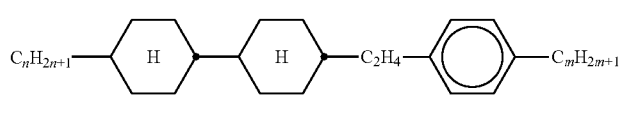
ECCP-nm
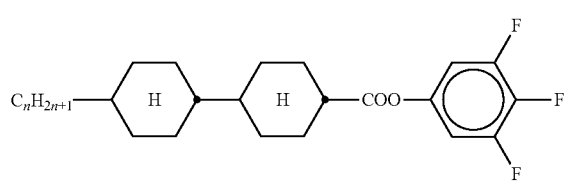
CCZU-n-F TABLE B-continued
n, m, z, independently of one another, preferably denote 1, 2, 3, 4, 5, or 6.
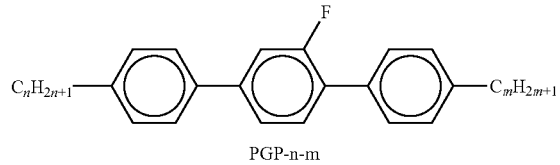
PGP-n-m
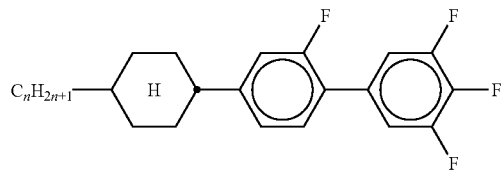
CGU-n-F
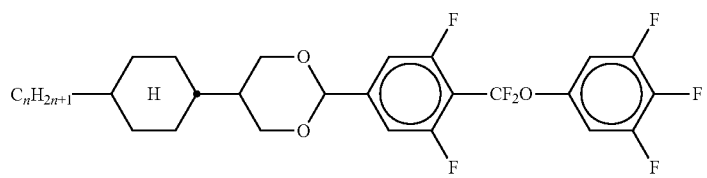
CDUQU-n-F
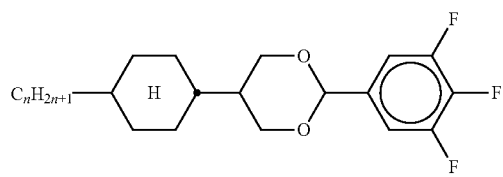
CDU-n-F
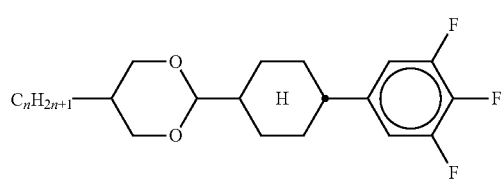
DCU-n-F
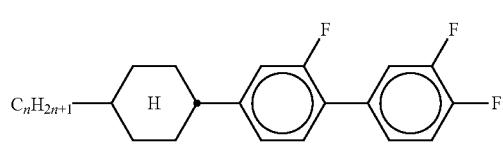
CGG-n-F TABLE B-continued
n, m, z, independently of one another, preferably denote 1, 2, 3, 4, 5, or 6.
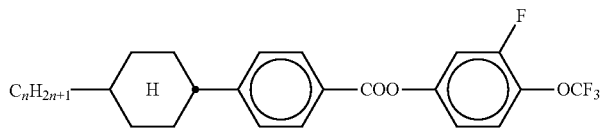
CPZG-n-OT
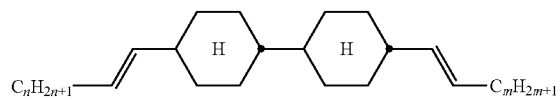
CC-nV-Vm
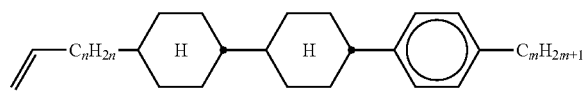
CCP-Vn-m
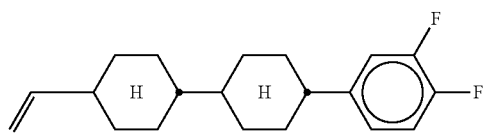
CCG-V-F
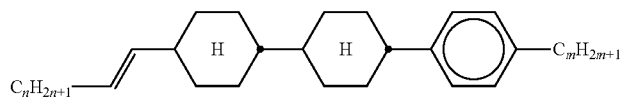
CCP-nV-m
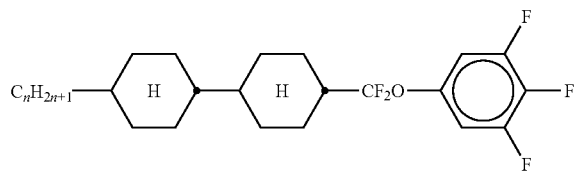
CCQU-n-F
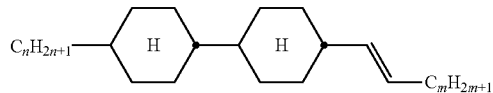
CC-n-Vm
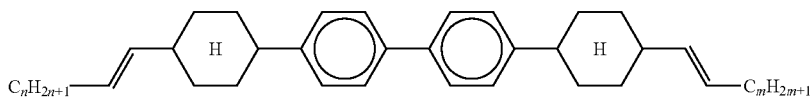
CPPC-nV-Vm TABLE B-continued
n, m, z, independently of one another, preferably denote 1, 2, 3, 4, 5, or 6.
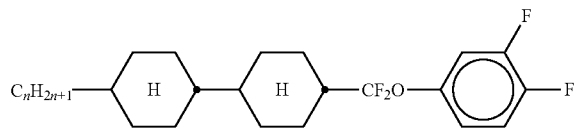
CCQG-n-F
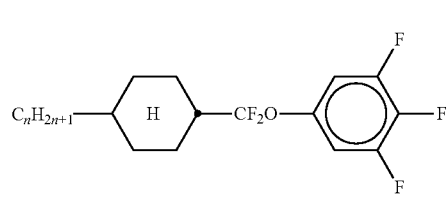
CQU-n-F
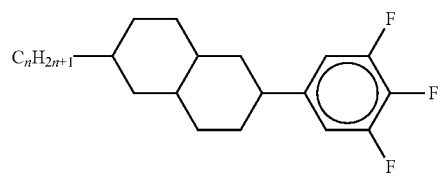
Dec-U-n-F
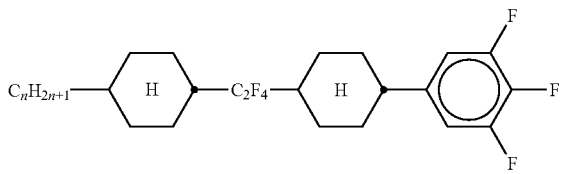
CWCU-n-F
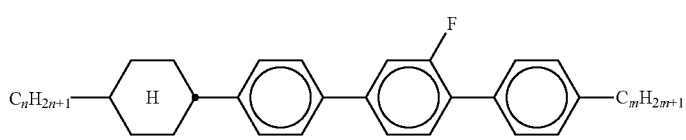
CPGP-n-m
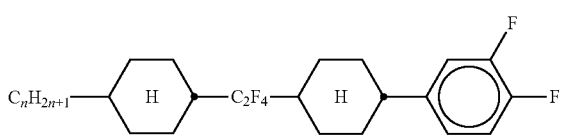
CWCG-n-F
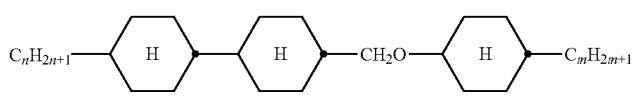
CCOC-n-m TABLE B-continued
n, m, z, independently of one another, preferably denote 1, 2, 3, 4, 5, or 6.
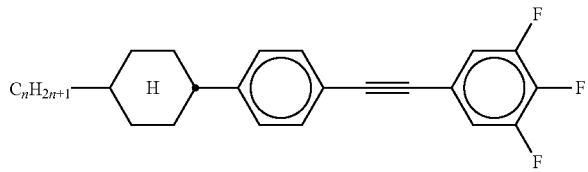
CPTU-n-F
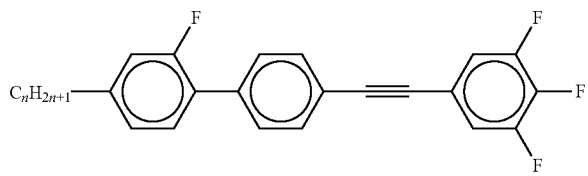
GPTU-n-F
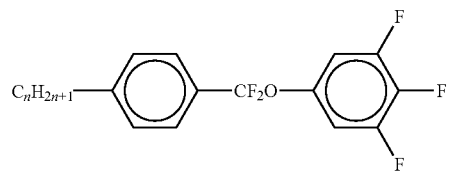
PQU-n-F
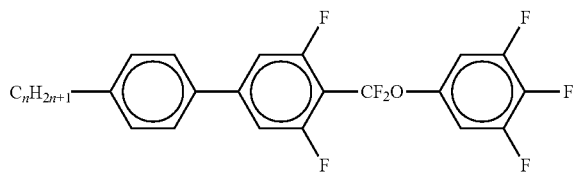
PUQU-n-F
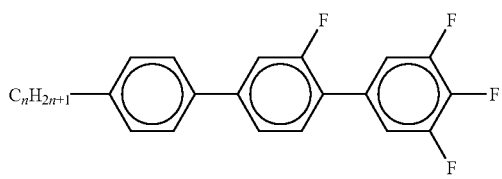
PGU-n-F
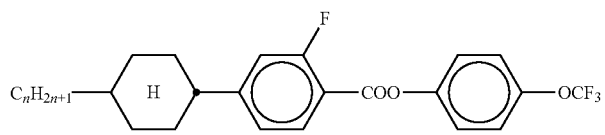
CGZP-n-OT TABLE B-continued
n, m, z, independently of one another, preferably denote 1, 2, 3, 4, 5, or 6.
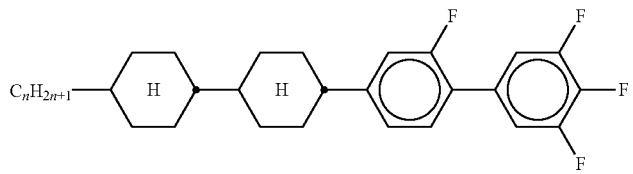
CCGU-n-F
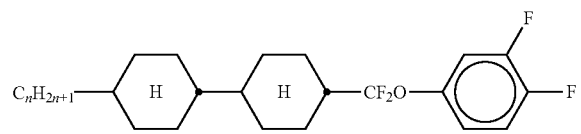
CCQG-n-F
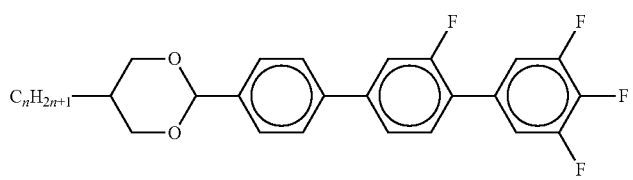
DPGU-n-F
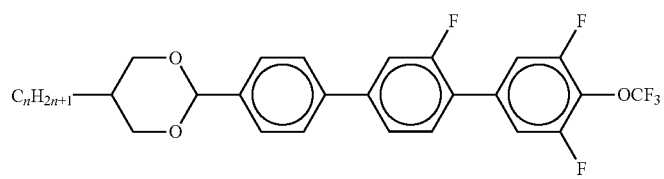
DPGU-n-OT
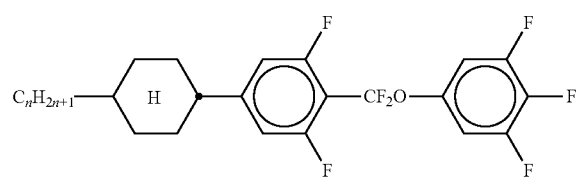
CUQU-n-F
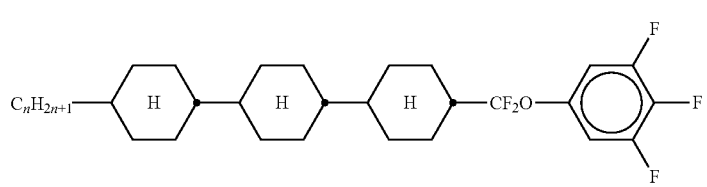
CCCQU-n-F TABLE B-continued
n, m, z, independently of one another, preferably denote 1, 2, 3, 4, 5, or 6.
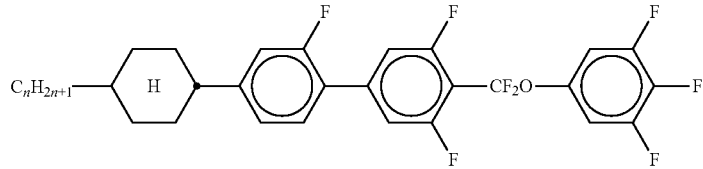
CGUQU-n-F
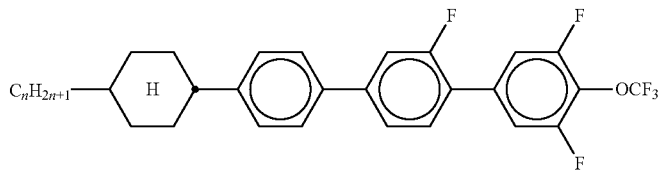
CPGU-n-OT
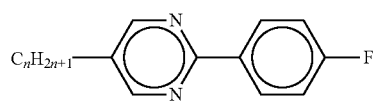
PYP-n-F
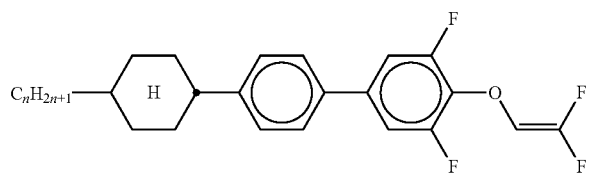
CPU-n-OXF
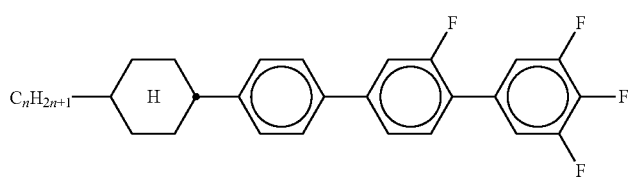
CPGU-n-F
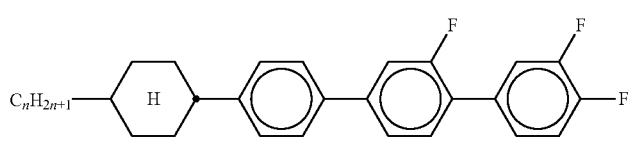
CPGG-n-F
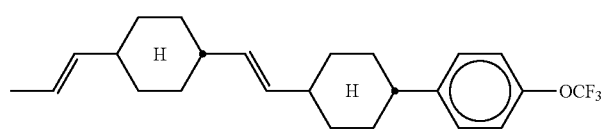
CVCP-1V-OT TABLE B-continued
n, m, z, independently of one another, preferably denote 1, 2, 3, 4, 5, or 6.
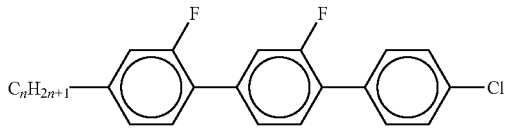
GGP-n-Cl
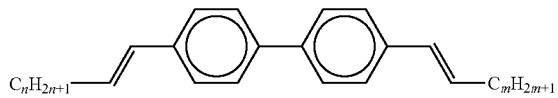
PP-nV-Vm
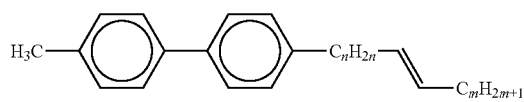
PP-1-nVm
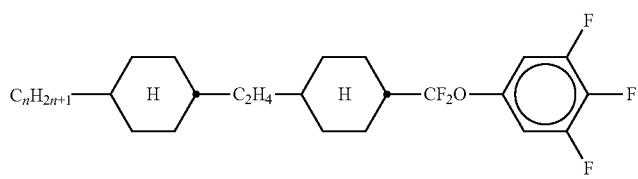
CWCQU-n-F
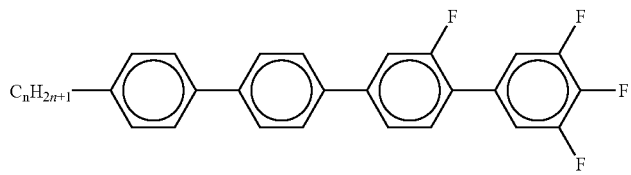
PPGU-n-F
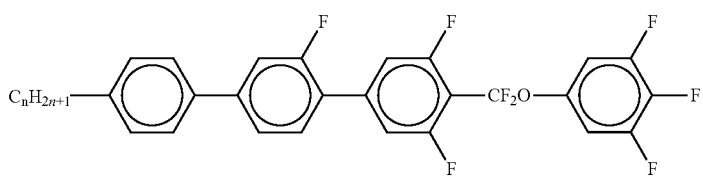
PGUQU-n-F
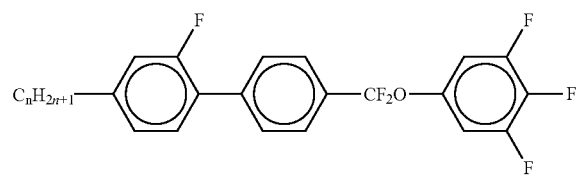
GPQU-n-F TABLE B-continued
n, m, z, independently of one another, preferably denote 1, 2, 3, 4, 5, or 6.
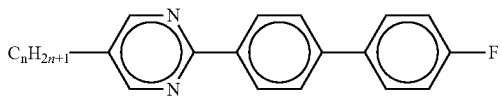
MPP-n-F
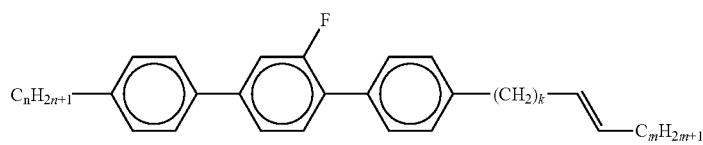
PGP-n-kVm
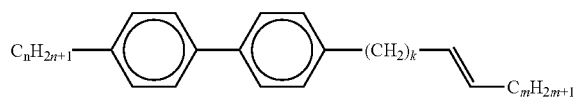
PP-n-kVm
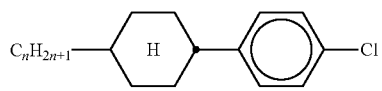
PCH-nCl
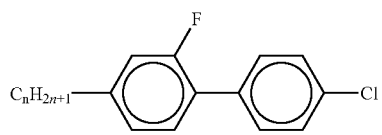
GP-n-Cl
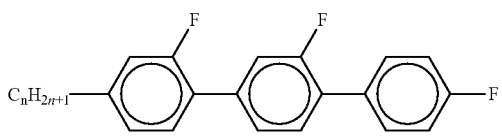
GGP-n-F
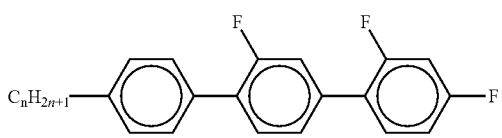
PGIGI-n-F
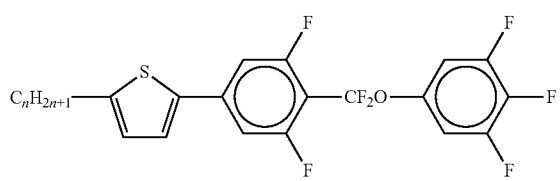
SUQU-n-F

TABLE B-continued n, m, z, independently of one another, preferably denote 1, 2, 3, 4, 5, or 6.

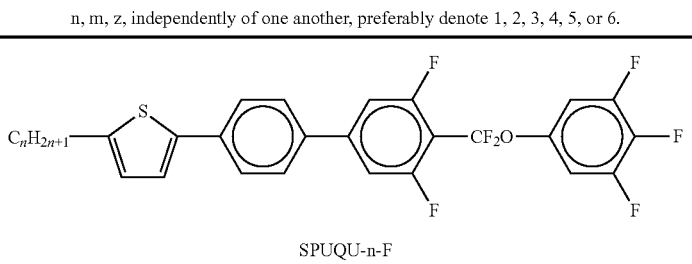

SPUQU-n-F

In a preferred embodiment of the present invention, the LC media according to the invention comprise one or more compounds selected from the group consisting of compounds from Tables A and B.

TABLE C

Table C indicates possible chiral dopants which can be added to the LC media according to the invention.

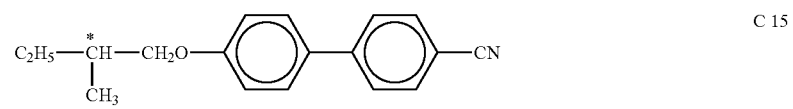

C 15

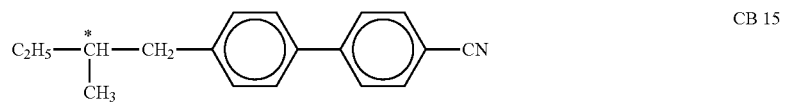

CB 15

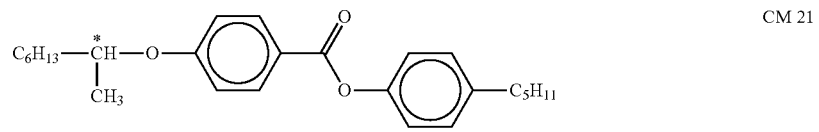

CM 21

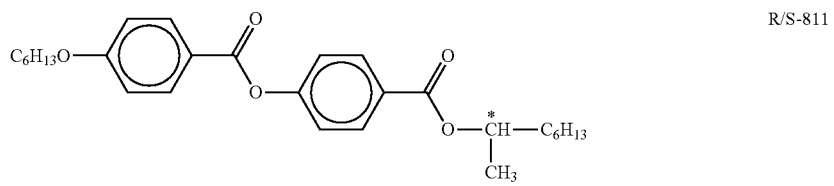

R/S-811

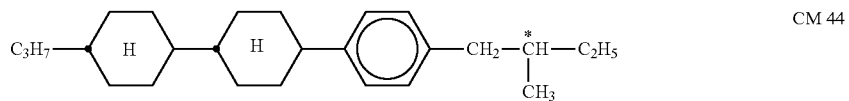

CM 44

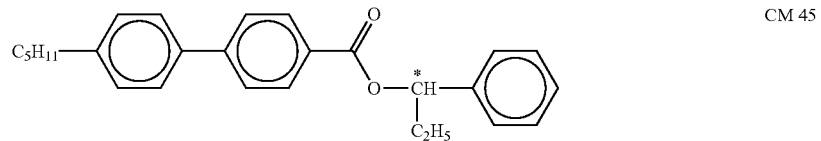

CM 45

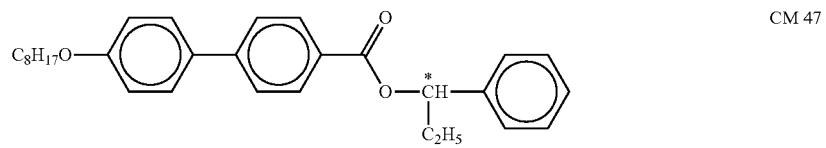

CM 47

TABLE C-continued
Table C indicates possible chiral dopants which can be added to the LC media according to the invention.
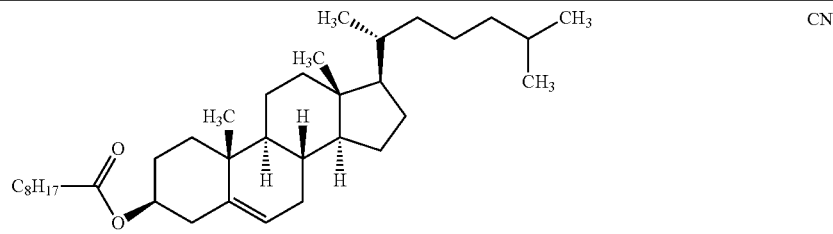
CN
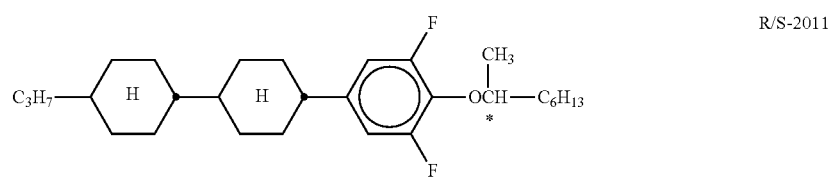
R/S-2011
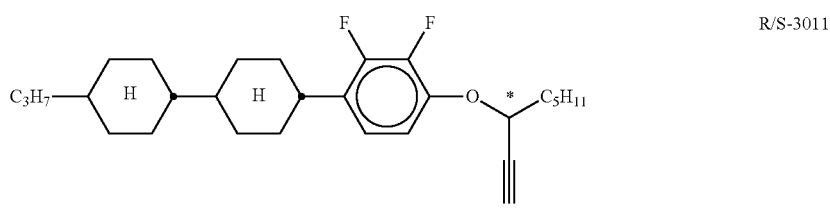
R/S-3011
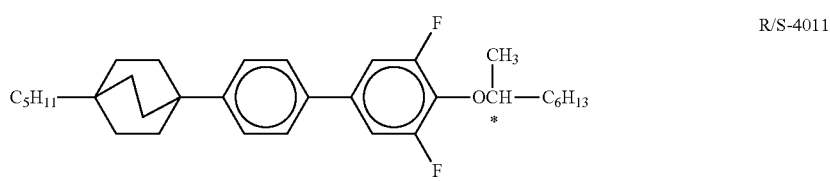
R/S-4011
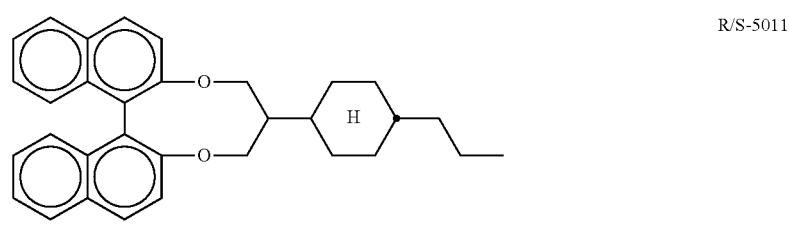
R/S-5011
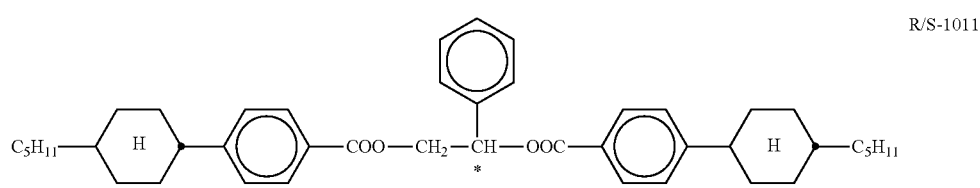
R/S-1011
The LC media optionally comprise 0 to 10% by weight, in particular 0.01 to 5% by weight, particularly preferably 0.1 to 3% by weight, of dopants, preferably selected from the group consisting of compounds from Table C.

TABLE D
Table D indicates possible stabilisers which can be added to the LC media according to the invention.
(n here denotes an integer from 1 to 12, preferably 1, 2, 3, 4, 5, 6, 7 or 8; terminal methyl groups are not shown).
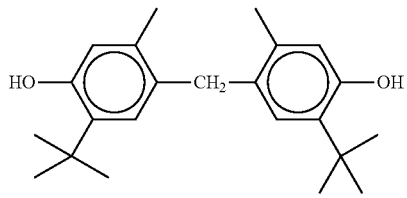
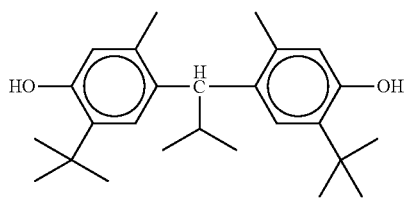
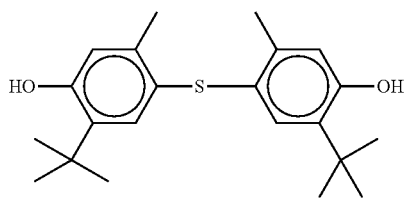
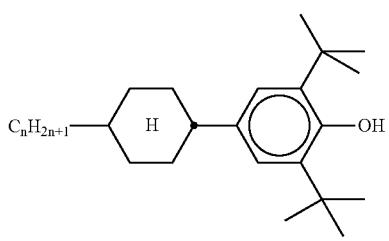
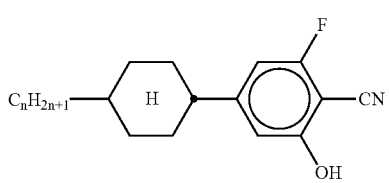
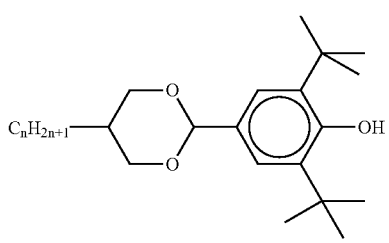
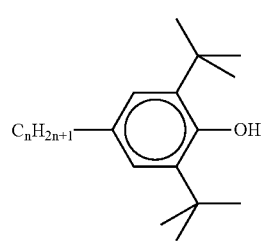

TABLE D-continued
Table D indicates possible stabilisers which can be added to the LC media according to the invention.
(n here denotes an integer from 1 to 12, preferably 1, 2, 3, 4, 5, 6, 7 or 8; terminal methyl groups are not shown).
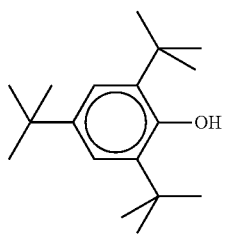
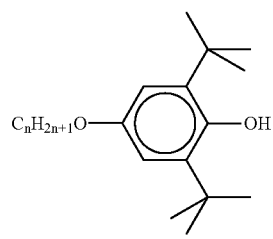
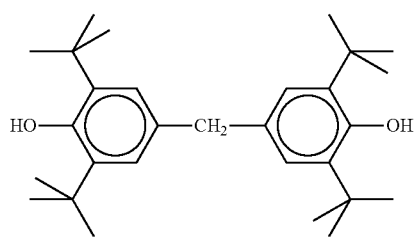
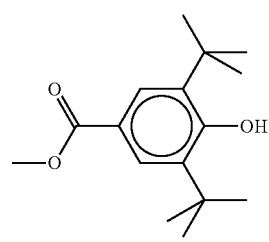
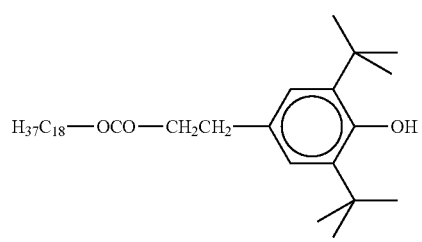
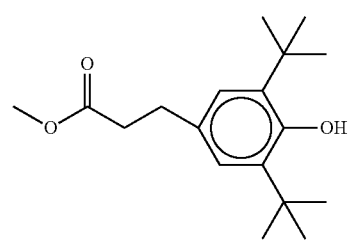

TABLE D-continued
Table D indicates possible stabilisers which can be added to the LC media according to the invention.
(n here denotes an integer from 1 to 12, preferably 1, 2, 3, 4, 5, 6, 7 or 8; terminal methyl groups are not shown).
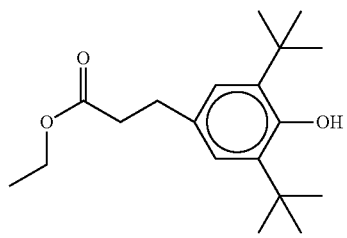
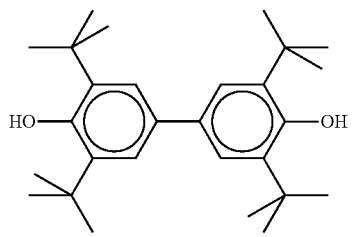
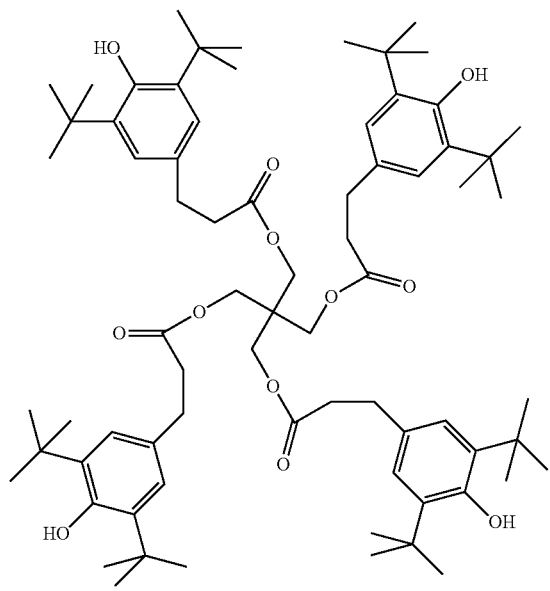 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
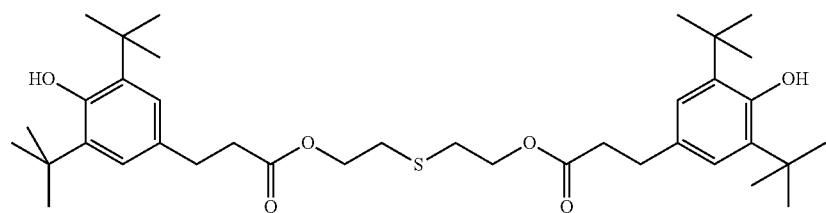 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE D-continued
Table D indicates possible stabilisers which can be added to the LC media according to the invention.
(n here denotes an integer from 1 to 12, preferably 1, 2, 3, 4, 5, 6, 7 or 8; terminal methyl groups are not shown).
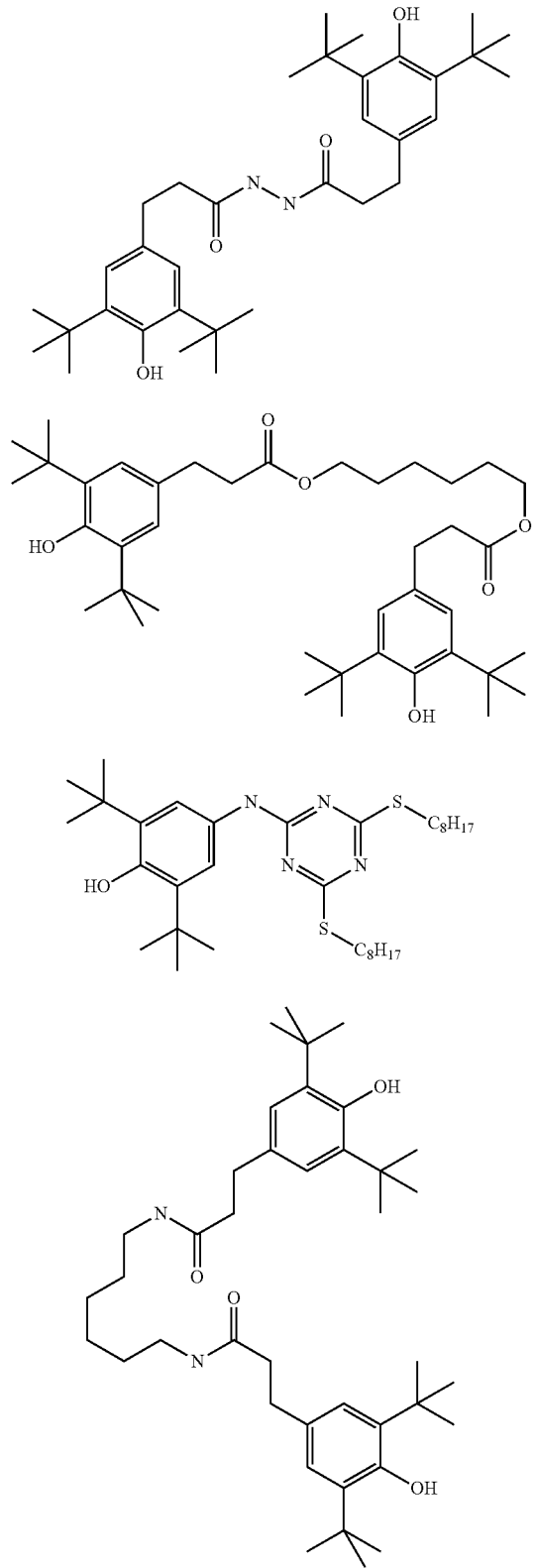

TABLE D-continued
Table D indicates possible stabilisers which can be added to the LC media according to the invention.
(n here denotes an integer from 1 to 12, preferably 1, 2, 3, 4, 5, 6, 7 or 8; terminal methyl groups are not shown).
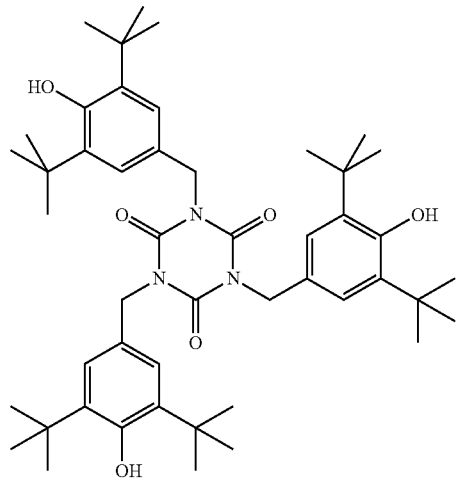 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
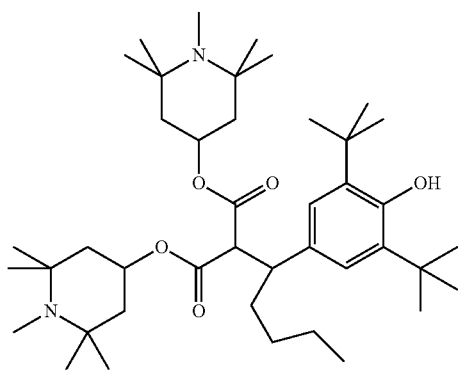 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
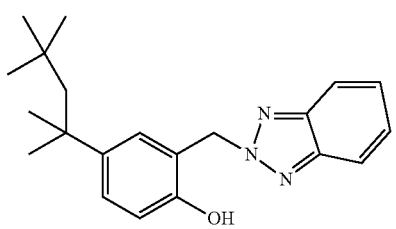 [SMILES: CC(C)(C)CC(C)(C)c1ccc(O)c(Cn2nc3ccccc3n2)c1]
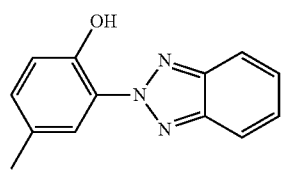 [SMILES: Cc1ccc(O)c(-n2nc3ccccc3n2)c1]
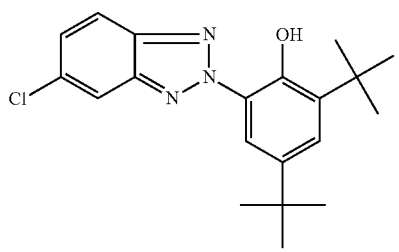 [SMILES: CC(C)(C)c1cc(-n2nc3ccc(Cl)cc3n2)c(O)c(C(C)(C)C)c1]

TABLE D-continued
Table D indicates possible stabilisers which can be added to the LC media according to the invention.
(n here denotes an integer from 1 to 12, preferably 1, 2, 3, 4, 5, 6, 7 or 8; terminal methyl groups are not shown).
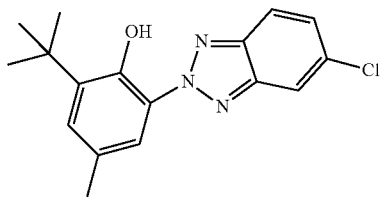 [SMILES: Cc1cc(-n2nc3ccc(Cl)cc3n2)c(O)c(C(C)(C)C)c1]
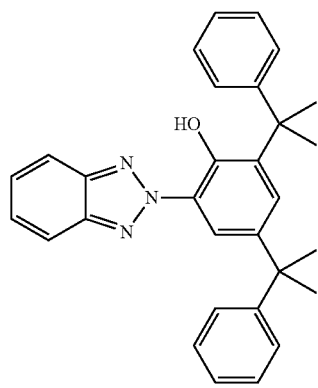 [SMILES: CC(C)(c1ccccc1)c1cc(-n2nc3ccccc3n2)c(O)c(C(C)(C)c2ccccc2)c1]
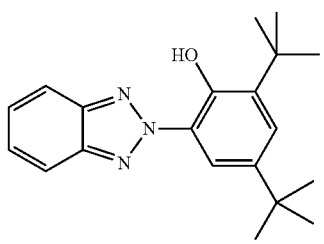 [SMILES: CC(C)(C)c1cc(-n2nc3ccccc3n2)c(O)c(C(C)(C)C)c1]
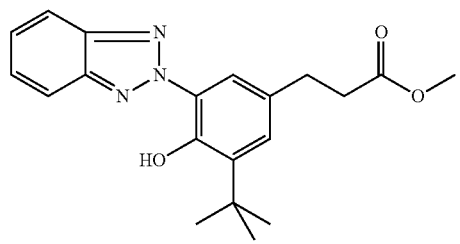 [SMILES: COC(=O)CCc1cc(-n2nc3ccccc3n2)c(O)c(C(C)(C)C)c1]
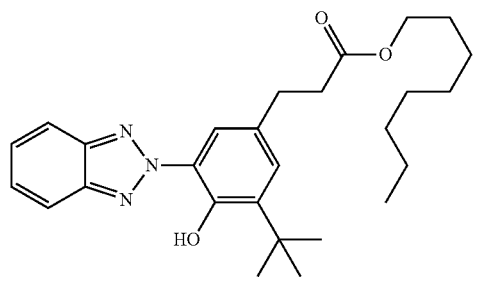 [SMILES: CCCCCCCCOC(=O)CCc1cc(-n2nc3ccccc3n2)c(O)c(C(C)(C)C)c1]

TABLE D-continued
Table D indicates possible stabilisers which can be added to the LC media according to the invention.
(n here denotes an integer from 1 to 12, preferably 1, 2, 3, 4, 5, 6, 7 or 8; terminal methyl groups are not shown).
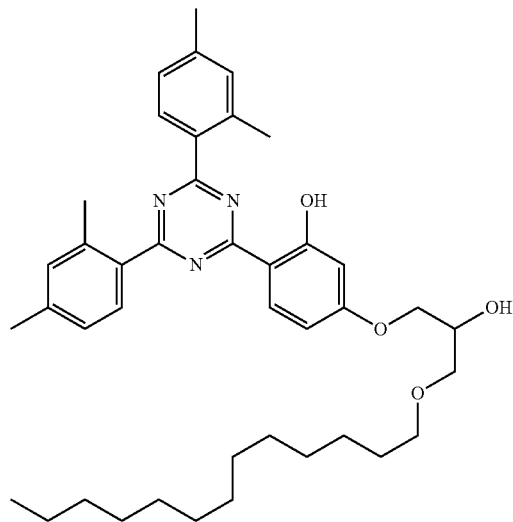 [SMILES: CCCCCCCCCCCCCOCC(O)COc1ccc(-c2nc(-c3ccc(C)cc3C)nc(-c3ccc(C)cc3C)n2)c(O)c1]
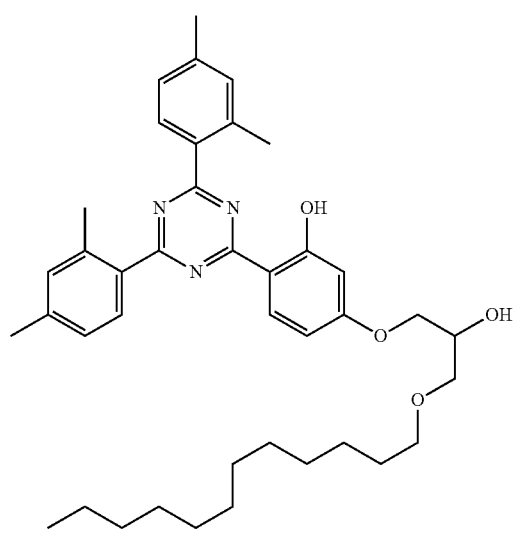 [SMILES: CCCCCCCCCCCCOCC(O)COc1ccc(-c2nc(-c3ccc(C)cc3C)nc(-c3ccc(C)cc3C)n2)c(O)c1]
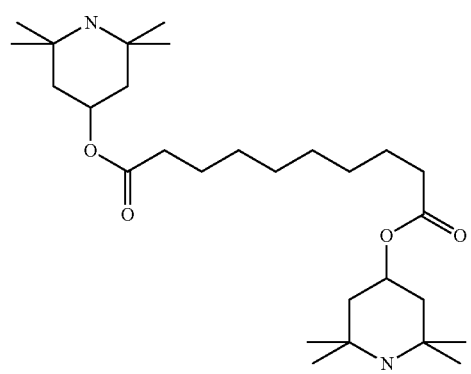

TABLE D-continued

Table D indicates possible stabilisers which can be added to the LC media according to the invention.
(n here denotes an integer from 1 to 12, preferably 1, 2, 3, 4, 5, 6, 7 or 8; terminal methyl groups are not shown).

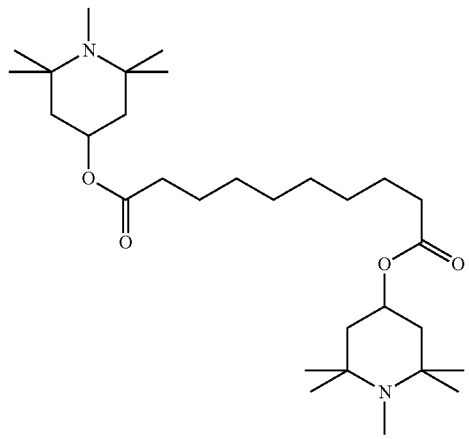

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table D.

TABLE E

Table E shows illustrative compounds which can be used in the LC media in accordance with the present invention, preferably as polymerisable compounds.

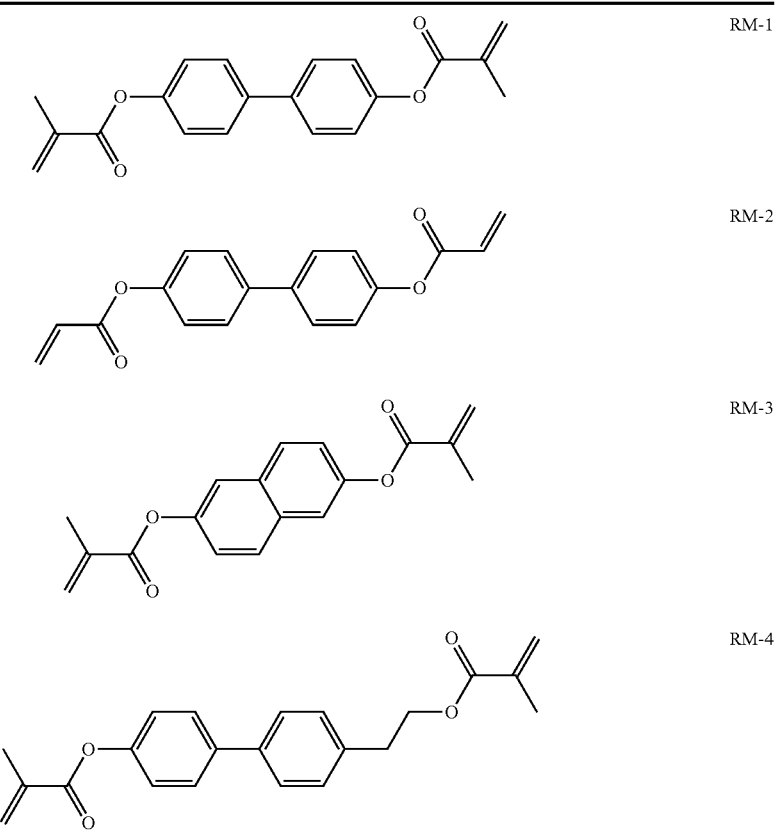

TABLE E-continued
Table E shows illustrative compounds which can be used in the LC media in accordance with the present invention, preferably as polymerisable compounds.
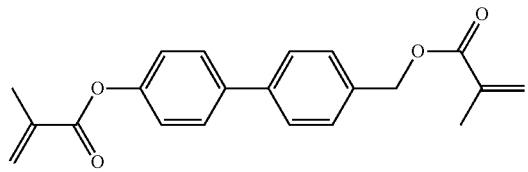 [SMILES: C=C(C)C(=O)OCc1ccc(-c2ccc(OC(=O)C(=C)C)cc2)cc1]
RM-5
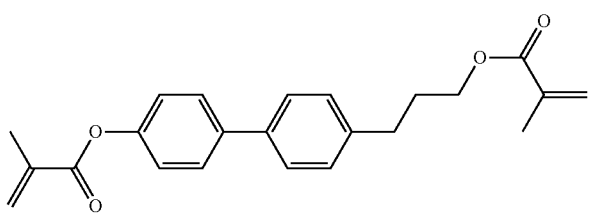 [SMILES: C=C(C)C(=O)OCCCc1ccc(-c2ccc(OC(=O)C(=C)C)cc2)cc1]
RM-6
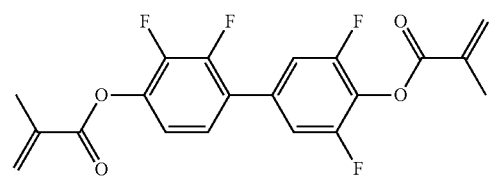 [SMILES: C=C(C)C(=O)Oc1ccc(-c2cc(F)c(OC(=O)C(=C)C)c(F)c2)c(F)c1F]
RM-7
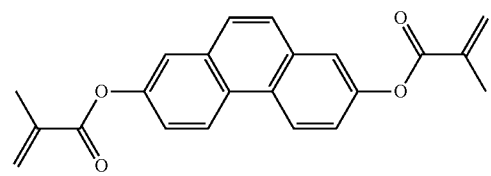 [SMILES: C=C(C)C(=O)Oc1ccc2c(ccc3cc(OC(=O)C(=C)C)ccc32)c1]
RM-8
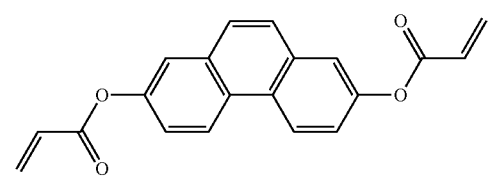
RM-9
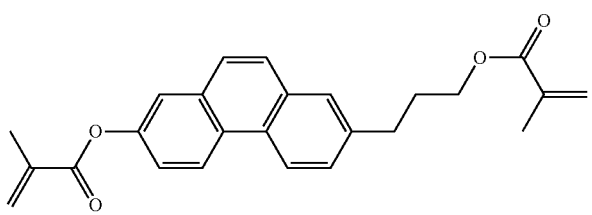 [SMILES: C=C(C)C(=O)OCCCc1ccc2c(ccc3cc(OC(=O)C(=C)C)ccc32)c1]
RM-10
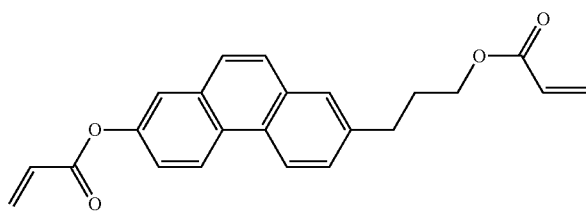 [SMILES: C=CC(=O)OCCCc1ccc2c(ccc3cc(OC(=O)C=C)ccc32)c1]
RM-11

TABLE E-continued
Table E shows illustrative compounds which can be used in the LC media in accordance with the present invention, preferably as polymerisable compounds.
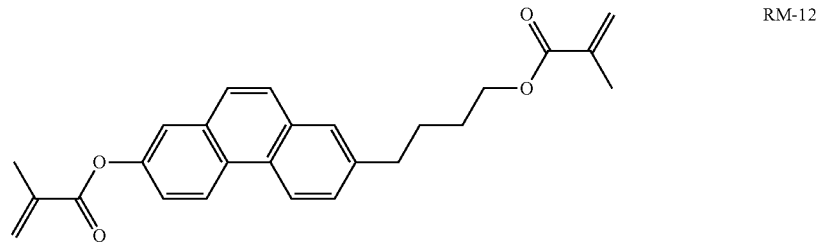
RM-12
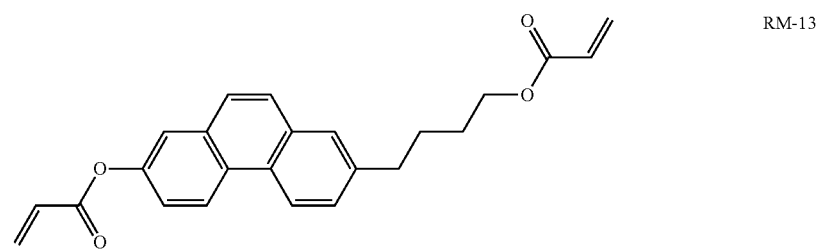
RM-13
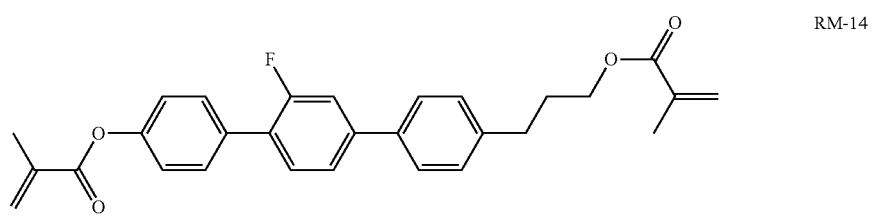
RM-14
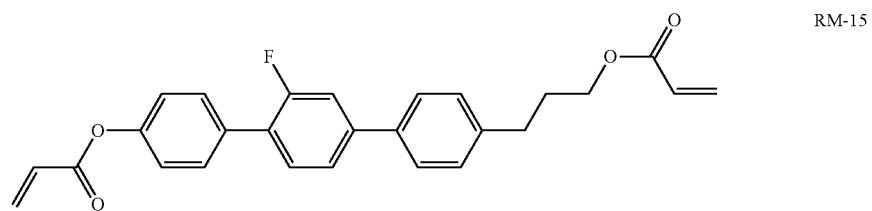
RM-15
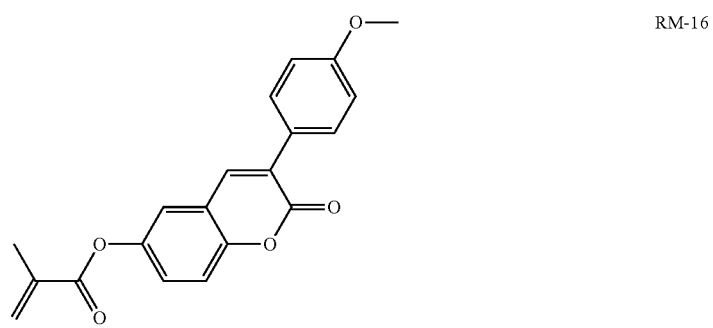
RM-16

TABLE E-continued
Table E shows illustrative compounds which can be used in the LC media in accordance with the present invention, preferably as polymerisable compounds.
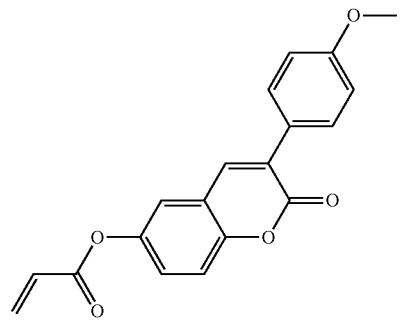 [SMILES: C=CC(=O)Oc1ccc2oc(=O)c(-c3ccc(OC)cc3)cc2c1]
RM-17
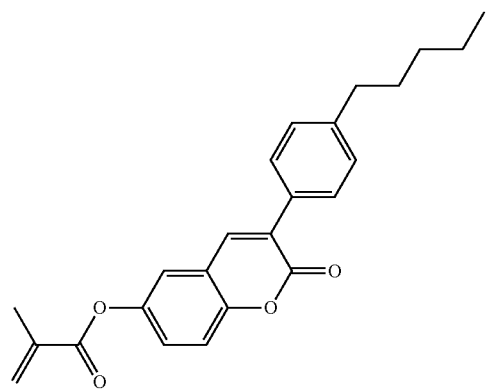 [SMILES: C=C(C)C(=O)Oc1ccc2oc(=O)c(-c3ccc(CCCCC)cc3)cc2c1]
RM-18
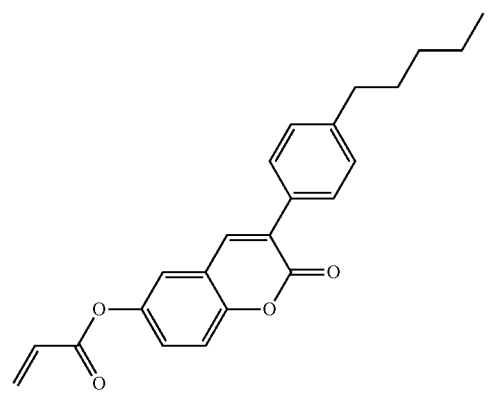 [SMILES: C=CC(=O)Oc1ccc2oc(=O)c(-c3ccc(CCCCC)cc3)cc2c1]
RM-19
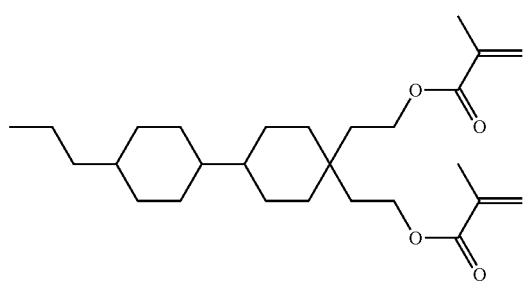 [SMILES: C=C(C)C(=O)OCCC1(CCOC(=O)C(=C)C)CCC(C2CCC(CCC)CC2)CC1]
RM-20

TABLE E-continued

Table E shows illustrative compounds which can be used in the LC media in accordance with the present invention, preferably as polymerisable compounds.

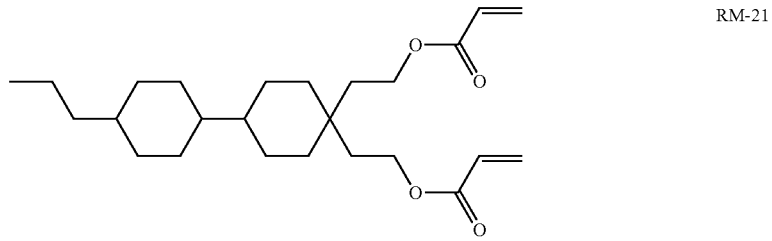

RM-21

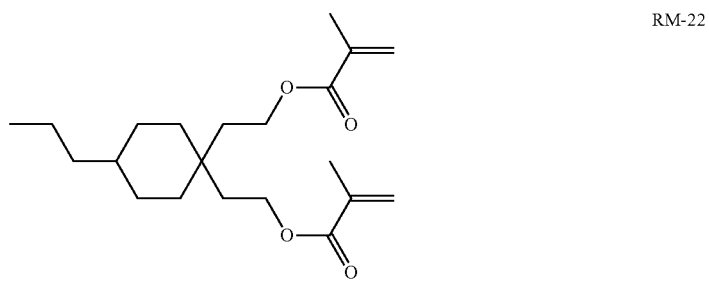

RM-22

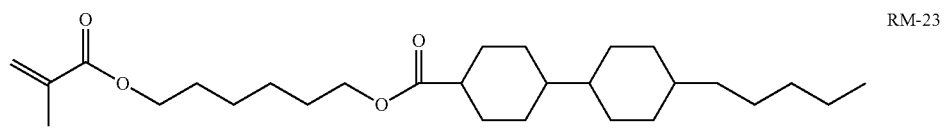

RM-23

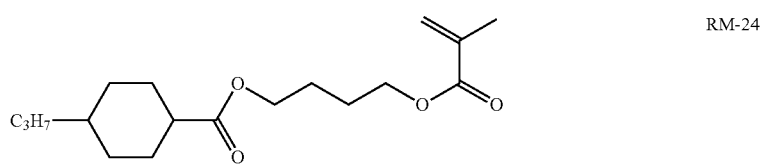

RM-24

In a preferred embodiment of the present invention, the mesogenic media comprise one or more compounds selected from the group of the compounds from Table E.

In the present application, the term "compounds", also written as "compound(s)", denotes, unless explicitly indicated otherwise, both one and also a plurality of compounds. Conversely, the term "compound" generally also encompasses a plurality of compounds, if this is possible according to the definition and is not indicated otherwise. The same applies to the terms LC media and LC medium. The term "component" in each case encompasses one or more substances, compounds and/or particles.

In addition, the following abbreviations and symbols are used:

$n_e$ extraordinary refractive index at 20° C. and 589 nm,
$n_o$ ordinary refractive index at 20° C. and 589 nm,
Δn optical anisotropy at 20° C. and 589 nm,
$\epsilon_\perp$ dielectric permittivity perpendicular to the director at 20° C. and 1 kHz,
$\epsilon_\parallel$ dielectric permittivity parallel to the director at 20° C. and 1 kHz,
Δ∈ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole comprising all solid or liquid-crystalline components, without solvents.

All physical properties are and have been determined in accordance with "Merck Liquid Crystals, Physical Properties of Liquid Crystals", status Nov. 1997, Merck KGaA, Germany, and apply for a temperature of 20° C. An is determined at 589 nm and Δ∈ at 1 kHz, unless explicitly indicated otherwise in each case.

The polymerisable compounds are polymerised in the display or test cell by irradiation with UVA light (usually 365 nm) of defined intensity for a pre-specified time, with a voltage optionally being applied simultaneously to the display (usually 5 to 30 V alternating current, 1 kHz). In the examples, unless indicated otherwise, a 100 mW/cm² mercury vapour lamp is used, and the intensity is measured using a standard UV meter (Ushio UNI meter) fitted with a 320 nm or 340 nm band-pass filter.

The following examples explain the present invention without intending to restrict it in any way. However, the physical properties make clear to the person skilled in the art what properties can be achieved and in what ranges they can be modified. In particular, the combination of the various properties which can preferably be achieved is thus well defined for the person skilled in the art.

Further combinations of the embodiments and variants of the invention in accordance with the description also arise from the claims.

EXAMPLES

The compounds employed, if not commercially available, are synthesised by standard laboratory procedures. The LC media originate from Merck KGaA, Germany.

The self-aligning, long-chain alcohols and amines used are commercially available and are purified, if necessary, before use.

The following self-aligning compounds are used in LC media according to the invention:

TABLE 1

| Nematic LC medium M1 ($\Delta\epsilon < 0$) | | | |
|---|---|---|---|
| CY-3-O4 | 14% | Cl.p. | +80° C. |
| CCY-3-O2 | 9% | $\Delta n$ | 0.090 |
| CCY-3-O3 | 9% | $\Delta\epsilon$ | −3.3 |
| CPY-2-O2 | 10% | $\epsilon_{||}$ | 3.4 |
| CPY-3-O2 | 10% | $K_3/K_1$ | 0.97 |
| CCY-3-1 | 8% | | |
| CCH-34 | 9% | | |
| CCH-35 | 6% | | |
| PCH-53 | 10% | | |
| CCH-301 | 6% | | |
| CCH-303 | 9% | | |

| Compound No. | Structural formula | Chain length |
|---|---|---|
| 1 | [long chain alcohol structure] OH | $C_{12}$ |
| 2 (only for comparison) | [short chain alcohol structure] OH | $C_4$ |
| 3 | [long chain alcohol structure] OH | $C_{18}$ |
| 4 (only for comparison) | [very long chain alcohol structure] OH | $C_{30}$ |
| 5 | [branched secondary amine structure] NH | $C_{16}/C_{12}$ |
| 6 | [diamine structure] H-N-CH₂CH₂-NH₂ | $C_8$ |
| 7 | [diol structure] OH, OH | $C_{14}$ |
| 8 | [gallate ester structure with trihydroxybenzoate] | $C_{16}$ |
| 9 | [sorbitan oleate ester structure] | $C_{17}$ |

Mixture Examples

For the preparation of LC media according to the invention, the following liquid-crystalline mixtures consisting of low-molecular-weight components in the stated percentage proportions by weight are used.

TABLE 2

| Nematic LC medium M2 ($\Delta\epsilon > 0$) | | | |
|---|---|---|---|
| CC-4-V | 10% | Cl.p. | +77° C. |
| CC-5-V | 13.5% | $\Delta n$ | 0.113 |

TABLE 2-continued

| Nematic LC medium M2 (Δε > 0) | | | |
|---|---|---|---|
| PGU-3-F | 6.5% | Δε | 19.2 |
| ACQU-2-F | 10% | $\epsilon_{\parallel}$ | 23.8 |
| ACQU-3-F | 12% | $K_3/K_1$ | 0.97 |
| PUQU-3-F | 11% | | |
| CCP-V-1 | 12% | | |
| APUQU-2-F | 6% | | |
| APUQU-3-F | 7% | | |
| PGUQU-3-F | 8% | | |
| CPGU-3-OT | 4% | | |

Mixture Example 1 (a/b)

Without Polymer Stabilisation

Compound No. 1 (2.0% by weight) is added to a nematic LC medium M1 of the VA type (Δε<0) as shown in Table 1, and the mixture is homogenised.

Use in test cells without pre-alignment layer:
a) The resultant mixture is introduced into a monodomain test cell (without polyimide alignment layer, layer thickness d≈4.0 μm, glass substrate, ITO coating on both sides, without passivation layer). The LC medium has spontaneous homeotropic (vertical) alignment to the substrate surfaces. This alignment remains stable up to 70° C. In the temperature-stable range, the VA cell can be switched reversibly between crossed polarisers by application of a voltage of between 0 and 30 V.
b) The resultant mixture is introduced into a two-domain test cell (without polyimide alignment layer, layer thickness d≈4.0 μm, glass substrate, ITO coating structured on both sides (10 μm slit width), without passivation layer). The LC medium has spontaneous homeotropic (vertical) alignment to the substrate surfaces. This alignment remains stable up to 40° C. In the temperature-stable range, the VA cell can be switched reversibly between crossed polarisers by application of a voltage of between 0 and 30 V.

Mixture Example 2

Without Polymer Stabilisation

Compound No. 1 (2.0% by weight) is added to a nematic LC medium M2 of the VA-IPS type (Δε>0) as shown in Table 2, and the mixture is homogenised.

Use in Test Cells without Pre-Alignment Layer:
The resultant mixture is introduced into a monodomain test cell (without polyimide alignment layer, layer thickness d≈4.0 μm, glass substrate, ITO coating on both sides, no passivation layer). The LC medium has spontaneous homeotropic (vertical) alignment to the substrate surfaces.

Mixture Examples 3-10 (a/b)

Without Polymer Stabilisation

Compound Nos. 2-9 are added analogously to Mixture Example 1 to a nematic LC medium M1 (Δε<0) as shown in Table 1, and the mixture is homogenised. The proportions by weight of the compounds in the medium are indicated in Table 3. The resultant LC medium is in each case introduced into one monodomain test cell (a) and one two-domain test cell (b) without pre-alignment layer. The alignment obtained (homeotropic (vertical) or planar) to the substrate surfaces is indicated in Table 3. In the temperature-stable range, the VA cell (homeotropic alignment) can be switched reversibly between crossed polarisers by application of a voltage of between 0 and 30 V.

TABLE 3

Proportions by weight for doping in M1 and alignment of the resultant LC mixture at 20° C. and 70° C.

| | | | a) Monodomain cell | | b) Two-domain cell | |
|---|---|---|---|---|---|---|
| Mixture example | Compound No. | Proportion by weight | Alignment at 20° C. | Alignment at 70° C. | Alignment at 20° C. | Alignment at 70° C. |
| 3 (comparison) | 2 | 2.0% | planar | planar | planar | planar |
| 4 | 3 | 0.6% | homeotropic | homeotropic | planar | planar |
| 5 (comparison) | 4 | 2.0% | homeotropic | — | planar | planar |
| 6 | 5 | 1.0% | homeotropic | homeotropic | homeotropic | homeotropic |
| 7 | 6 | 0.5% | homeotropic | planar | homeotropic | planar |
| 8 | 7 | 0.3% | homeotropic | homeotropic | homeotropic | — |
| 9 | 8 | 0.3% | homeotropic | homeotropic | homeotropic | homeotropic |
| 10 | 9 | 2.0% | homeotropic | homeotropic | homeotropic | homeotropic |

The cells having homeotropic alignment can be switched reversibly.

Mixture Examples 11-18

Compound Nos. 2-9 are added analogously to Mixture Example 2 to a nematic LC medium M2 (Δε>0) as shown in Table 1, and the mixture is homogenised. The proportions by weight of the compounds in the medium are indicated in Table 4. The resultant LC medium is introduced into a monodomain test cell without pre-alignment layer. The alignment obtained (homeotropic (vertical) or planar) to the substrate surfaces is indicated in Table 4.

TABLE 4

Proportions by weight for doping in M2 and alignment of the resultant LC mixture at 20° C. Monodomain test cell.

| Mixture example | Compound No. | Proportion by weight | Alignment at 20° C. |
|---|---|---|---|
| 11 (comparison) | 2 | 2.0% | planar |
| 12 | 3 | 0.6% | homeotropic |
| 13 (comparison) | 4 | 2.0% | planar |
| 14 | 5 | 1.0% | homeotropic |
| 15 | 6 | 0.5% | homeotropic |
| 16 | 7 | 0.3% | homeotropic |
| 17 | 8 | 0.3% | homeotropic |
| 18 | 9 | 2.0% | homeotropic |

Mixture Examples 19-21

Polymer Stabilisation of Mixture Examples 1, 4 and 6

A polymerisable compound (RM-1, 0.5% by weight) and a self-aligning compound as shown in Tables 5.a and 5.b are added to a nematic LC medium M1 ($\Delta\epsilon<0$) in accordance with Table 1, and the mixture is homogenised.

Use in test cells without pre-alignment layer:

a) The resultant mixture (Table 5a) is introduced into a monodomain test cell (without polyimide alignment layer, layer thickness d≈4.0 μm, glass substrate, ITO coating on both sides, without passivation layer). The LC medium has spontaneous homeotropic (vertical) alignment to the substrate surfaces. The cell is irradiated for 15 min with UV light having an intensity of 100 mW/cm² at 40° C. with application of a voltage greater than the optical threshold voltage. This causes polymerisation of the monomeric, polymerisable compound. The homeotropic alignment is thus additionally stabilised and a 'pre-tilt' is established. The PSA-VA cell obtained can be switched reversibly up to 70° C. with application of a voltage of between 0 and 30 V. The response times are shortened compared with the unpolymerised examples.

b) The resultant mixture (Table 5b) is introduced into a two-domain test cell (without polyimide alignment layer, layer thickness d≈4.0 μm, glass substrate, ITO coating structured on both sides (10 μm slit width), without passivation layer). The LC medium has spontaneous homeotropic (vertical) alignment to the substrate surfaces. The cell is irradiated for 15 min with UV light having an intensity of 100 mW/cm² at 40° C. with application of a voltage greater than the optical threshold voltage. This causes polymerisation of the monomeric, polymerisable compound. The homeotropic alignment is thus additionally stabilised and a 'pre-tilt' is established. The PSA-VA cell obtained can be switched reversibly up to 70° C. with application of a voltage of between 0 and 30 V. The response times are shortened compared with the unpolymerised examples.

Heating Test of Mixture Examples 1, 6, 19-21

The LC media of Mixture Examples 1, 6, 19-21 are introduced into monodomain and two-domain test cells. The polymerisable compounds are polymerised as indicated. All cells are subjected to the heating test at 120° C. for the indicated number of days (Tables 5.a and 5.b). The electro-optical curves are investigated before and after the heating. Whereas significant differences in the response curves or even complete loss of the self-induced homeotropic alignment are observed after heating without polymer stabilisation, the properties of the polymer-stabilised cells remain virtually unchanged between 20° C. and 70° C.

TABLE 5.a

Proportions by weight for polymer stabilisation in M1 and alignment of the resultant LC mixture at 20° C. and 70° C., before and after heating test at 120° C. Monodomain cells (a).

| Mixture Example | Compound Example No. | RM-1, proportion by weight | before heating Alignment at 20° C. | Alignment at 70° C. | after heating (number of days at 120° C.) Alignment at 20° C. | Alignment at 70° C. |
|---|---|---|---|---|---|---|
| 1 | 1 (2.0%) | 0% | homeotropic | homeotropic | homeotropic (7 days) | planar (7 days) |
| 4 | 3 (0.6%) | 0% | homeotropic | homeotropic | planar (1 day) | planar (1 day) |
| 6 | 5 (1.0%) | 0% | homeotropic | homeotropic | planar (1 day) | planar (1 day) |
| 19 | 1 (2.0%) | 0.5% | homeotropic | homeotropic | homeotropic (7 days) | homeotropic (7 days) |
| 20 | 3 (0.6%) | 0.5% | homeotropic | homeotropic | homeotropic (1 day) | homeotropic (1 day) |
| 21 | 5 (1.0%) | 0.5% | homeotropic | homeotropic | homeotropic (1 day) | homeotropic (1 day) |

The cells having homeotropic alignment can be switched reversibly.

TABLE 5.b

Proportions by weight for polymer stabilisation in M1 and alignment of the resultant LC mixture at 20° C. and 70° C., before and after heating at 120° C. Two-domain cells (b).

| Mixture Example | Compound Example No. | RM-1, proportion by weight | before heating Alignment at 20° C. | Alignment at 70° C. | after heating (number of days at 120° C.) Alignment at 20° C. | Alignment at 70° C. |
|---|---|---|---|---|---|---|
| 1 | 1 (2.0%) | 0% | homeotropic | planar | planar (1 day) | planar (1 day) |
| 6 | 5 (1.0%) | 0% | homeotropic | homeotropic | homeotropic (6 days) | planar (6 days) |
| 19 | 1 (2.0%) | 0.5% | homeotropic | homeotropic | homeotropic (1 day) | homeotropic (1 day) |

TABLE 5.b-continued

Proportions by weight for polymer stabilisation in M1 and alignment of the resultant LC mixture at 20° C. and 70° C., before and after heating at 120° C. Two-domain cells (b).

| Mixture Example | Compound Example No. (by weight) | RM-1, proportion by weight | before heating Alignment at 20° C. | Alignment at 70° C. | after heating (number of days at 120° C.) Alignment at 20° C. | Alignment at 70° C. |
|---|---|---|---|---|---|---|
| 21 | 5 (1.0%) | 0.5% | homeotropic | homeotropic | homeotropic (6 days) | homeotropic (6 days) |

The cells having homeotropic alignment can be switched reversibly.

The invention claimed is:

1. A LC display comprising
an LC cell having two substrates and at least two electrodes, where at least one substrate is transparent to light, and a layer of an LC medium located between the substrates, which LC medium comprises
a low-molecular-weight liquid-crystalline component and
an organic compound, which contains at least one polar anchor group and at least one long-chain non-polar radical having at least 8 C atoms,
where the organic compound is suitable for effecting homeotropic alignment of the LC medium with respect to the substrate surfaces, and
which LC display is a VA-IPS display containing an LC medium having positive dielectric anisotropy and interdigital electrodes arranged on at least one substrate.

2. The LC display according to claim 1, wherein the LC medium further comprises a polymerizable or polymerized component, which is not identical to said organic compound containing at least one polar anchor group and at least one long-chain non-polar radical having at least 8 C atoms, where the polymerized component has been obtained by polymerization of a polymerizable component.

3. The LC display according to claim 1, wherein in the LC medium the organic compound is a compound of formula (I)

    (I)

in which
$R^1$ denotes a straight-chain or branched alkyl having 8 to 20 C atoms, in which one or more non-adjacent $CH_2$ groups are optionally replaced by —CH=CH—, —CF=CH—, —CH=CF— or —C≡C—, in which one $CH_2$ group is optionally replaced by a cycloalkylene group having 3 to 8 C atoms and in which one or more H atoms are optionally replaced by F or Cl,
$R^2$ denotes the polar anchor group, and
n denotes 1 or 2.

4. The LC display according to claim 1, wherein in the LC medium the organic compound is a compound of formula (I)

    (I)

in which
n denotes 1 or 2,
$R^1$ denotes a straight-chain or branched alkyl having 8 to 20 C atoms, in which one or more non-adjacent $CH_2$ groups are optionally replaced by —CH=CH—, —CF=CH—, —CH=CF— or —C≡C—, in which one $CH_2$ group is optionally replaced by a cycloalkylene group having 3 to 8 C atoms and in which one or more H atoms are optionally replaced by F or Cl, and
$R^2$ is of formula (A1)

    (A1)

in which
Sp denotes a spacer group or a single bond,
$X^1$ denotes —$NH_2$, —$NHR^{11}$, —$NR^{11}_2$, —$OR^{11}$, —OH,

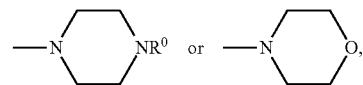

$R^0$ denotes H or alkyl having 1 to 12 C atoms,
$X^2$ denotes —NH—, —$NR^{11}$—, —O— or a single bond,
$Z^3$ in each case, independently of one another, denotes an alkylene group having 1-15 C atoms, carbocyclic rings having 5 or 6 C atoms, or combinations of one or more rings and alkylene groups, in each of which hydrogen are optionally replaced by —OH, —$OR^{11}$, —(CO)OH, —$NH_2$, —$NHR^{11}$, —$NR^{11}_2$ or halogen,
$R^{11}$ denotes a halogenated or unsubstituted alkyl radical having 1 to 15 C atoms, in which one or more $CH_2$ groups are each optionally replaced, independently of one another, by —C=C—, —CH=CH—, —(CO)O—, —O(CO)—, —(CO)— or —O— in such a way that O atoms are not linked directly to one another, and where two radicals $R^{11}$ are optionally linked to one another to form a ring, or H, and k denotes 0, 1, 2 or 3.

5. A LC medium comprising
A) a low-molecular-weight liquid-crystalline component and
B) an organic compound of formula (I)

    (I)

in which
n denotes 1 or 2,
$R^1$ denotes a straight-chain or branched alkyl having 8 to 20 C atoms, in which one or more non-adjacent $CH_2$ groups are optionally replaced by —CH=CH—, —CF=CH—, —CH=CF— or —C≡C—, in which one $CH_2$ group is optionally replaced by a cycloalkylene group having 3 to 8 C atoms and in which one or more H atoms are optionally replaced by F or Cl, and
$R^2$ is of formula (A1)

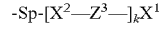    (A1)

in which
Sp denotes a spacer group or a single bond,
$X^1$ denotes —$NH_2$, —$NHR^{11}$, —$NR^{11}_2$, —$OR^{11}$, —OH,

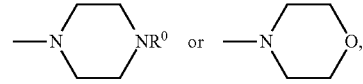

$R^0$ denotes H or alkyl having 1 to 12 C atoms,
$X^2$ denotes —NH—, —$NR^{11}$—, —O— or a single bond, $Z^3$ in each case, independently of one another, denotes an alkylene group having 1-15 C atoms, carbocyclic rings having 5 or 6 C atoms, or combinations of one or more rings and alkylene groups, in each of which hydrogen are optionally replaced by —OH, —OR$^{11}$, —(CO)OH, —NH$_2$, —NHR$^{11}$, —NR$^{11}$$_2$ or halogen, $R^{11}$ denotes a halogenated or unsubstituted alkyl radical having 1 to 15 C atoms, in which one or more CH$_2$ groups are each optionally replaced, independently of one another, by —C≡C—, —CH=CH—, —(CO)O—, —O(CO)—, —(CO)— or —O— in such a way that O atoms are not linked directly to one another, and where two radicals $R^{11}$ are optionally linked to one another to form a ring, or H, and k denotes 0, 1, 2 or 3, and C) a polymerizable or polymerized component, which is not identical to said organic compound, where the polymerized component has been obtained by polymerization of a polymerizable component.

6. The LC medium according to claim 5, wherein the organic compound is a compound of formula (I')

$$R^1\text{—}R^2 \quad (I')$$

in which $R^1$ and $R^2$ are as defined for the compound of formula (I).

7. The LC medium according to claim 5, wherein in the compound of formula (I), $R^1$ denotes an alkyl group having 8 to 20 C atoms.

8. A LC medium comprising
A) a low-molecular-weight liquid-crystalline component and
B) an organic compound, and
C) a polymerizable or polymerized component, which is not identical to said organic compound, where the polymerized component has been obtained by polymerization of a polymerizable component,
wherein the organic compound is a compound of formula I-1 to I-128 or I-140 to I-143

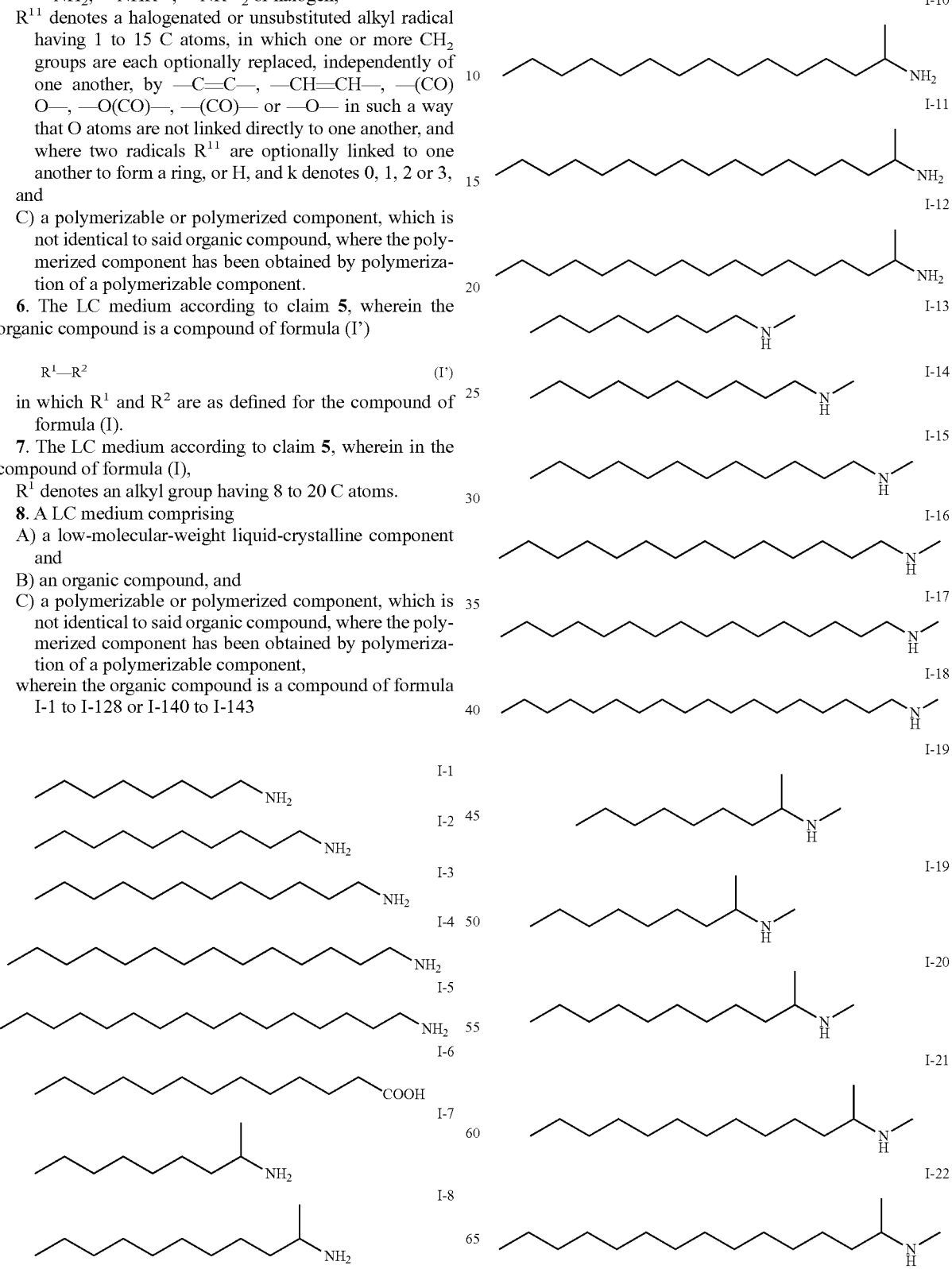

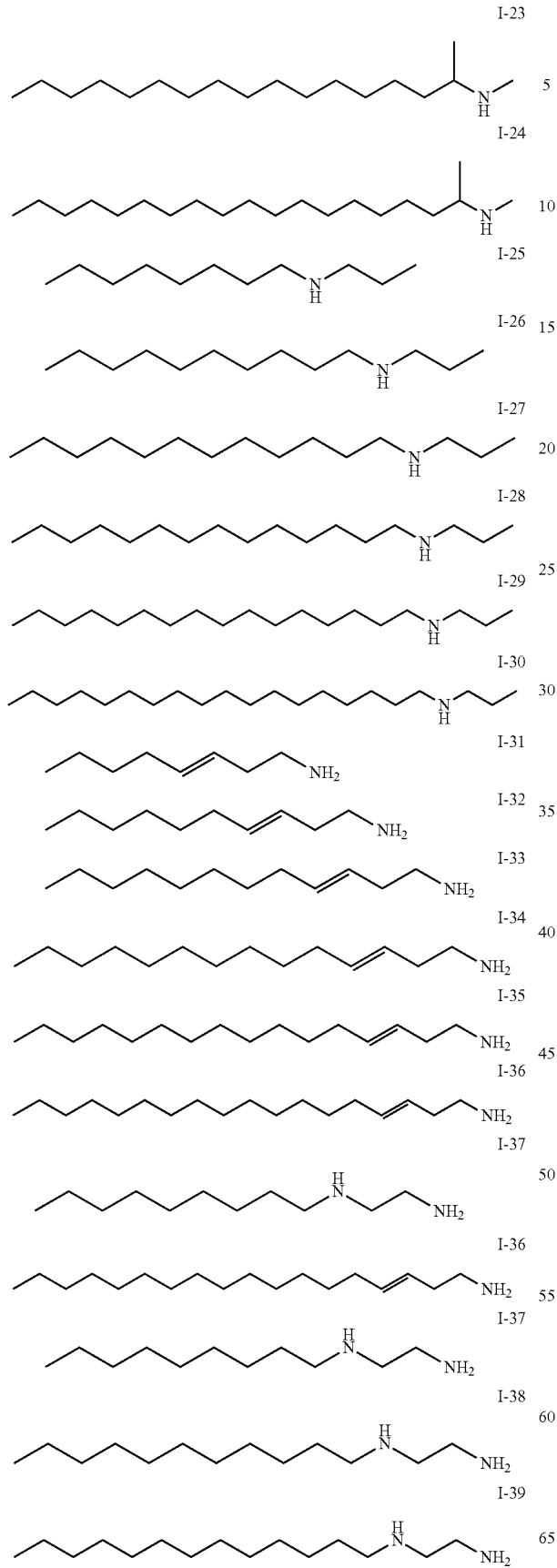
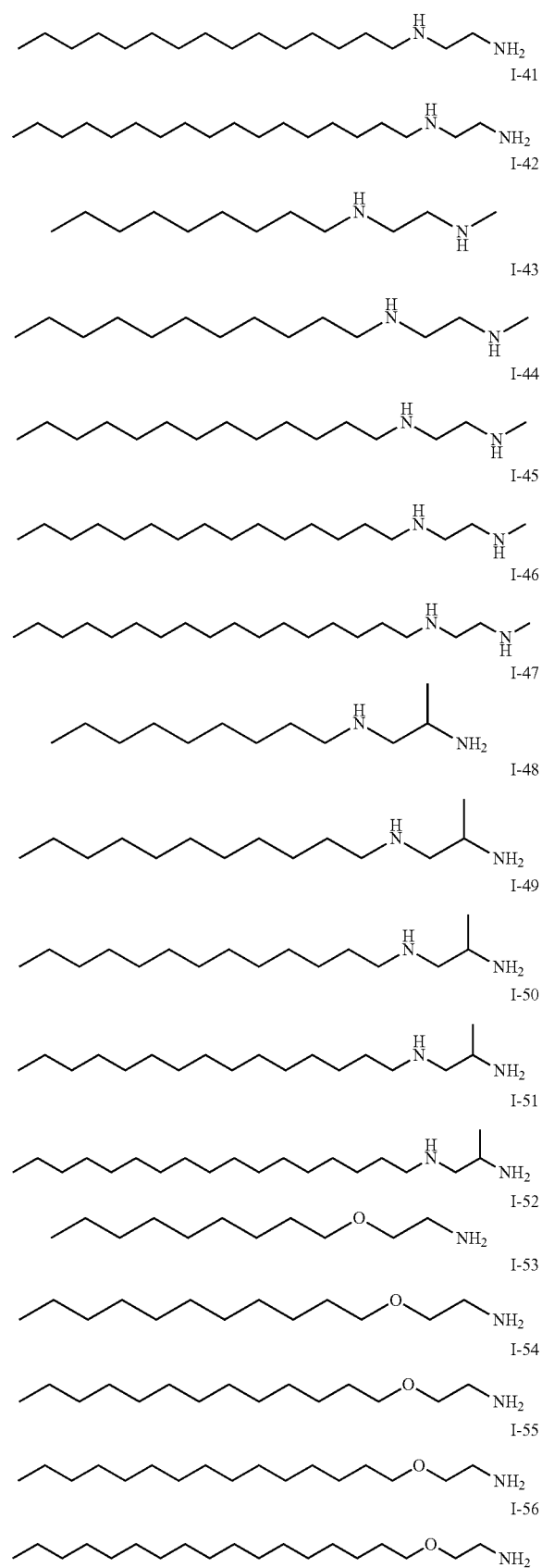

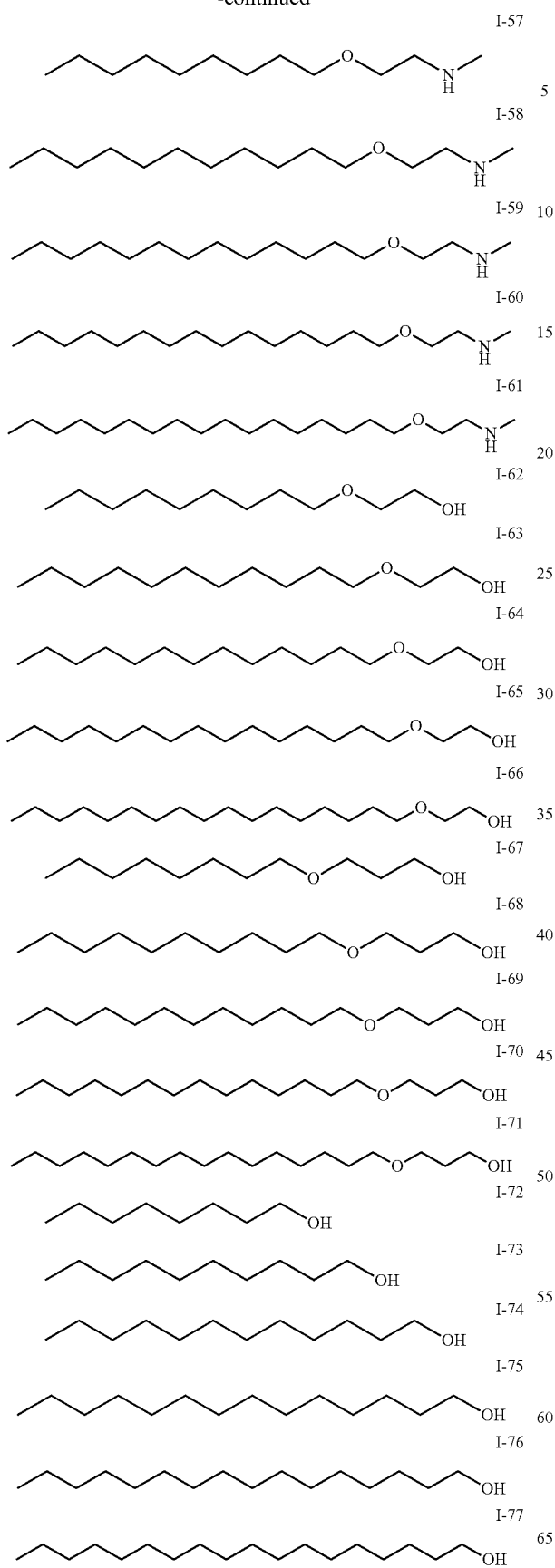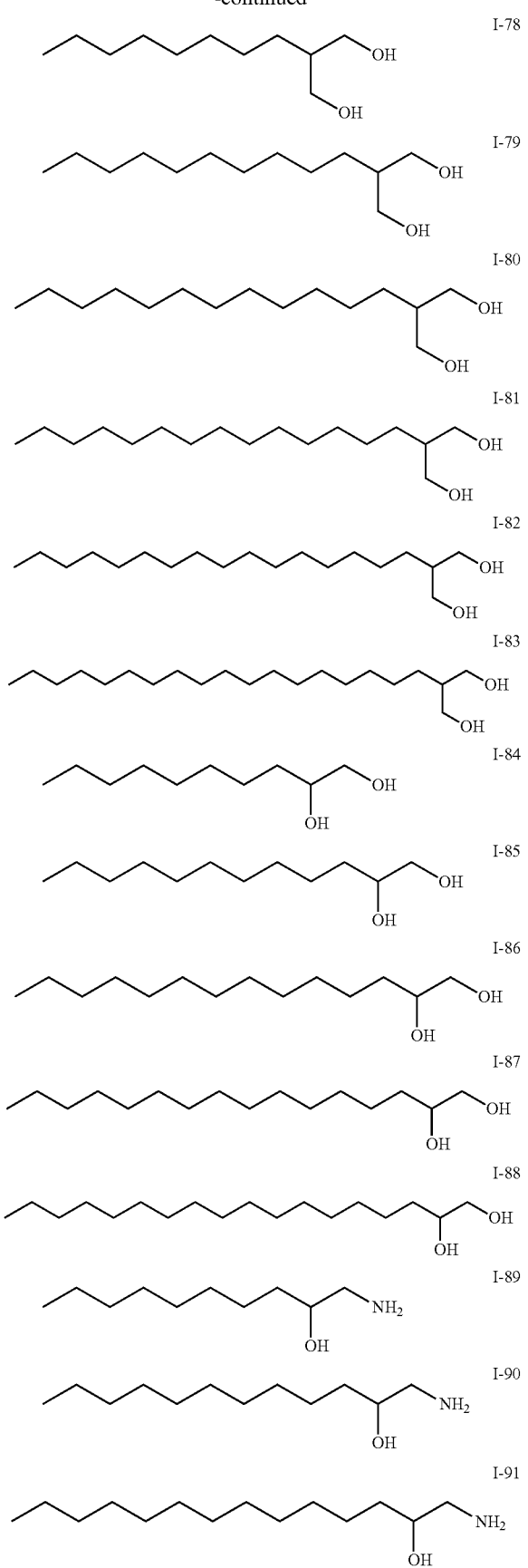

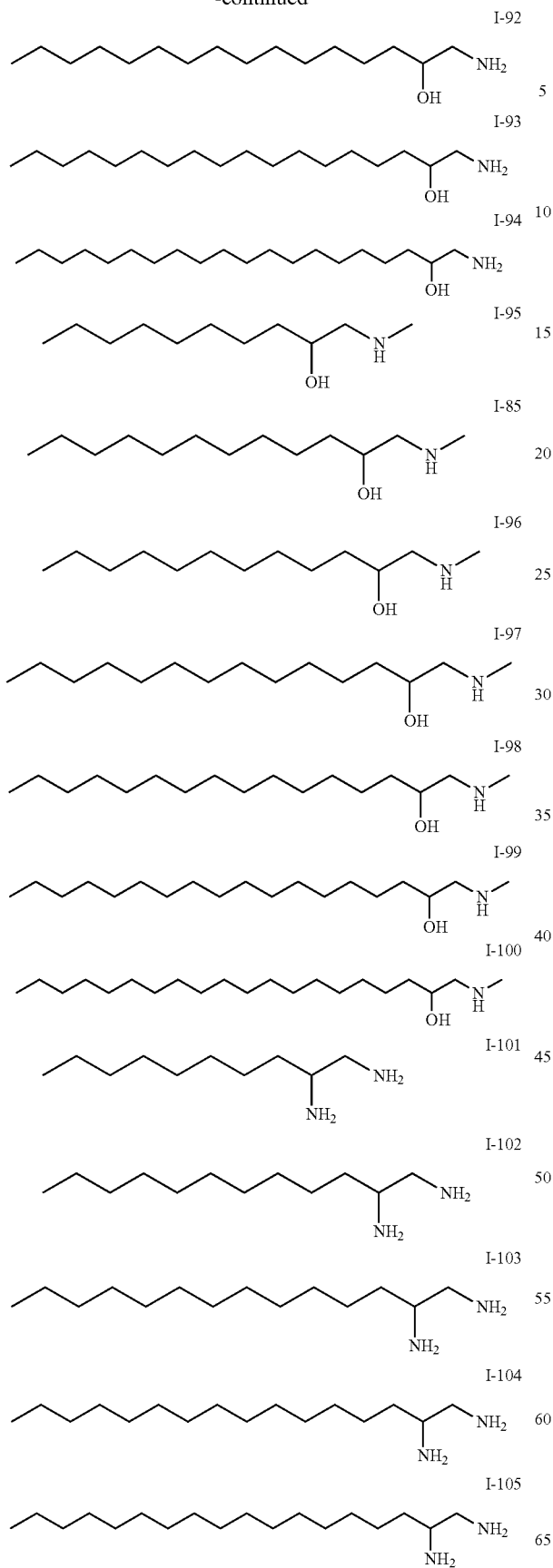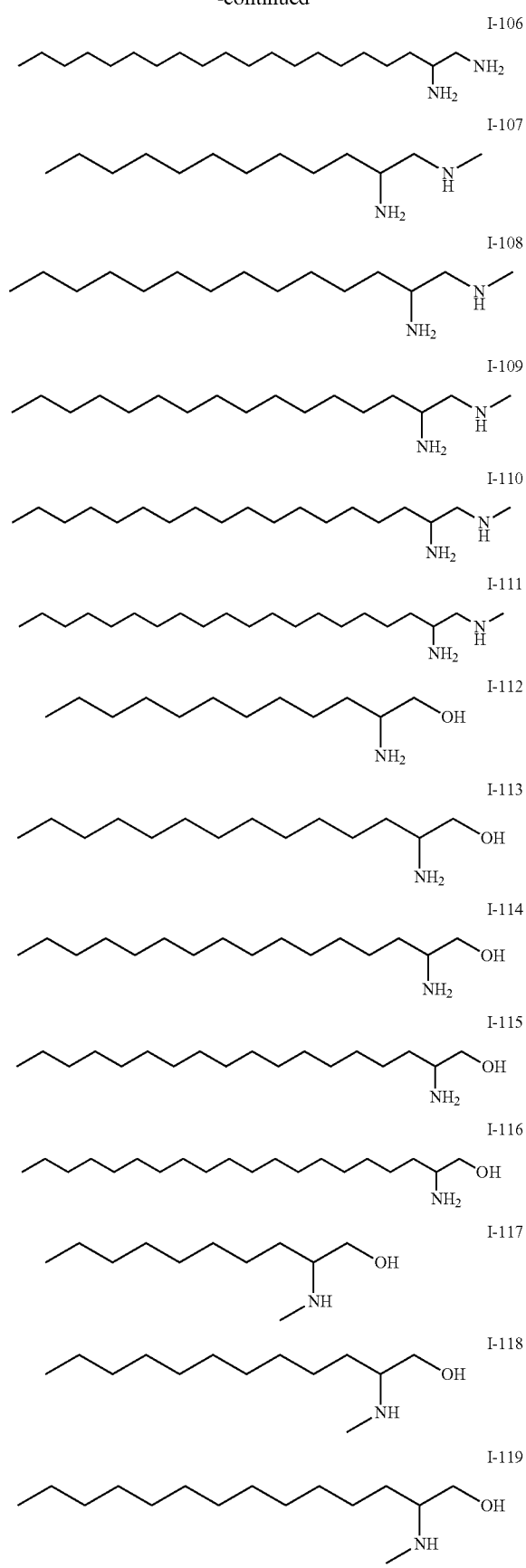

-continued

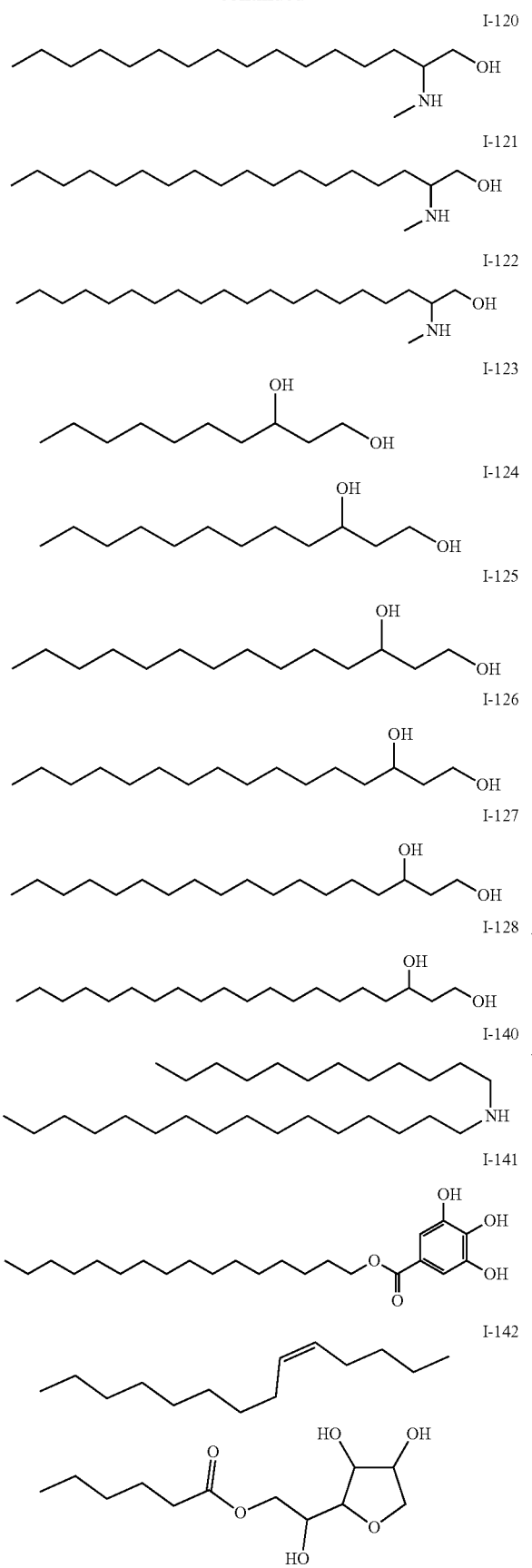

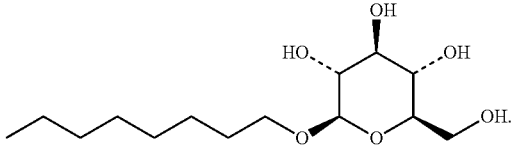

9. The LC medium according to claim 5, which comprises the organic compound at a concentration of less than 10% by weight.

10. The LC medium according to claim 5, wherein the polymerizable component is a compound of formula M or the polymerized component comprises one or more compounds of formula M in polymerized form $$P^a\text{-}(Sp^a)_{s1}\text{-}A^2\text{-}(Z^1\text{-}A^1)_n\text{-}(Sp^b)_{s2}\text{-}P^b \qquad M$$

in which
$P^a$, $P^b$ each, independently of one another, denote a polymerisable group,
$Sp^a$, $Sp^b$ on each occurrence, identically or differently, denote a spacer group,
s1, s2 each, independently of one another, denote 0 or 1,
$A^1$, $A^2$ each, independently of one another, denote a radical selected from the following groups:
a) the group consisting of trans-1,4-cyclohexylene, 1,4-cyclohexenylene and 4,4"-bicyclohexylene, in which, in addition, one or more non-adjacent $CH_2$ groups may be replaced by —O— and/or —S— and in which, in addition, one or more H atoms may be replaced by F,
b) the group consisting of 1,4-phenylene and 1,3-phenylene, in which, in addition, one or two CH groups may be replaced by N and in which, in addition, one or more H atoms may be replaced by L,
c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which is optionally replaced by heteroatoms,
n denotes 0, 1, 2 or 3,
$Z^1$ in each case, independently of one another, denotes —CO—O—, —O—CO—, —CH$_2$O—, —OCH$_2$—, —CF$_2$O—, —OCF$_2$—, or —(CH$_2$)$_m$— —O—, —CO—, —C(R$^y$R$^z$)—, —CH$_2$CF$_2$—, —CF$_2$CF$_2$— or a single bond,
m is 2, 3 or 4, and
$R^y$, $R^z$ each, independently of one another, denote H, F, $CH_3$ or $CF_3$.

11. The LC medium according to claim 10, wherein in the compound of formula M, therein in $A^1$, $A^2$, and therein in d), the polycyclic radical is selected from the group consisting of bicyclo[1.1.1]pentane-1,3-diyl, bicyclo[2.2.2]octane-1,4-diyl, spiro[3.3]heptane-2,6-diyl,

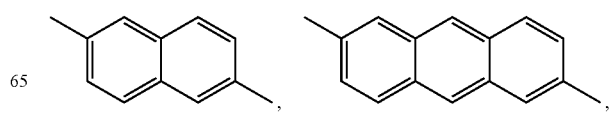

161

-continued

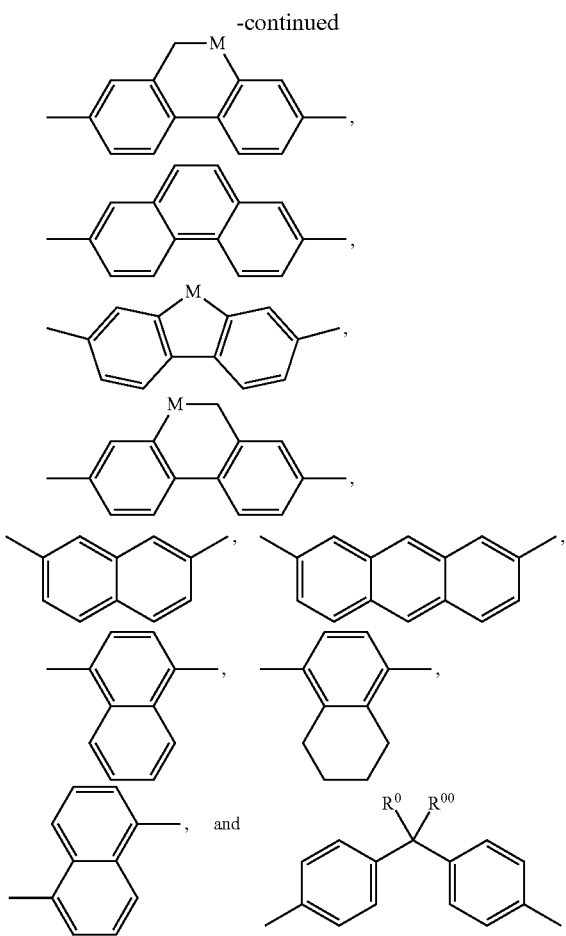

in which one or more H atoms are optionally replaced by L, and/or one or more double bonds are optionally replaced by single bonds, and/or one or more CH groups are optionally replaced by N, L on each occurrence, identically or differently, denotes F, Cl, CN, SCN, SF$_5$ or a straight-chain or branched, in each case optionally fluorinated, alkyl, alkoxy, alkylcarbonyl, alkoxycarbonyl, alkyl-carbonyloxy or alkoxycarbonyloxy having 1 to 12 C atoms, R$^0$, R$^{00}$ each, independently of one another, denote H, F or straight-chain or branched alkyl having 1 to 12 C atoms, in which one or more H atoms may be replaced by F, M denotes —O—, —S—, —CH$_2$—, —CHY$^1$— or —CY$^1$Y$^2$—, and Y$^1$ and Y$^2$ each, independently of one another, Cl, CN, H, F or a straight-chain or branched alkyl having 1 to 12 C atoms, in which one or more H atoms are optionally replaced by F.

12. A process for preparing an LC medium according to claim 5, comprising mixing together an organic compound of formula (I)

with a low-molecular-weight liquid-crystalline component and with a polymerizable or polymerized component, which is not identical to said organic compound containing at least one polar anchor group and at least one long-chain non-polar radical having at least 8 C atoms, where the

162 polymerized component has been obtained by polymerization of a polymerizable component, and additives are optionally added and the polymerizable component is optionally polymerized.

13. A process for preparing an LC display comprising an LC cell having two substrates and at least two electrodes, where at least one substrate is transparent to light and at least one substrate has one or two electrodes, comprising filling of the cell with an LC medium according to claim 5 which adopts a homeotropic alignment with respect to the substrate surfaces, and optionally polymerizing the polymerizable component, optionally with application of a voltage to the cell or under the action of an electric field.

14. A LC display comprising an LC cell having two substrates and at least two electrodes, where at least one substrate is transparent to light, and a layer of an LC medium according to claim 5 is located between the substrates, where the organic compound is suitable for effecting homeotropic alignment of the LC medium with respect to the substrate surfaces.

15. The LC display according to claim 14, wherein the substrates have no alignment layers for homeotropic alignment.

16. The LC display according to claim 14, wherein the substrates have alignment layers on one or both sides.

17. The LC display according to claim 14, which is a VA display containing an LC medium having negative dielectric anisotropy and electrodes arranged on opposite substrates.

18. A method for effecting homeotropic alignment with respect to a surface delimiting an LC medium, comprising adding to said LC medium an organic compound and a polymerizable or polymerized component, which is not identical to said organic compound, where the polymerized component has been obtained by polymerization of a polymerizable component and wherein the organic compound is a compound of formula (I)

$$(R^1)_n\text{—}R^2 \quad (I)$$

in which
n denotes 1 or 2,
R$^1$ denotes a straight-chain or branched alkyl having 8 to 20 C atoms, in which one or more non-adjacent CH$_2$ groups are optionally replaced by —CH=CH—, —CF=CH—, —CH=CF— or in which one CH$_2$ group is optionally replaced by a cycloalkylene group having 3 to 8 C atoms and in which one or more H atoms are optionally replaced by F or Cl, and
R$^2$ is of formula (A1)

$$\text{-Sp-}[X^2\text{—}Z^3\text{—}]_k X^1 \quad (A1)$$

in which
Sp denotes a spacer group or a single bond,
X$^1$ denotes —NH$_2$, —NHR$^{11}$, —NR$^{11}{}_2$, —OR$^{11}$, —OH,

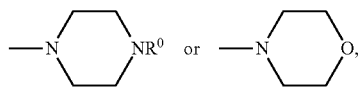

R$^0$ denotes H or alkyl having 1 to 12 C atoms,
X$^2$ denotes —NH—, —NR$^{11}$—, —O— or a single bond,
Z$^3$ in each case, independently of one another, denotes an alkylene group having 1-15 C atoms, carbocyclic rings having 5 or 6 C atoms, or combinations of one or more rings and alkylene groups, in each of which hydrogen are optionally replaced by —OH, —OR$^{11}$, —(CO)OH, —NH$_2$, —NHR$^{11}$, —NR$^{11}{}_2$ or halogen, $R^{11}$ denotes a halogenated or unsubstituted alkyl radical having 1 to 15 C atoms, in which one or more $CH_2$ groups are each optionally replaced, independently of one another, by —C≡C—, —CH=CH—, —(CO)O—, —O(CO)—, —(CO)— or —O— in such a way that O atoms are not linked directly to one another, and where two radicals $R^{11}$ are optionally linked to one another to form a ring, or H, and k denotes 0, 1, 2 or 3.

* * * * *